(12) United States Patent
Lynch et al.

(10) Patent No.: US 12,117,869 B1
(45) Date of Patent: Oct. 15, 2024

(54) PORTABLE ELECTRONIC DEVICE CASE ACCESSORY SYSTEM

(71) Applicant: Pioneer Square Brands, Inc., High Point, NC (US)

(72) Inventors: Riley Edwin Lynch, Greensboro, NC (US); Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/661,316

(22) Filed: May 10, 2024

(51) Int. Cl.
*H02J 7/00* (2006.01)
*G06F 1/16* (2006.01)

(52) U.S. Cl.
CPC .......... *G06F 1/1635* (2013.01); *H02J 7/0042* (2013.01)

(58) Field of Classification Search
USPC ........................................................ 320/107
See application file for complete search history.

(56) References Cited

U.S. PATENT DOCUMENTS

| 11,839,290 B1 | 12/2023 | Lynch |
| 11,857,044 B1 | 1/2024 | Lynch |
| 11,930,604 B1 | 3/2024 | Lynch et al. |
| 2016/0004945 A1* | 1/2016 | Wade ................. G06K 19/0704 235/492 |

* cited by examiner

*Primary Examiner* — Samuel Berhanu
(74) *Attorney, Agent, or Firm* — Grandview Law

(57) ABSTRACT

Systems involve implementations such as an electronic-controller-implemented method for use with an accessory assembly couplable with a device assembly and a payment card reader assembly, the method including determining activation status of the accessory assembly; and controlling charging status of the device assembly based at least in part on the activation status of the accessory assembly. Other aspects are described in the claims, drawings, and text forming a part of the present disclosure.

20 Claims, 56 Drawing Sheets

400

402
determining activation status of the accessory assembly

402a
determining at least one voltage level status according to at least one voltage threshold

402b
determining at least one current level status according to at least one current threshold

404
when the portable electronic device is electrical-energy-communication based coupled and structurally coupled with the accessory assembly, controlling at least a portion of electrical-energy-based charging of the portable electronic device based at least in part on the activation status of the accessory assembly

404a
controlling electrical-energy-based charging via current level metering

404b
controlling electrical-energy-based charging via voltage level metering

412
when the portable electronic device is at least electrical-energy-communication-based coupled and structurally coupled with the accessory assembly, determining activation status of the portable electronic device

412a
determining at least one voltage level status according to at least one voltage threshold

412b
determining at least one current level status according to at least one current threshold

414
controlling at least a portion of electrical-energy-based charging of the portable electronic device based at least in part on the activation status of the portable electronic device

414a
controlling electrical-energy-based charging via current level metering

414b
controlling electrical-energy-based charging via voltage level metering

442
when the portable electronic device is at least electrical-energy-communication-based coupled and structurally coupled with the accessory assembly, determining activation status of the portable electronic device

442a
determining at least one voltage level status according to at least one voltage threshold

442b
determining at least one current level status according to at least one current threshold

444
controlling at least a portion of electrical-energy-based charging of the accessory assembly based at least in part on the activation status of the portable electronic device

444a
controlling electrical-energy-based charging via current level metering

444b
controlling electrical-energy-based charging via voltage level metering

452
when the payment card reader assembly is at least electrical-energy-communication-based coupled and structurally coupled with the accessory assembly, determining activation status of the payment card reader assembly

452a
determining at least one voltage level status according to at least one voltage threshold

452b
determining at least one current level status according to at least one current threshold

454
controlling at least a portion of electrical-energy-based charging of the accessory assembly based at least in part on the activation status of the payment card reader assembly

454a
controlling electrical-energy-based charging via current level metering

454b
controlling electrical-energy-based charging via voltage level metering

472
when the portable electronic device is at least electrical-energy-communication-based coupled and structurally coupled with the accessory assembly, determining activation status of the portable electronic device

472a
determining at least one voltage level status according to at least one voltage threshold

472b
determining at least one current level status according to at least one current threshold

474
when the payment card reader assembly is at least electrical-energy-communication-based coupled and structurally coupled with the accessory assembly, controlling at least a portion of electrical-energy-based charging of the payment card reader assembly based at least in part on the activation status of the portable electronic device

474a
controlling electrical-energy-based charging via current level metering

474b
controlling electrical-energy-based charging via voltage level metering

482
when the payment card reader assembly is at least electrical-energy-communication-based coupled and structurally coupled with the accessory assembly, determining activation status of the payment card reader assembly

482a
determining at least one voltage level status according to at least one voltage threshold

482b
determining at least one current level status according to at least one current threshold

484
controlling at least a portion of electrical-energy-based charging of the payment card reader assembly based at least in part on the activation status of the payment card reader assembly

484a
controlling electrical-energy-based charging via current level metering

484b
controlling electrical-energy-based charging via voltage level metering

502
determining activation status of the accessory assembly

502a
determining at least one voltage level status according to at least one voltage threshold

502b
determining at least one current level status according to at least one current threshold

504
when the portable electronic device is electrical-energy-communication-based coupled and structurally coupled with the accessory assembly, controlling at least a portion of electrical-communication status of the portable electronic device based at least in part on the activation status of the accessory assembly

504a
controlling electrical-communication status via incoming communication access control

504b
controlling electrical-energy-based charging via outgoing communication access control

512
when the portable electronic device is electrical-energy-communication-based coupled and structurally coupled with the accessory assembly, determining activation status of the portable electronic device

512a
determining at least one voltage level status according to at least one voltage threshold

512b
determining at least one current level status according to at least one current threshold

514
controlling at least a portion of electrical-communication-based connectivity of the portable electronic device based at least in part on the activation status of the portable electronic device

514a
controlling electrical-communication status via incoming communication access control

514b
controlling electrical-energy-based charging via outgoing communication access control

522
when the payment card reader assembly is electrical-energy-communication-based coupled and structurally coupled with the accessory assembly, determining activation status of the payment card reader assembly

522a
determining at least one voltage level status according to at least one voltage threshold

522b
determining at least one current level status according to at least one current threshold

524
when the portable electronic device is electrical-energy-communication-based coupled and structurally coupled with the accessory assembly, controlling at least a portion of electrical-communication-based connectivity of the portable electronic device based at least in part on the activation status of the payment card reader assembly

524a
controlling electrical-communication status via incoming communication access control

524b
controlling electrical-energy-based charging via outgoing communication access control

542
when the portable electronic device is electrical-energy-communication-based coupled and structurally coupled with the accessory assembly, determining activation status of the portable electronic device

542a
determining at least one voltage level status according to at least one voltage threshold

542b
determining at least one current level status according to at least one current threshold

544
controlling at least a portion of electrical-communication-based connectivity of the accessory assembly based at least in part on the activation status of the portable electronic device

544a
controlling electrical-communication status via incoming communication access control

544b
controlling electrical-energy-based charging via outgoing communication access control

572
when the portable electronic device is electrical-energy-communication-based coupled and structurally coupled with the accessory assembly, determining activation status of the portable electronic device

572a
determining at least one voltage level status according to at least one voltage threshold

572b
determining at least one current level status according to at least one current threshold

574
when the payment card reader assembly is electrical-energy-communication-based coupled and structurally coupled with the accessory assembly, controlling at least a portion of electrical-communication-based connectivity of the payment card reader assembly based at least in part on the activation status of the portable electronic device

574a
controlling electrical-communication status via incoming communication access control

574b
controlling electrical-energy-based charging via outgoing communication access control

582
when the payment card reader assembly is electrical-energy-communication-based coupled and structurally coupled with the accessory assembly, determining activation status of the payment card reader assembly

582a
determining at least one voltage level status according to at least one voltage threshold

582b
determining at least one current level status according to at least one current threshold

584
controlling at least a portion of electrical-communication-based connectivity of the payment card reader assembly based at least in part on the activation status of the payment card reader assembly

584a
controlling electrical-communication status via incoming communication access control

584b
controlling electrical-energy-based charging via outgoing communication access control

*Fig. 54*

PORTABLE ELECTRONIC DEVICE CASE ACCESSORY SYSTEM

An electronic-controller-implemented method is for use with an accessory assembly electrical-energy-communication-based couplable and structurally couplable with a portable electronic device and with a payment card reader assembly, the portable electronic device selected from a portable electronic tablet device implementation or a portable electronic phone device implementation. The method includes determining activation status of the accessory assembly; and when the portable electronic device is electrical-energy-communication based coupled and structurally coupled with the accessory assembly, controlling at least a portion of electrical-energy-based charging of the portable electronic device based at least in part on the activation status of the accessory assembly. In implementations the method further includes when the portable electronic device is at least electrical-energy-communication-based coupled and structurally coupled with the accessory assembly, determining activation status of the portable electronic device; and controlling at least a portion of electrical-energy-based charging of the portable electronic device based at least in part on the activation status of the portable electronic device. In implementations the method further includes when the payment card reader assembly is at least electrical-energy-communication-based coupled and structurally coupled with the accessory assembly, determining activation status of the payment card reader assembly; and controlling at least a portion of electrical-energy-based charging of the portable electronic device based at least in part on the activation status of the accessory payment card reader assembly. In implementations the method further includes determining activation status of the accessory assembly; and controlling at least a portion of electrical-energy-based charging of the accessory assembly based at least in part on the activation status of the accessory assembly. In implementations the method further includes when the portable electronic device is at least electrical-energy-communication-based coupled and structurally coupled with the accessory assembly, determining activation status of the portable electronic device; and controlling at least a portion of electrical-energy-based charging of the accessory assembly based at least in part on the activation status of the portable electronic device. In implementations the method further includes when the payment card reader assembly is at least electrical-energy-communication-based coupled and structurally coupled with the accessory assembly, determining activation status of the payment card reader assembly; and controlling at least a portion of electrical-energy-based charging of the accessory assembly based at least in part on the activation status of the payment card reader assembly. In implementations the method further includes determining activation status of the accessory assembly; and when the payment card reader assembly is at least electrical-energy-communication-based coupled and structurally coupled with the accessory assembly, controlling at least a portion of electrical-energy-based charging of the payment card reader assembly based at least in part on the activation status of the accessory assembly. In implementations the method further includes when the portable electronic device is at least electrical-energy-communication-based coupled and structurally coupled with the accessory assembly, determining activation status of the portable electronic device; and when the payment card reader assembly is at least electrical-energy-communication-based coupled and structurally coupled with the accessory assembly, controlling at least a portion of electrical-energy-based charging of the payment card reader assembly based at least in part on the activation status of the portable electronic device. In implementations the method further includes when the payment card reader assembly is at least electrical-energy-communication-based coupled and structurally coupled with the accessory assembly, determining activation status of the payment card reader assembly; and controlling at least a portion of electrical-energy-based charging of the payment card reader assembly based at least in part on the activation status of the payment card reader assembly.

An electronic-controller-implemented method is used with an accessory assembly electrical-energy-communication-based couplable and structurally couplable with a portable electronic device and a payment card reader assembly, the portable electronic device selected from a portable electronic tablet device implementation and a portable electronic phone device implementation. The method includes determining activation status of the accessory assembly; and when the portable electronic device is electrical-energy-communication-based coupled and structurally coupled with the accessory assembly, controlling at least a portion of electrical-communication status of the portable electronic device based at least in part on the activation status of the accessory assembly. In implementations the method further includes when the portable electronic device is electrical-energy-communication-based coupled and structurally coupled with the accessory assembly, determining activation status of the portable electronic device; and controlling at least a portion of electrical-communication-based connectivity of the portable electronic device based at least in part on the activation status of the portable electronic device. In implementations the method further includes when the payment card reader assembly is electrical-energy-communication-based coupled and structurally coupled with the accessory assembly, determining activation status of the payment card reader assembly; and when the portable electronic device is electrical-energy-communication-based coupled and structurally coupled with the accessory assembly, controlling at least a portion of electrical-communication-based connectivity of the portable electronic device based at least in part on the activation status of the payment card reader assembly. In implementations the method further includes determining activation status of the accessory assembly; and controlling at least a portion of electrical-communication-based connectivity of the accessory assembly based at least in part on the activation status of the accessory assembly. In implementations the method further includes when the portable electronic device is electrical-energy-communication-based coupled and structurally coupled with the accessory assembly, determining activation status of the portable electronic device; and controlling at least a portion of electrical-communication-based connectivity of the accessory assembly based at least in part on the activation status of the portable electronic device. In implementations the method further includes when the payment card reader assembly is electrical-energy-communication-based coupled and structurally coupled with the accessory assembly, determining activation status of the payment card reader assembly; and controlling at least a portion of electrical-communication-based connectivity of the accessory assembly based at least in part on the activation status of the payment card reader assembly. In implementations the method further includes determining activation status of the accessory assembly; and when the payment card reader assembly is electrical-energy-communication-based coupled and structurally coupled with the accessory assembly, controlling at least a portion of electrical-communication-based connectivity of the payment card reader assembly based at least in part on the activation status of the accessory assembly. In implementations the method further includes when the portable electronic device is electrical-energy-communication-based coupled and structurally coupled with the accessory assembly, determining activation status of the portable electronic device; and when the payment card reader assembly is electrical-energy-communication-based coupled and structurally coupled with the accessory assembly, controlling at least a portion of electrical-communication-based connectivity of the payment card reader assembly based at least in part on the activation status of the portable electronic device. In implementations the method further includes when the payment card reader assembly is electrical-energy-communication-based coupled and structurally coupled with the accessory assembly, determining activation status of the payment card reader assembly; and controlling at least a portion of electrical-communication-based connectivity of the payment card reader assembly based at least in part on the activation status of the payment card reader assembly.

An electronic-controller-implemented method is used with an accessory assembly electrical-energy-communication-based couplable with and structurally couplable with a portable electronic device and a payment card reader assembly, the portable electronic device selected from a portable electronic tablet device implementation and a portable electronic phone device implementation. The method includes determining electrical-energy-communication-based coupling status of the accessory assembly with the portable electronic device; and controlling at least a portion of electrical-communication-based connectivity of the portable electronic device based at least in part on the electrical-energy-communication-based coupling status of the accessory assembly with the portable electronic device. In implementations the method further includes determining electrical-energy-communication-based coupling status of the accessory assembly with the payment card reader assembly; and controlling at least a portion of electrical-communication-based connectivity of the payment card reader assembly based at least in part on the electrical-energy-communication-based coupling status of the accessory assembly with the payment card reader assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Portable Electronic Device Case Accessory System, articles of manufacture, compositions of matter for same that may provide context, for instance, in introducing one or more processes and/or devices described herein.

FIG. 37 is a representative flow diagram associated with aspects of the accessory assembly of FIG. 1.

FIG. 38 is a representative flow diagram associated with aspects of the accessory assembly of FIG. 1.

FIG. 41 is a representative flow diagram associated with aspects of the accessory assembly of FIG. 1.

FIG. 42 is a representative flow diagram associated with aspects of the accessory assembly of FIG. 1.

FIG. 44 is a representative flow diagram associated with aspects of the accessory assembly of FIG. 1.

FIG. 45 is a representative flow diagram associated with aspects of the accessory assembly of FIG. 1.

FIG. 46 is a representative flow diagram associated with aspects of the accessory assembly of FIG. 1.

FIG. 47 is a representative flow diagram associated with aspects of the accessory assembly of FIG. 1.

FIG. 48 is a representative flow diagram associated with aspects of the accessory assembly of FIG. 1.

FIG. 50 is a representative flow diagram associated with aspects of the accessory assembly of FIG. 1.

FIG. 53 is a representative flow diagram associated with aspects of the accessory assembly of FIG. 1.

FIG. 54 is a representative flow diagram associated with aspects of the accessory assembly of FIG. 1.

DETAILED DESCRIPTION

Figure 1:
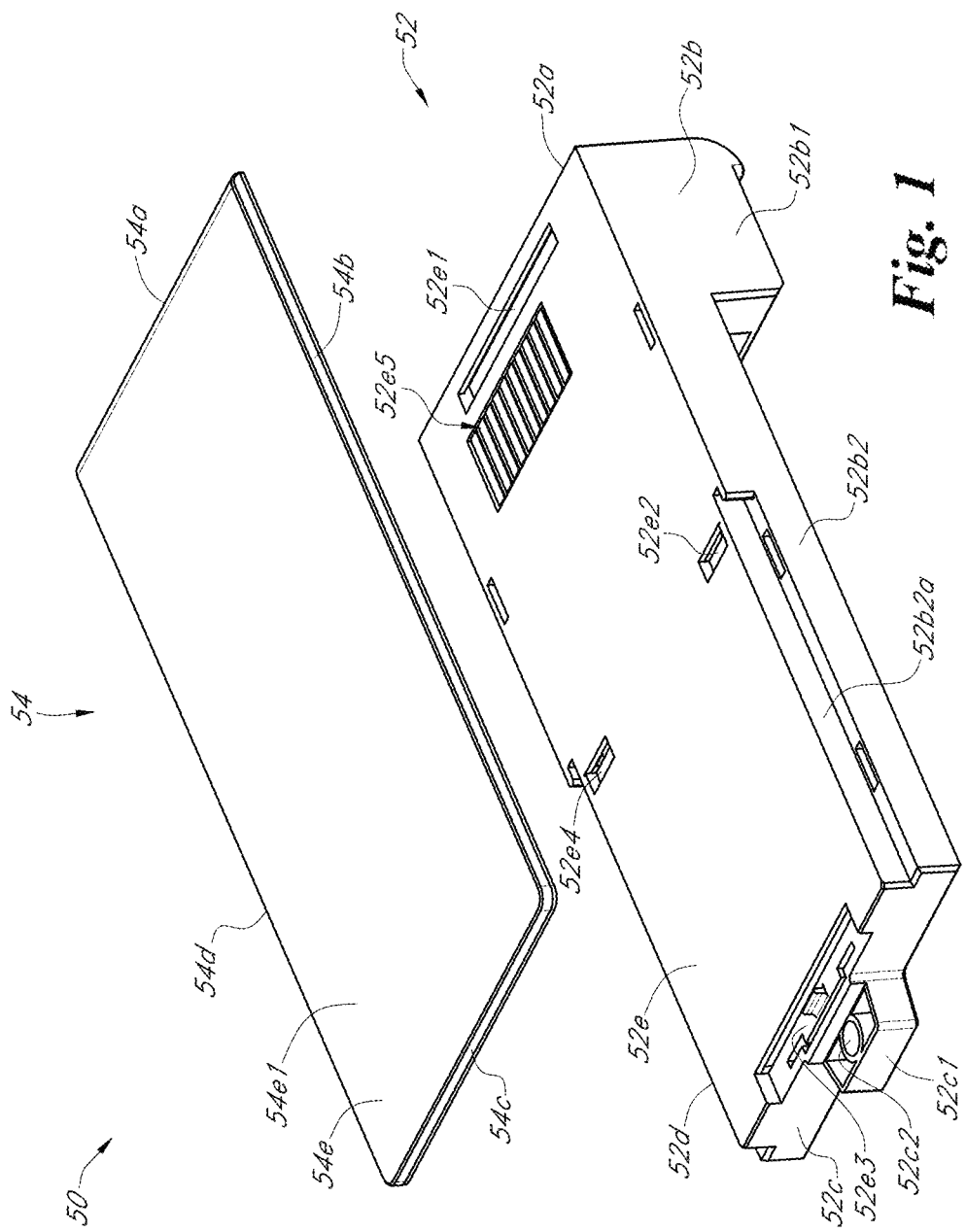
FIG. 1 is an exploded front-bottom-perspective view of an accessory assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded front-bottom-perspective view of accessory assembly 50. Depicted implementation of accessory assembly 50 is shown to include main assembly 52, and cover assembly 54. Depicted implementation of main assembly 52 is shown to include side 52a, side 52b, side 52c, side 52d, and back side 52e.

Depicted implementation of side 52b is shown to include base portion 52b1, extended portion 52b2, and elongated groove 52b2a, which can be seen as having an L-shaped side profile. Depicted implementation of side 52c is shown to include protrusion 52c1, and aperture 52c2. Depicted implementation of back side 52e is shown to include notch 52e1, notch 52e2, notch 52e3, notch 52e4, and electric contacts interface 52e5.

Depicted implementation of cover assembly 54 is shown to include side 54a, side 54b, side 54c, side 54d, base 54e, and exterior side 54e1. In implementations, accessory assembly 50 can include various service functions for portable electronic tablet device implementation 100 (shown in FIG. 17) or portable electronic phone device implementation 120 (shown in FIG. 27) such as storage of electrical power and electronic-based communication.

Figure 2:
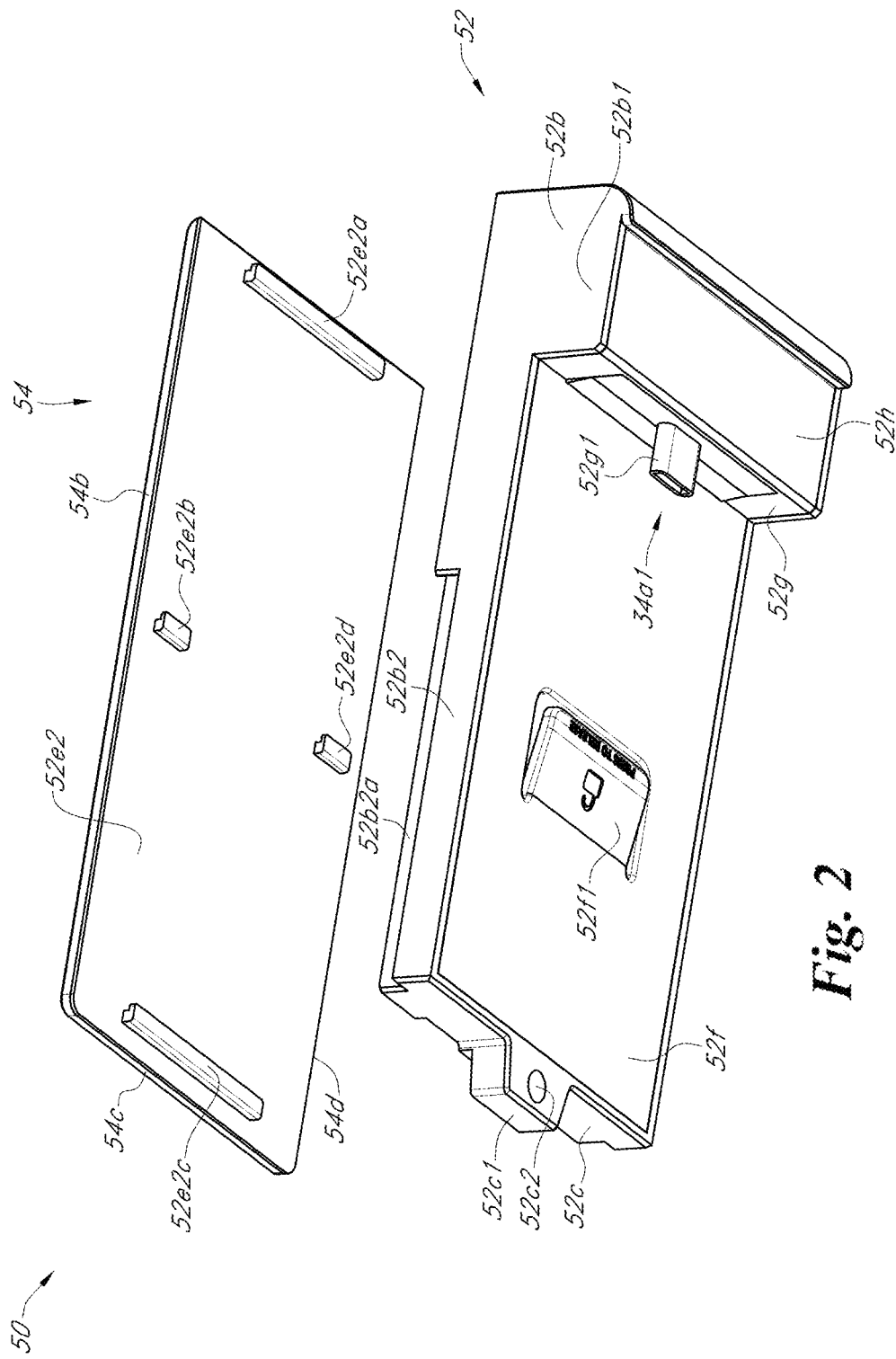
FIG. 2 is an exploded front-top-perspective view of the accessory assembly of FIG. 1.

Turning to FIG. 2, depicted therein is an exploded front-top-perspective view of accessory assembly 50. Depicted implementation of back side 52e is shown to include notch 52e2, protrusion 52e2a, protrusion 52e2b, protrusion 52e2c, and protrusion 52e2d. Depicted implementation of main assembly 52 is shown to include front portion 52f with hinged tab 52f1, coupling side 52g with electric plug 52g1, and front portion 52h.

Figure 3:
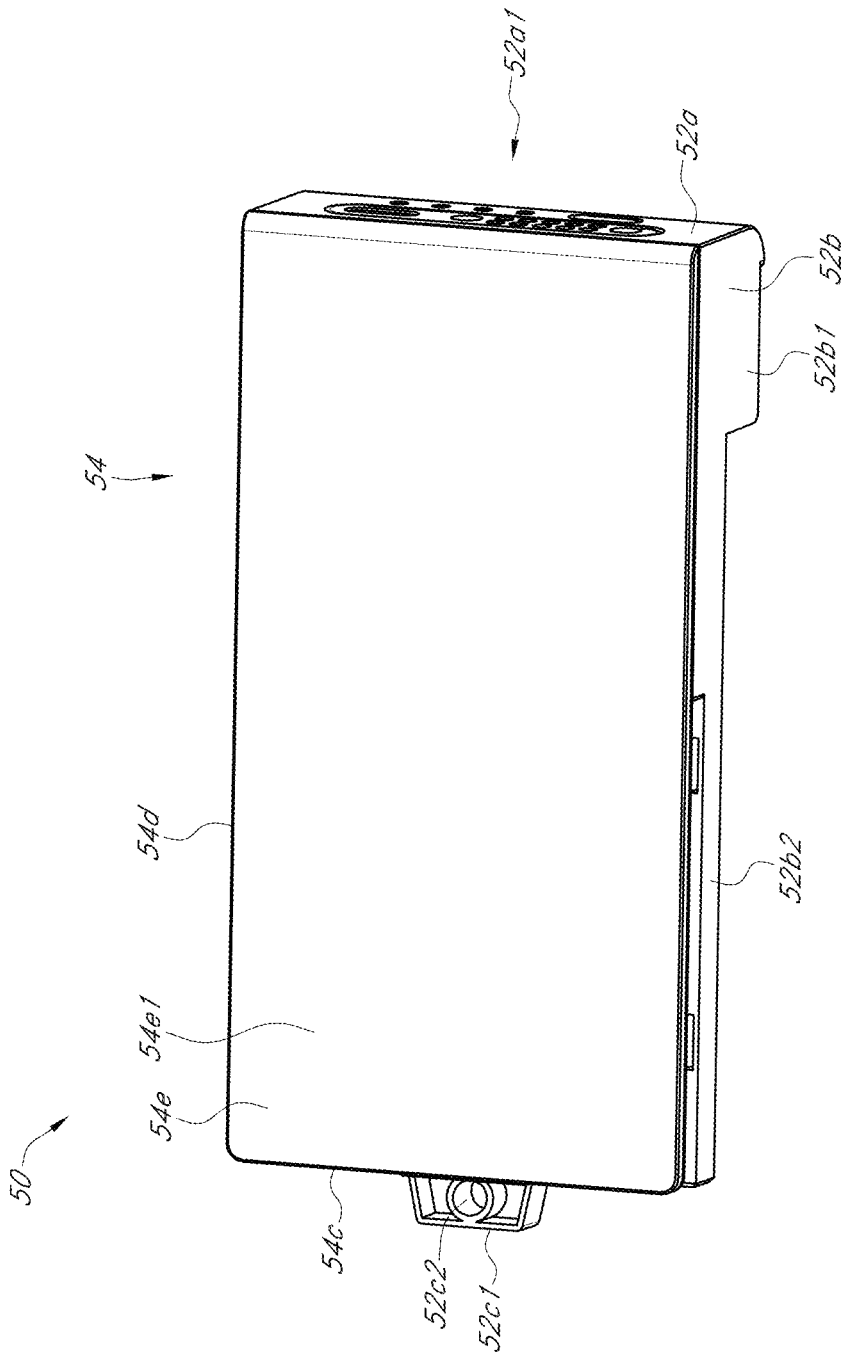
FIG. 3 is a bottom-perspective view of the accessory assembly of FIG. 1.

Turning to FIG. 3, depicted therein is a bottom-perspective view of accessory assembly 50. Depicted implementation of main assembly 52 is shown to include exterior electric interface 52a1.

Figure 4:
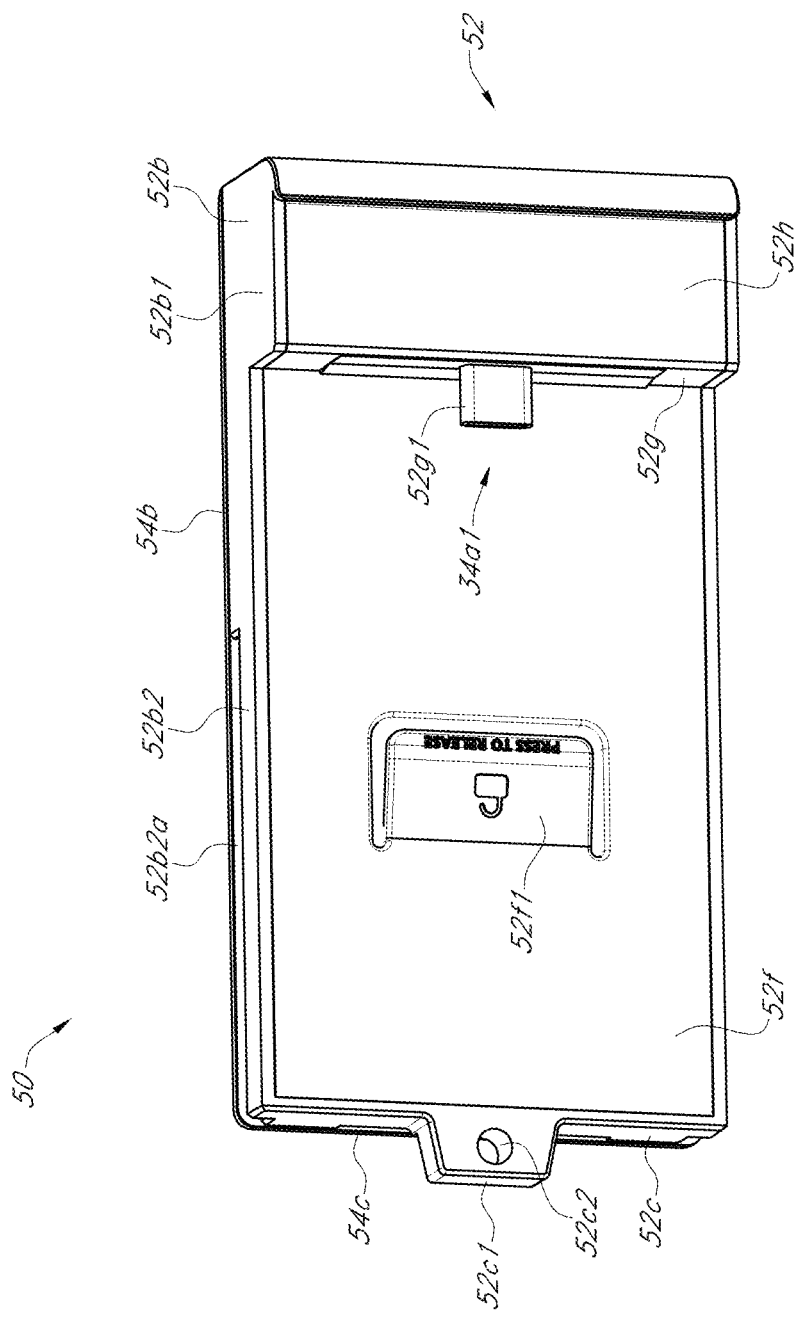
FIG. 4 is a top-perspective view of the accessory assembly of FIG. 1.

Turning to FIG. 4, depicted therein is a top-perspective view of accessory assembly 50.

Figure 5:
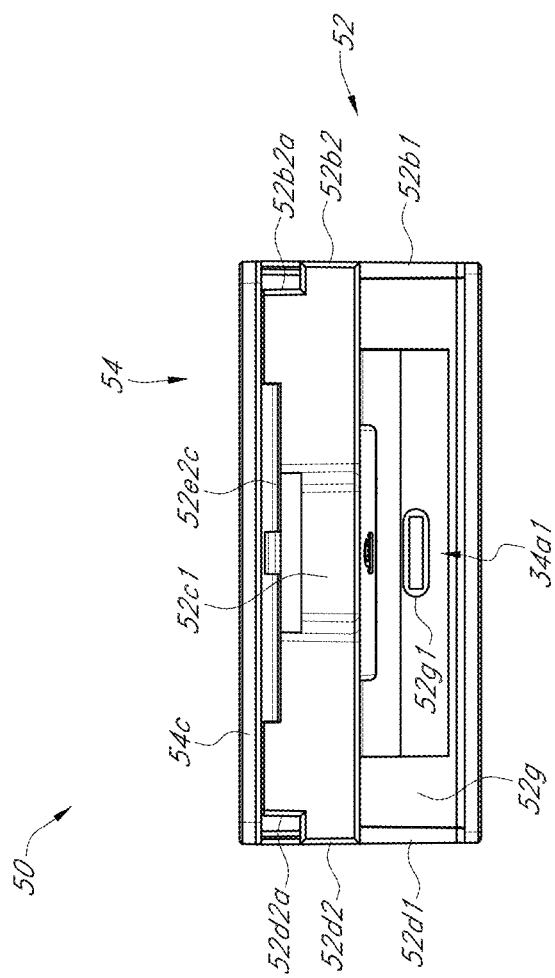
FIG. 5 is a front-elevational view of the accessory assembly of FIG. 1.

Turning to FIG. 5, depicted therein is a front-elevational view of accessory assembly 50. Depicted implementation of main assembly 52 is shown to include base portion 52d1, extended portion 52d2, and elongated groove 52d2a.

Figure 6:
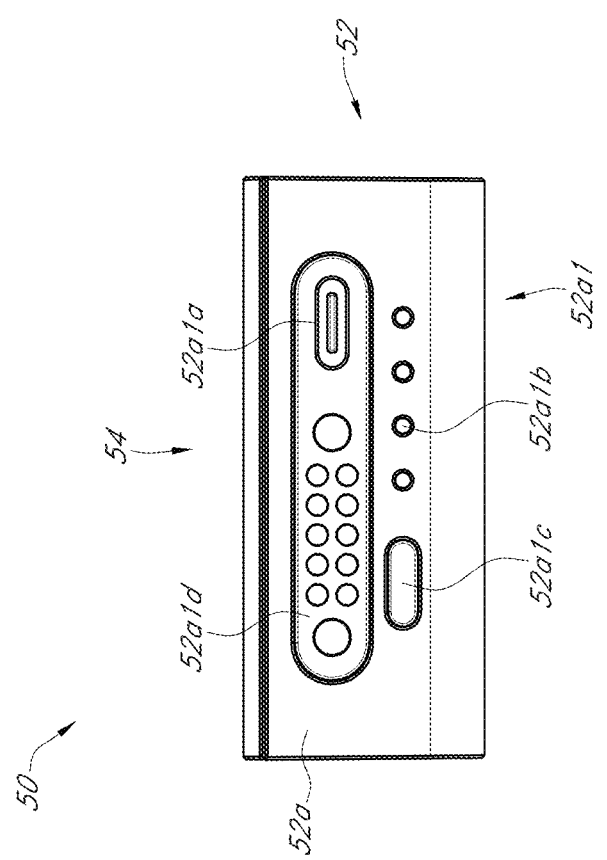
FIG. 6 is a rear-elevational view of the accessory assembly of FIG. 1.

Turning to FIG. 6, depicted therein is a rear-elevational view of accessory assembly 50. Depicted implementation of exterior electric interface 52a1 is shown to include interface portion 52a1a, interface portion 52a1b, interface portion 52a1c, and interface portion 52a1d.

Figure 7:
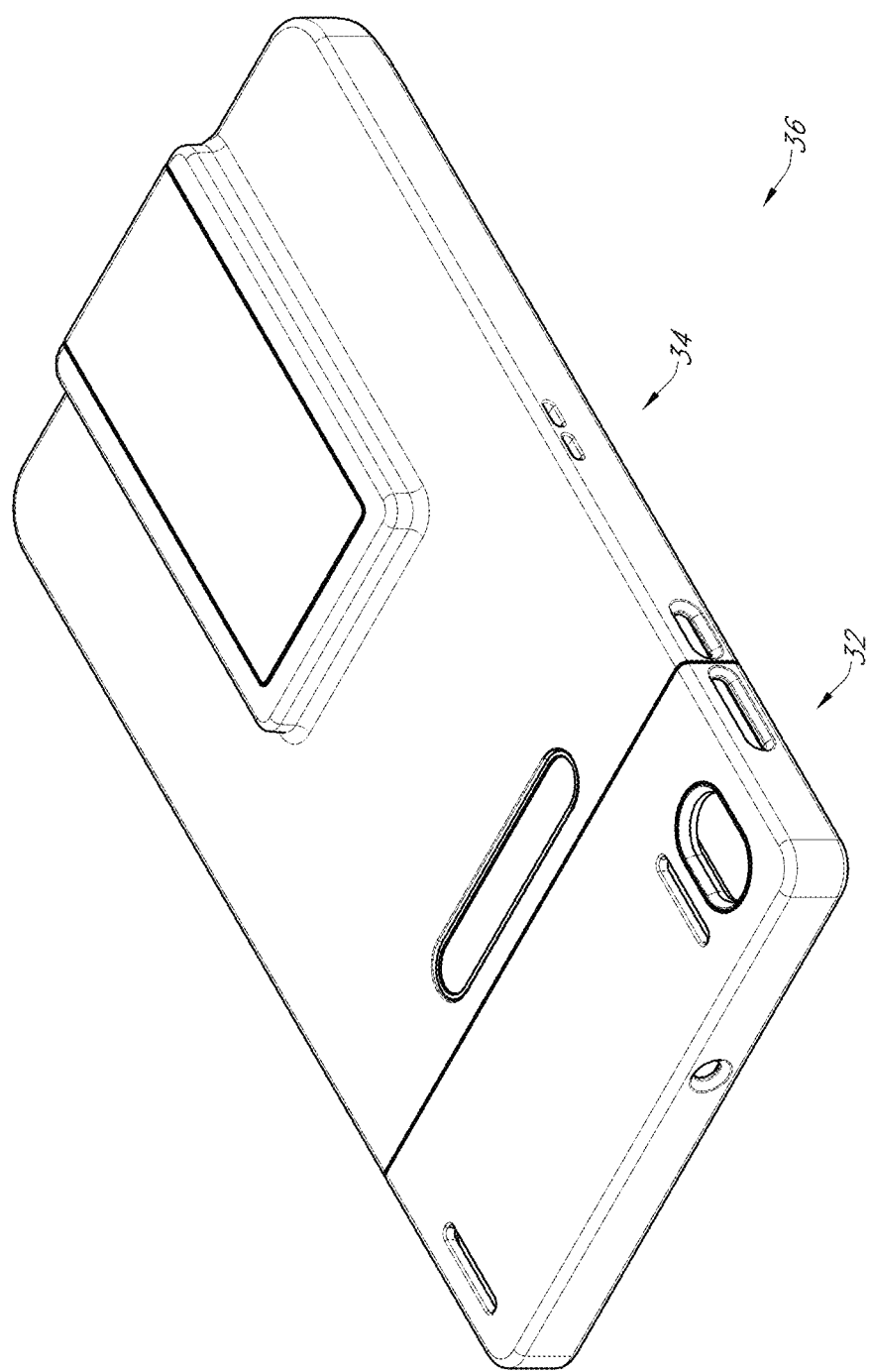
FIG. 7 is a front-bottom-perspective view of the case assembly of FIG. 12.

Turning to FIG. 7, depicted therein is a front-bottom-perspective view of device case assembly 30.

Figure 8:
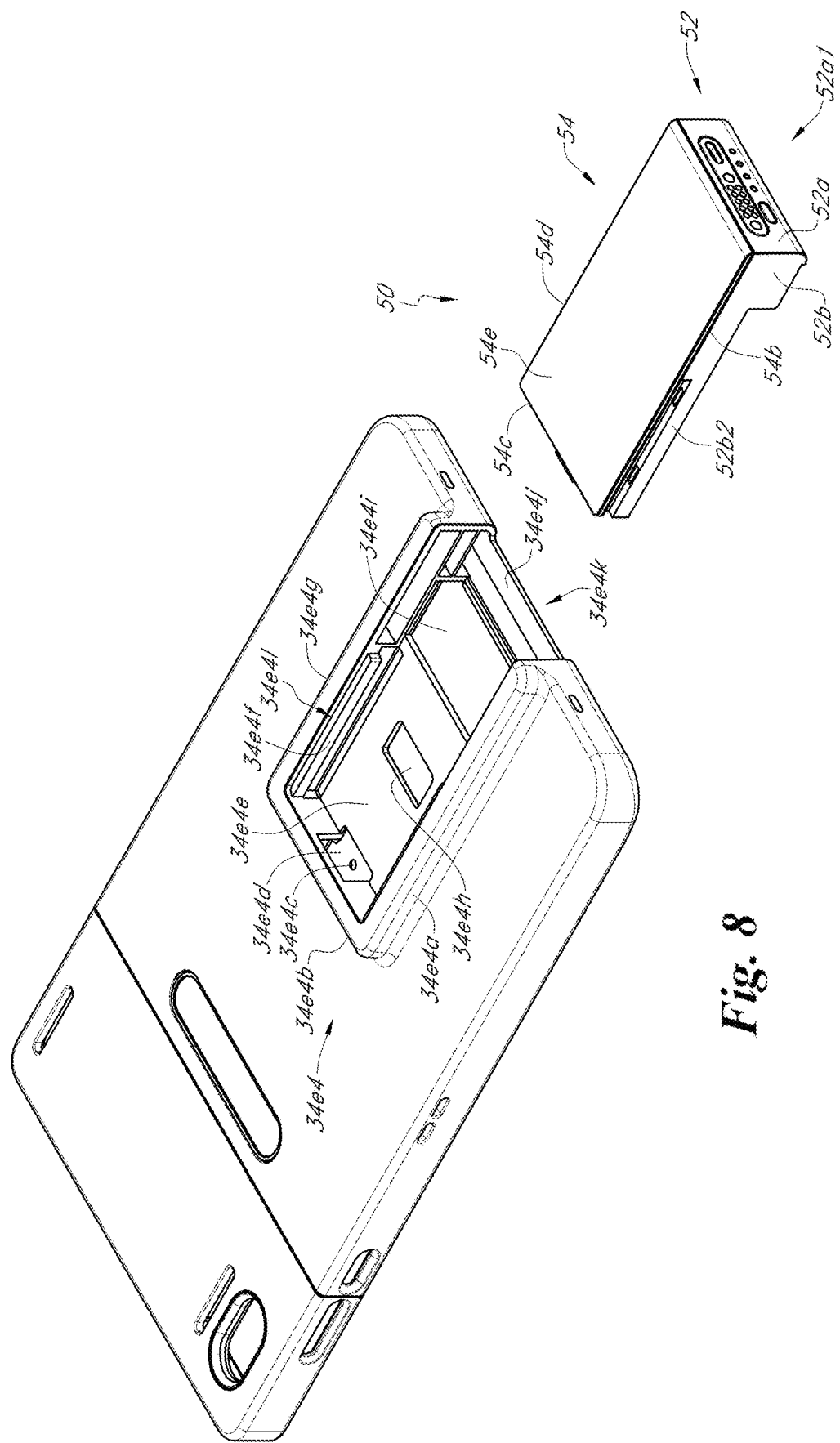
FIG. 8 is a rear-bottom perspective view of the accessory assembly of FIG. 1 uncoupled from the case assembly of FIG. 12.

Turning to FIG. 8, depicted therein is a rear-bottom perspective view of accessory assembly 50 uncoupled from device case assembly 30. Depicted implementation of coupler assembly 34e4 is shown to include side wall 34e4a, side wall 34e4b, aperture 34e4c, aperture 34e4d, raised base portion 34e4e, elongated protrusion 34e4f, side wall 34e4g, aperture 34e4h, aperture 34e4i, recessed base portion 34e4j, opening 34e4k, and interior area 34e4l. As depicted, interior area 34e4l is in part bounded by side wall 34e4a, side wall 34e4b, raised base portion 34e4e, side wall 34e4g, and recessed base portion 34e4j to couple with accessory assembly 50.

Figure 9:
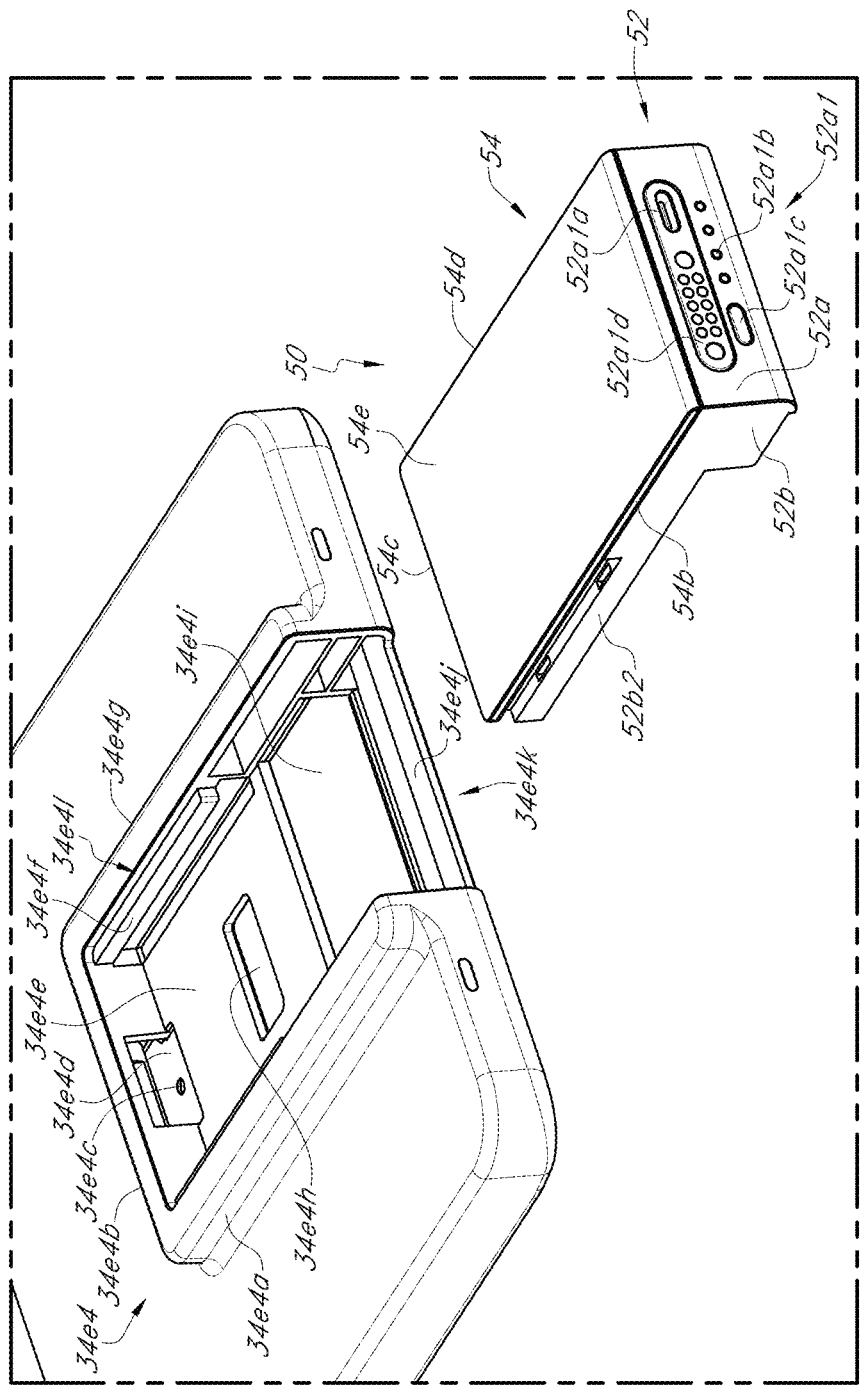
FIG. 9 is a rear-bottom perspective view of the accessory assembly of FIG. 1 uncoupled from a portion of the case assembly of FIG. 12.

Turning to FIG. 9, depicted therein is a rear-bottom perspective view of accessory assembly 50 uncoupled from a portion of device case assembly 30.

Figure 10:
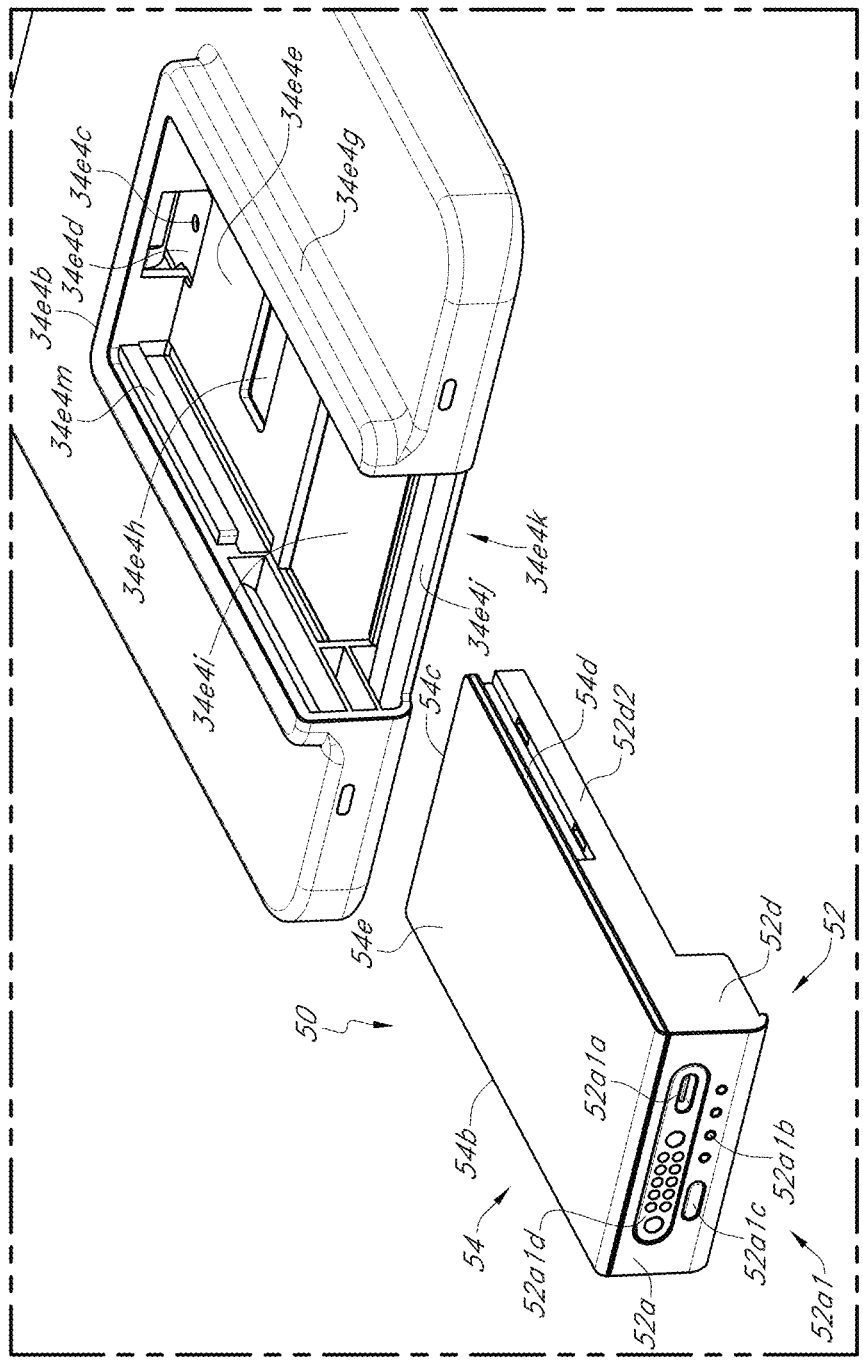
FIG. 10 is a rear-bottom perspective view of the accessory assembly of FIG. 1 uncoupled from a portion of the case assembly of FIG. 12.

Turning to FIG. 10, depicted therein is a rear-bottom perspective view of accessory assembly 50 uncoupled from a portion of device case assembly 30. Depicted implementation of coupler assembly 34e4 is shown to include elongated protrusion 34e4m.

Figure 11:
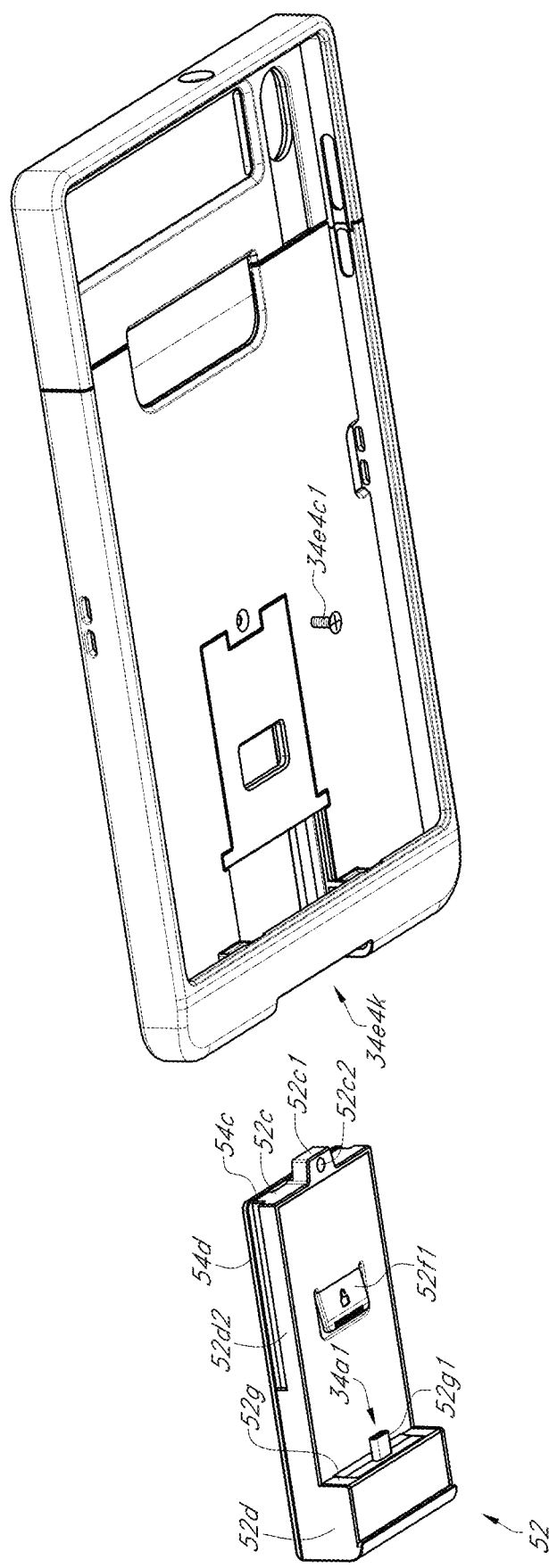
FIG. 11 is a front-top perspective view of the accessory assembly of FIG. 1 uncoupled from the case assembly of FIG. 12.

Turning to FIG. 11, depicted therein is a front-top perspective view of accessory assembly 50 uncoupled from device case assembly 30. Depicted implementation of aperture 34e4c is shown to include threaded coupler 34e4c1.

Figure 12:
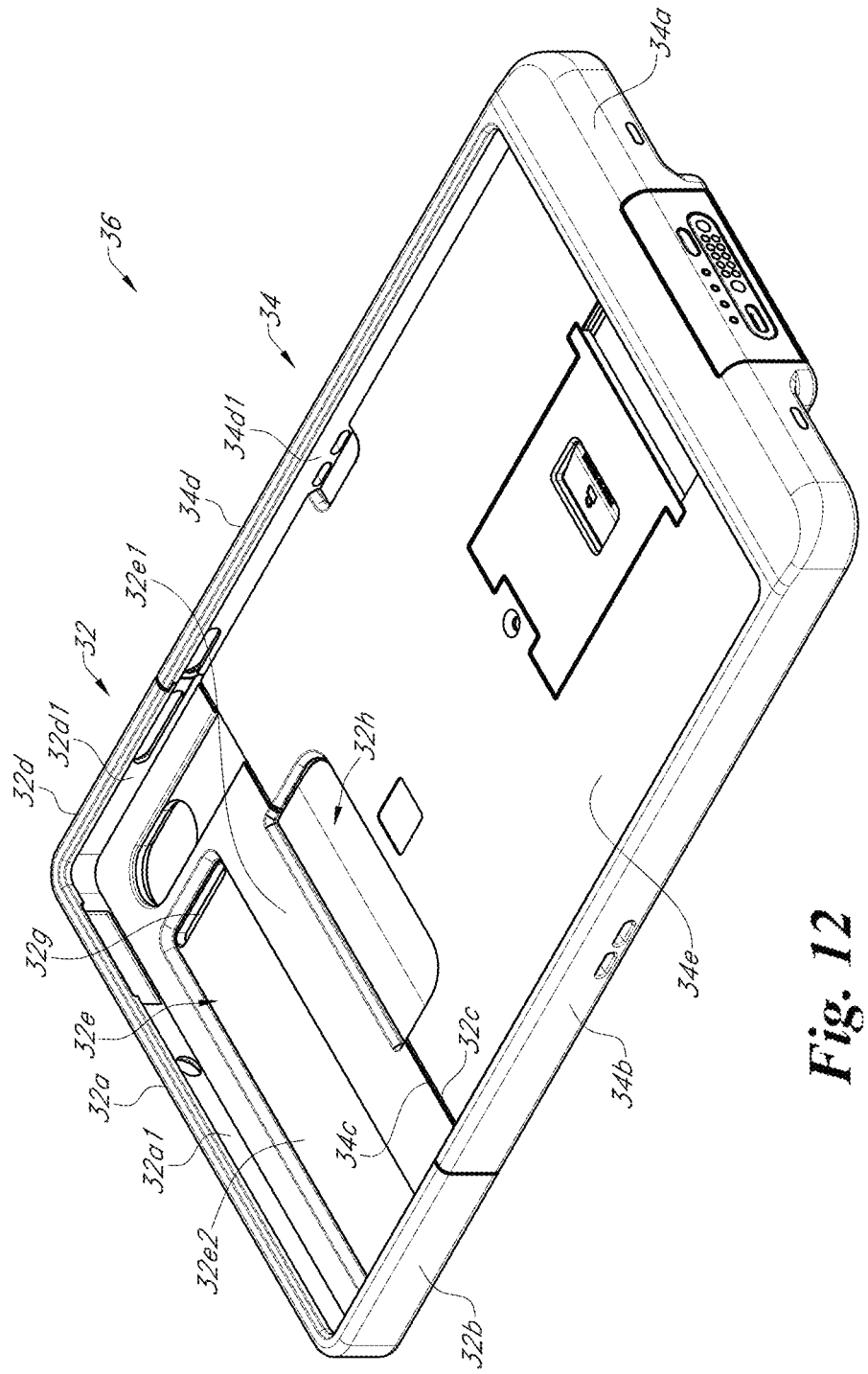
FIG. 12 is a rear-top-perspective view of the cap assembly of FIG. 56 and a main assembly coupled together to form a case assembly.

Turning to FIG. 12, depicted therein is a rear top perspective view of cap assembly 32 and main assembly 34 coupled together to form device case assembly 30. Depicted implementation of cap assembly 32 is shown to include elongated groove 32d1, raised portion 32e1, and recessed portion 32e2. As depicted, side wall 32b and side wall 32d extend perpendicular with respect to side wall 32a. As depicted, side edge 32c extends parallel with respect to side wall 32a. As depicted, side edge 32c is spaced from side wall 32a along side wall 32b and side wall 32d.

Depicted implementation of main assembly 34 is shown to include side wall 34a, side wall 34b, side edge 34c, side wall 34d, groove 34d1, and base 34e. As depicted, side wall 34b and side wall 34d extend perpendicular with respect to side wall 34a. As depicted, side edge 34c extends parallel with respect to side wall 34a. As depicted, when cap assembly 32, and cap assembly 32, are coupled together, side wall 32a, side wall 32b, side wall 32d, and base 32e of cap assembly 32, and side wall 34a, side wall 34b, side wall 32d, and base 34e of main assembly 34 form an interior area to couple with portable electronic tablet device implementation 100 (shown in FIG. 16).

Figure 13:
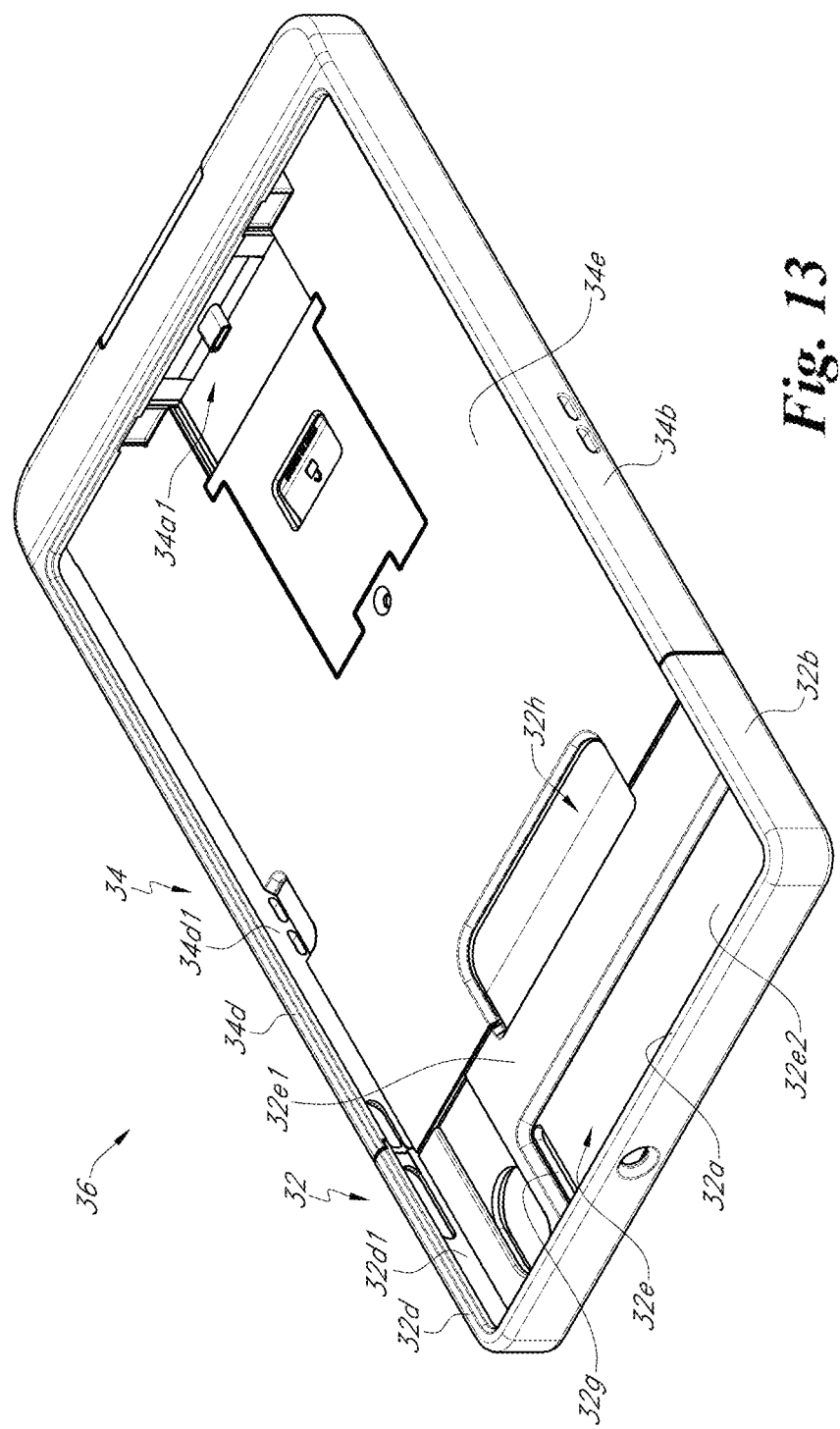
FIG. 13 is a front-top-perspective view of the case assembly of FIG. 12.

Turning to FIG. 13, depicted therein is a front-top-perspective view of device case assembly 30. Depicted implementation of main assembly 34 is shown to include portable electric interface 34a1.

Figure 14:
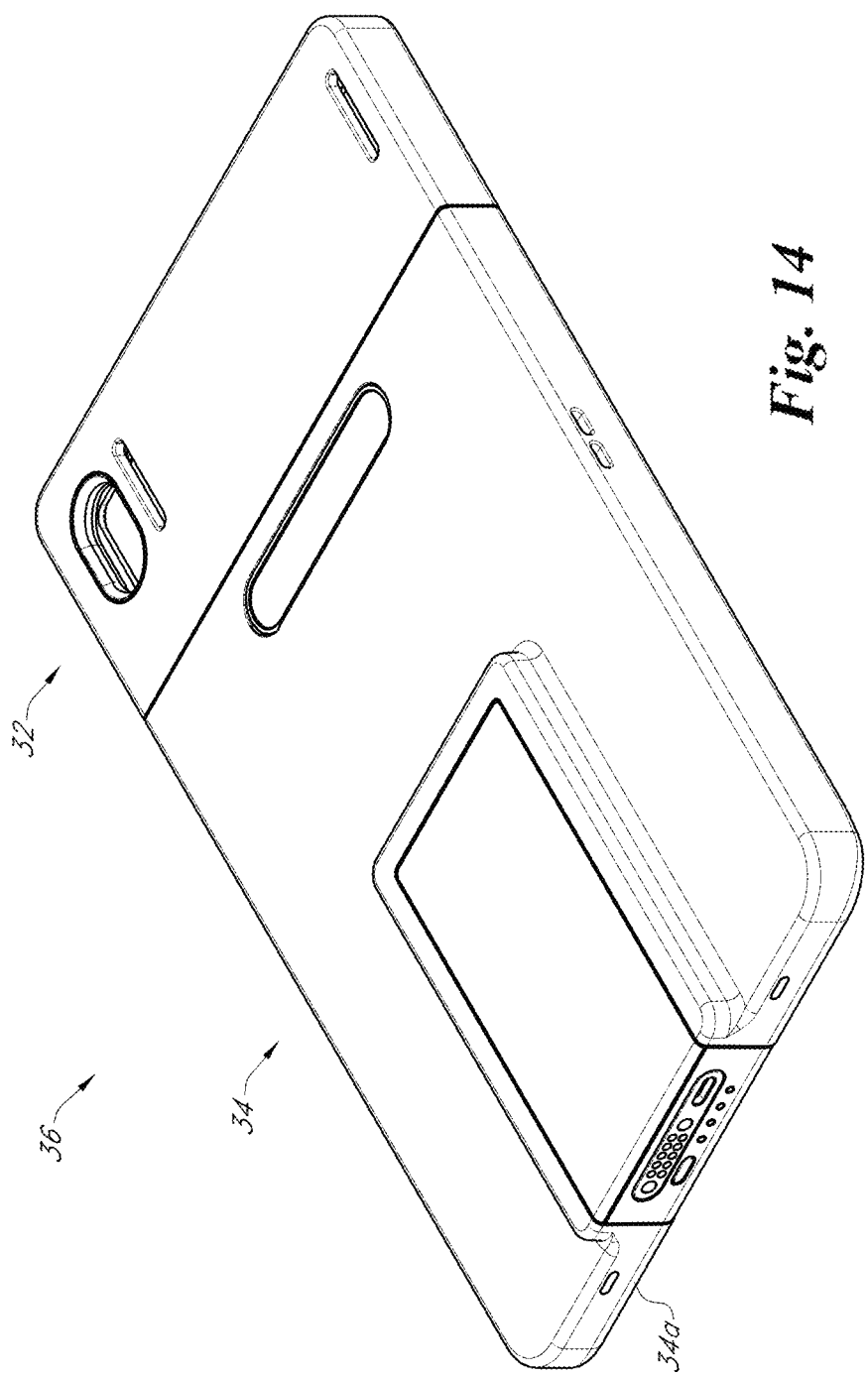
FIG. 14 is a rear-bottom-perspective view of the case assembly of FIG. 12.

Turning to FIG. 14, depicted therein is a rear-bottom-perspective view of device case assembly 30.

Figure 15:
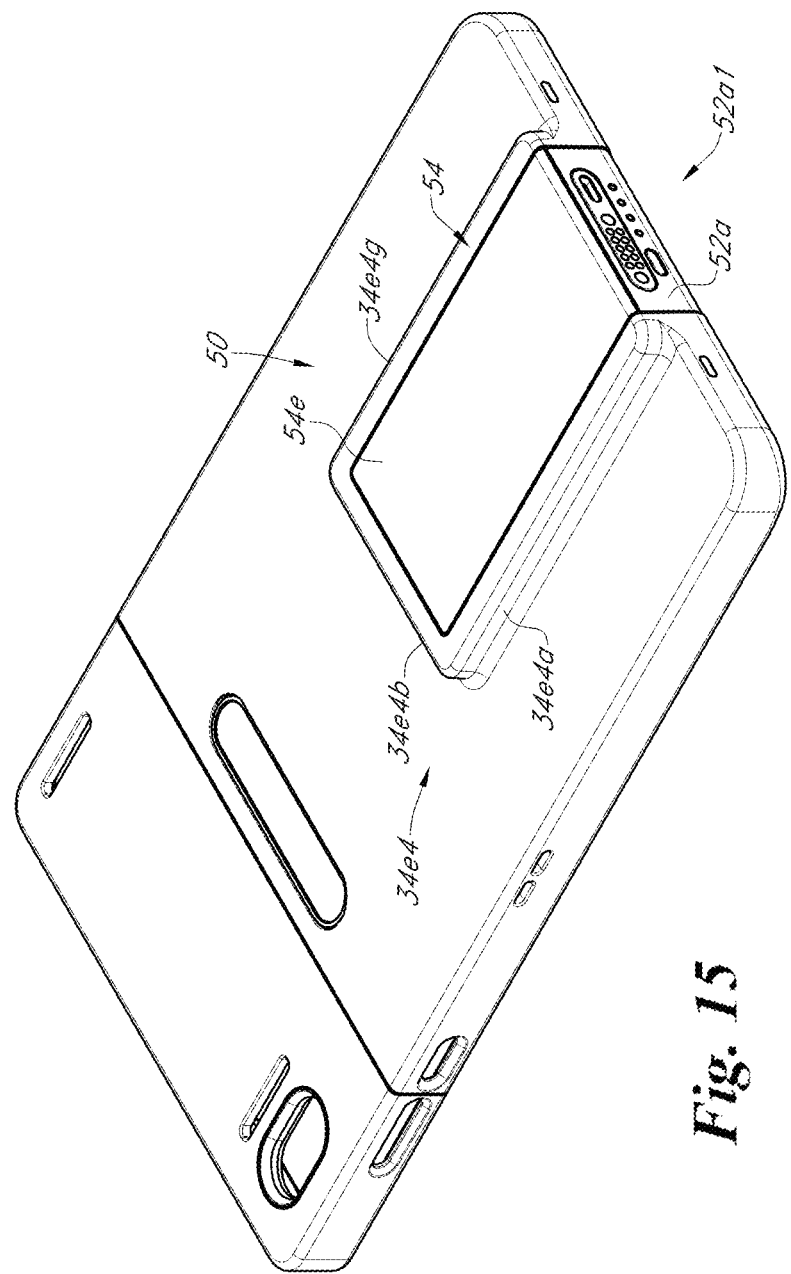
FIG. 15 is a rear-bottom-perspective view of the accessory assembly of FIG. 1 coupled with the case assembly of FIG. 12.

Turning to FIG. 15, depicted therein is a rear-bottom perspective view of accessory assembly 50 coupled with device case assembly 30.

Figure 16:
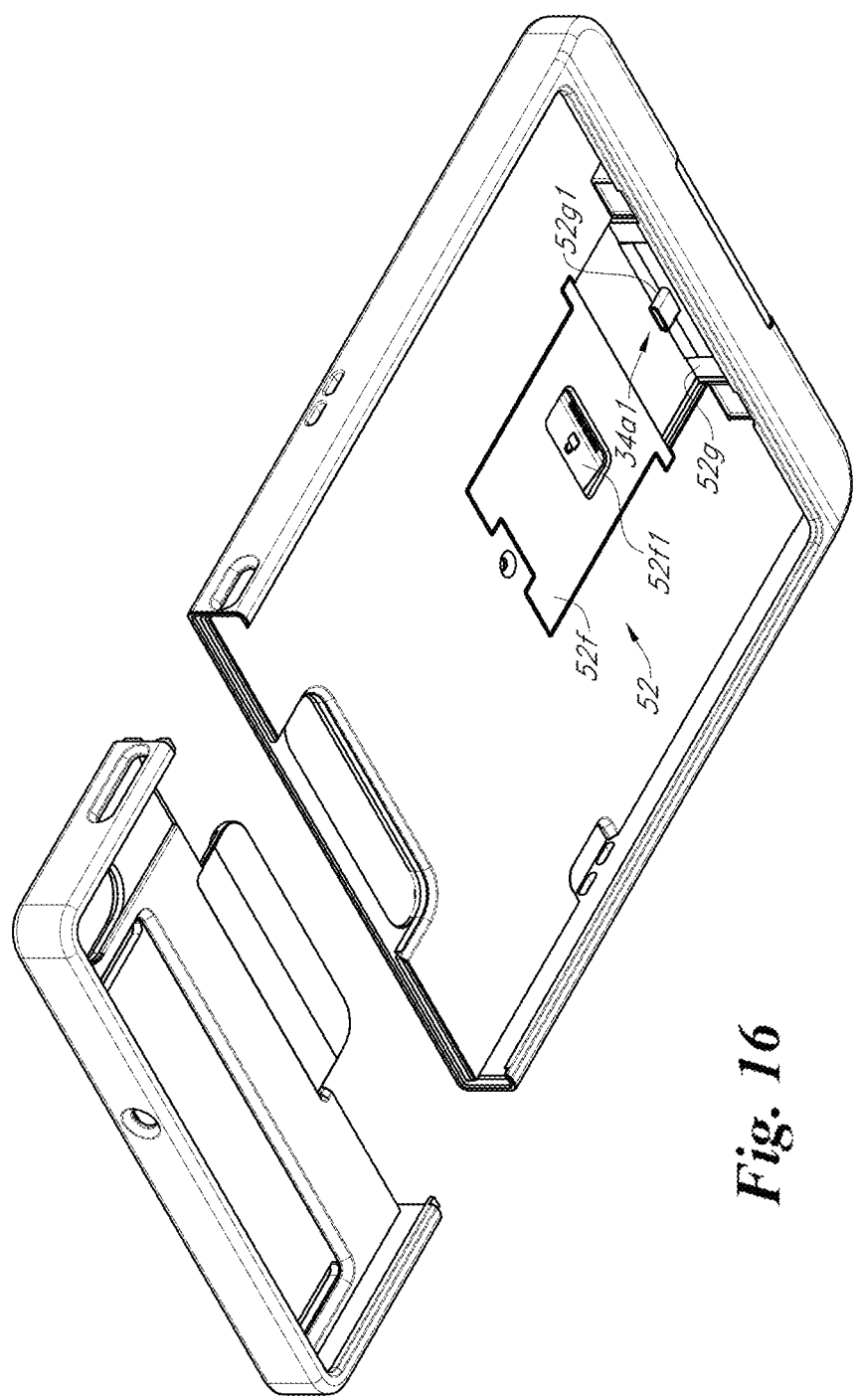
FIG. 16 is a front-top perspective view of the accessory assembly of FIG. 1 coupled with a portion of an exploded view of the case assembly of FIG. 12.

Turning to FIG. 16, depicted therein is a front-top perspective view of accessory assembly 50 coupled with a portion of an exploded view of device case assembly 30.

Figure 17:
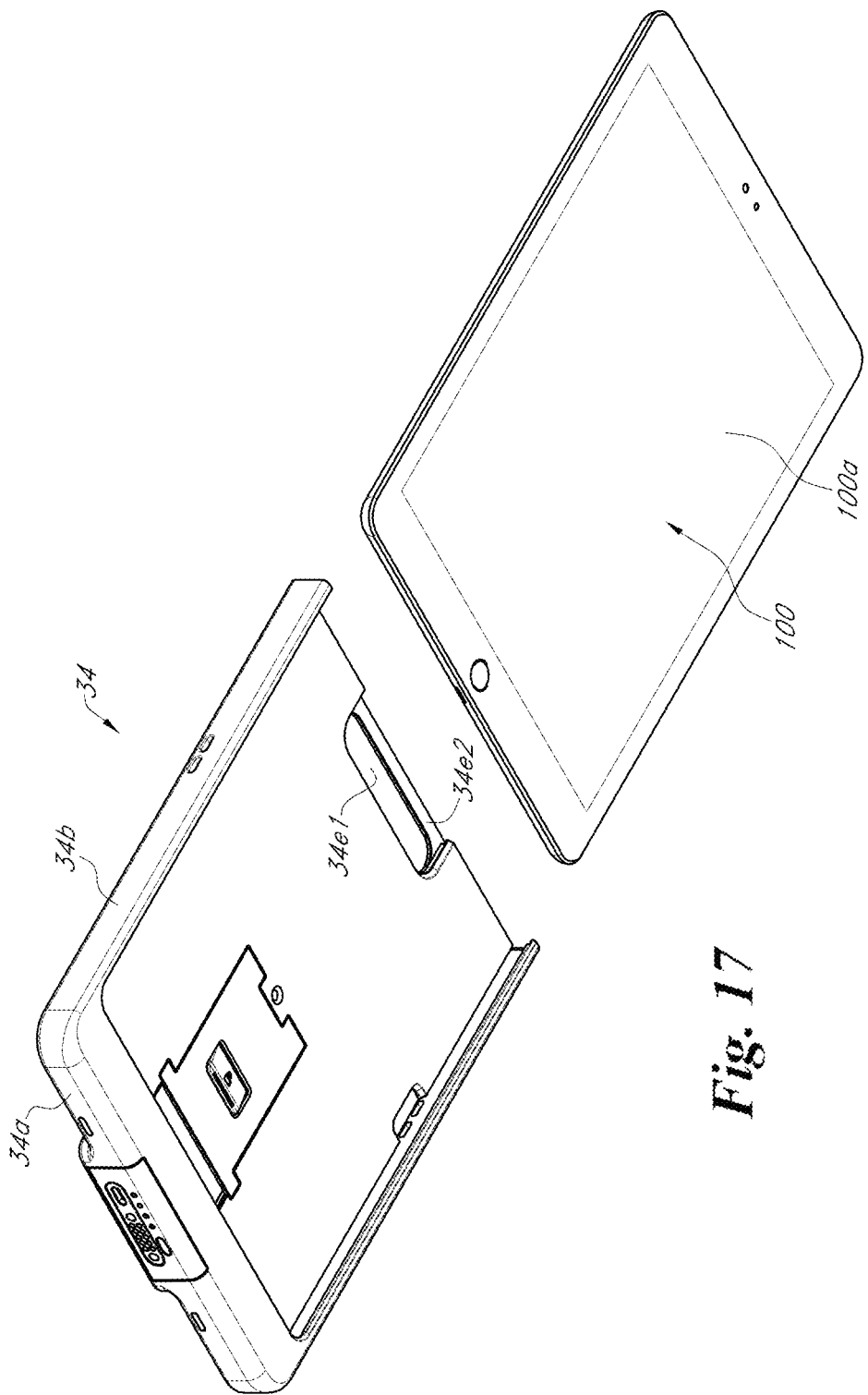
FIG. 17 is a front-rear perspective of a portion of the case assembly of FIG. 12 and an electronic device.

Turning to FIG. 17, depicted therein is a front-rear perspective of a portion of device case assembly 30 and portable electronic tablet device implementation 100 with display 100a.

Figure 18:
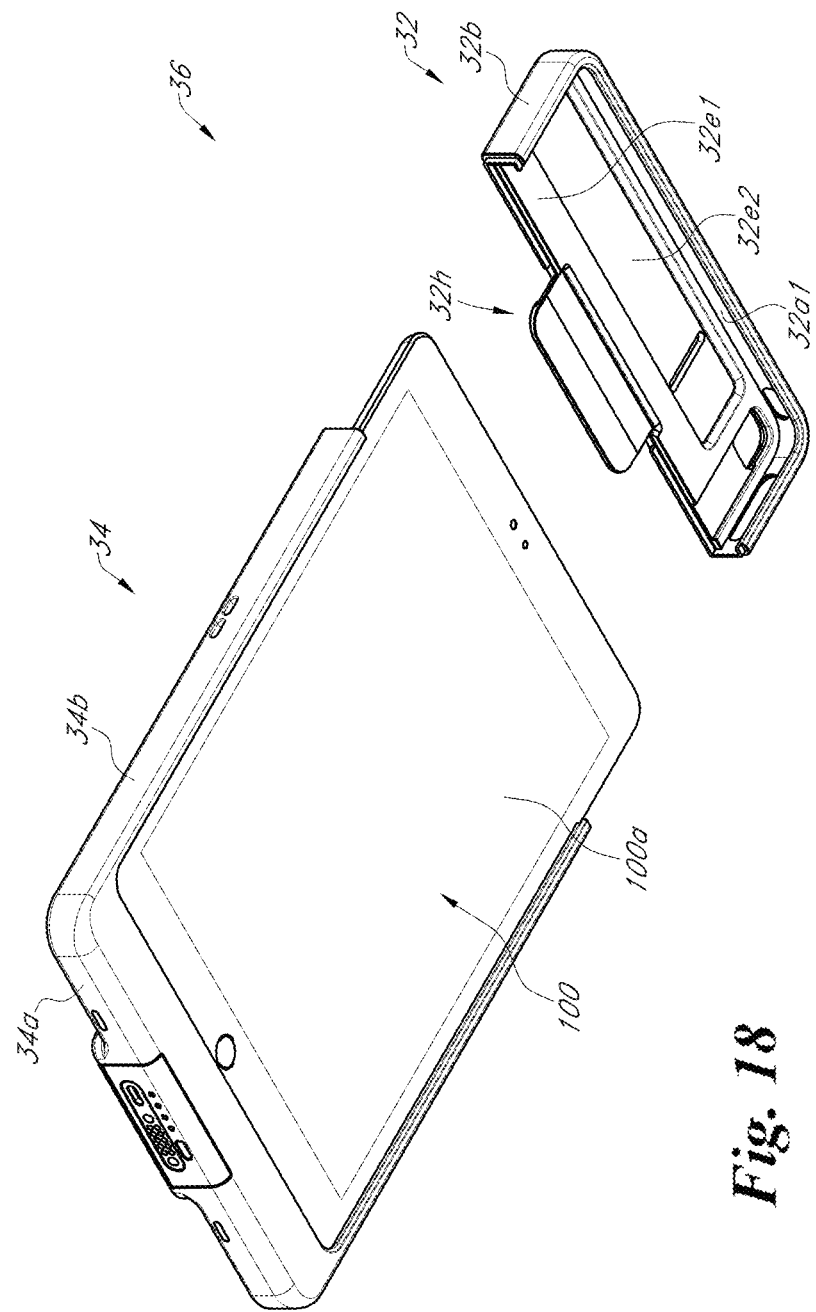
FIG. 18 is a front-rear perspective of a portion of the case assembly of FIG. 12 and the electronic device of FIG. 17.

Turning to FIG. 18, depicted therein is a front-rear perspective of a portion of device case assembly 30 and portable electronic tablet device implementation 100.

Figure 19:
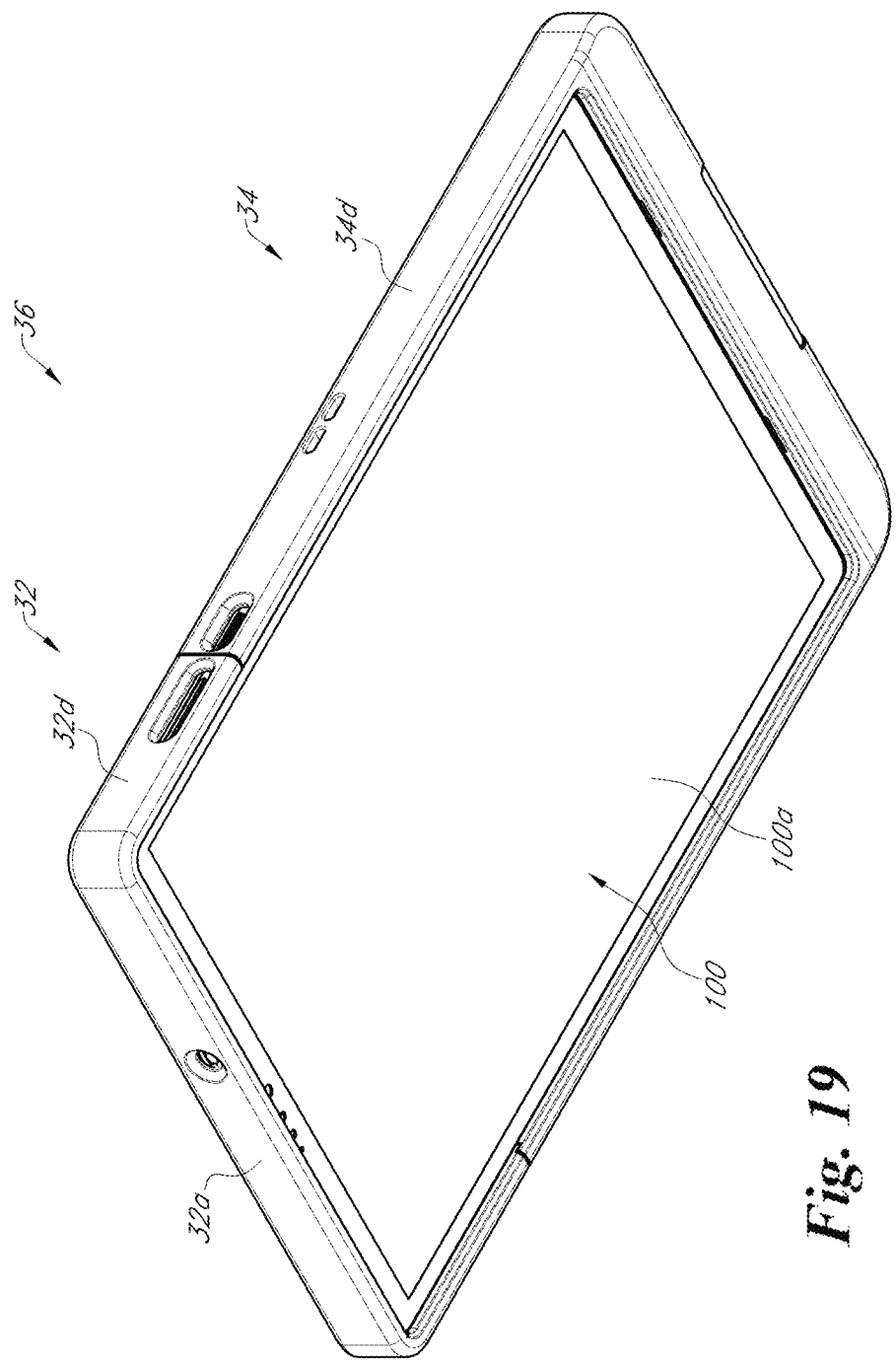
FIG. 19 is a front-rear perspective of a portion of the case assembly of FIG. 12 and the electronic device of FIG. 17.

Turning to FIG. 19, depicted therein is a front-rear perspective of a portion of device case assembly 30 and portable electronic tablet device implementation 100.

Figure 20:
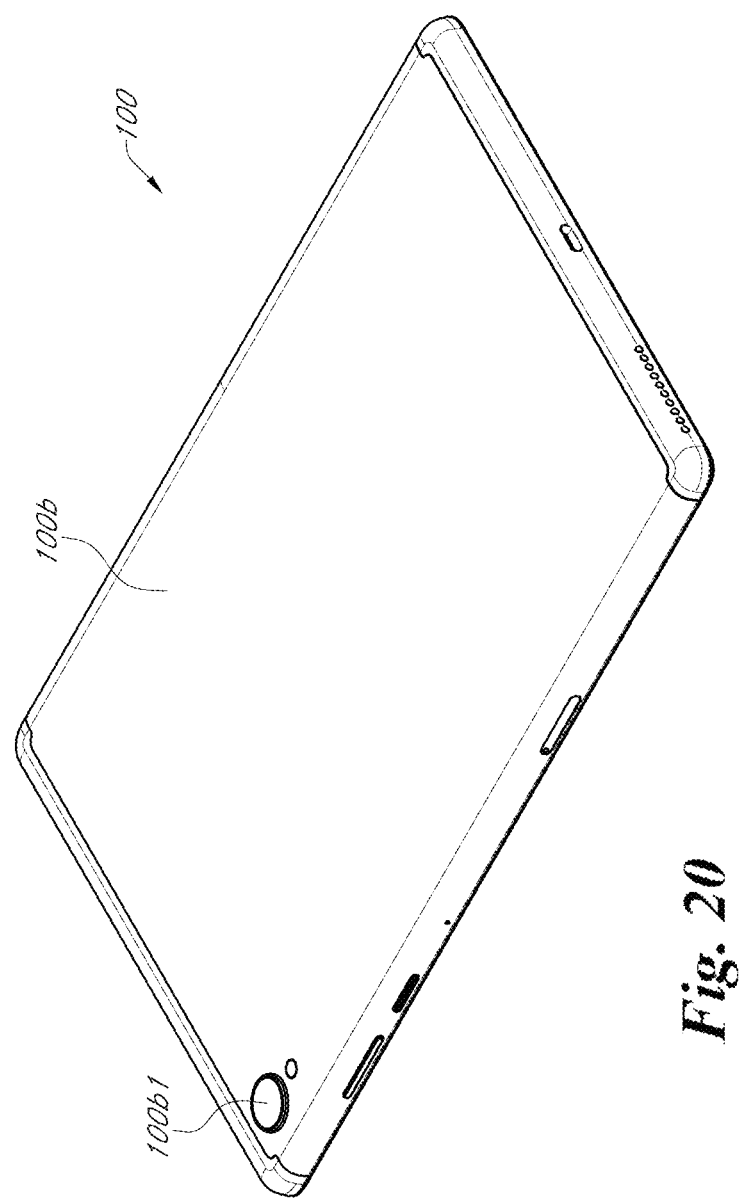
FIG. 20 is a bottom perspective view of the electronic device of FIG. 17.

Turning to FIG. 20, depicted therein is a bottom perspective view of portable electronic tablet device implementation 100. Depicted implementation of portable electronic tablet device implementation 100 is shown to include camera 100b1.

Figure 21:
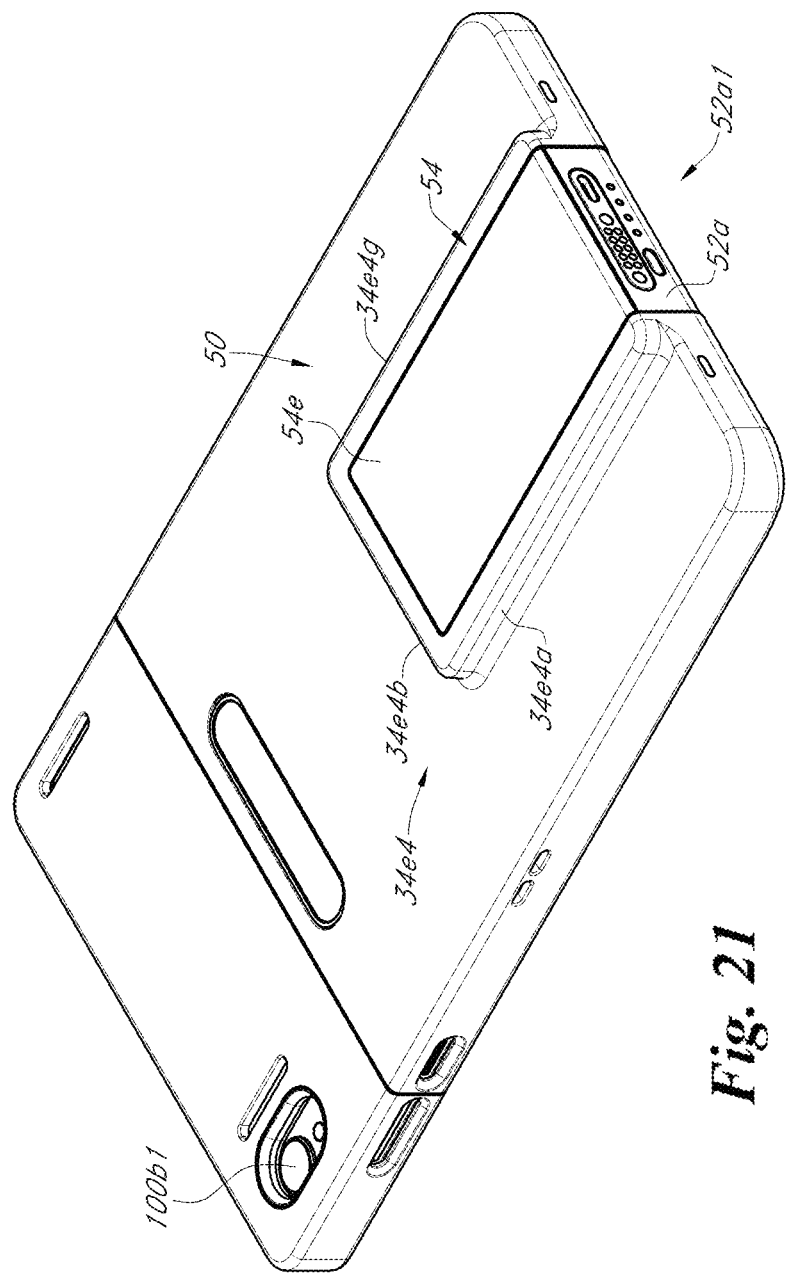
FIG. 21 is a rear-bottom perspective view of the accessory assembly of FIG. 1 coupled with the case assembly of FIG. 12 which is coupled with the electronic device of FIG. 17.

Turning to FIG. 21, depicted therein is a rear-bottom perspective view of accessory assembly 50 coupled with device case assembly 30 which is coupled with portable electronic tablet device implementation 100.

Figure 22:
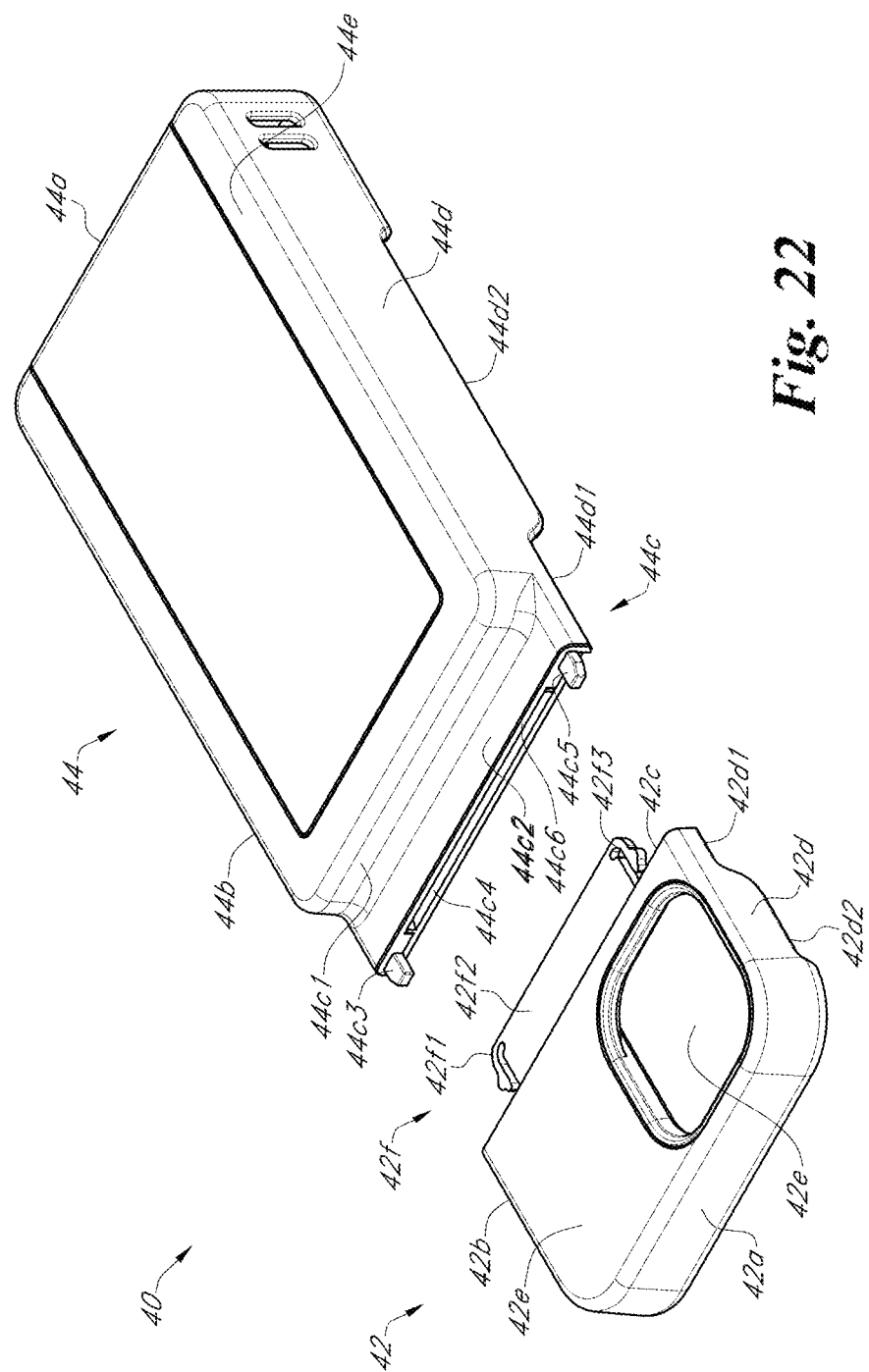
FIG. 22 is a partial-exploded-front-bottom-perspective view of a case assembly.

Turning to FIG. 22, depicted therein is a partial-exploded-front-bottom-perspective view of case assembly 40. Depicted implementation of case assembly 40 is shown to include cap assembly 42, and main assembly 44. Depicted implementation of cap assembly 42 is shown to include side wall 42a, side wall 42b, edge 42c, side wall 42d, aperture 42e, and tab member 42f. Depicted implementation of side wall 42d is shown to include recess 42d1, and recess 42d2. Depicted implementation of tab member 42f is shown to include tab body 42f2 with semi-flexible protrusion 42f1 and semi-flexible protrusion 42f3 extending therefrom.

Depicted implementation of main assembly 44 is shown to include side wall 44a, side wall 44b, side assembly 44c, side wall 44d, and base 44e. Depicted implementation of side assembly 44c is shown to include side wall portion 44c1, extended portion 44c2, protrusion 44c3, aperture 44c4, protrusion 44c5, and edge 44c6. Depicted implementation of side wall 44d is shown to include recess 44d1, and recess 44d2.

Figure 23:
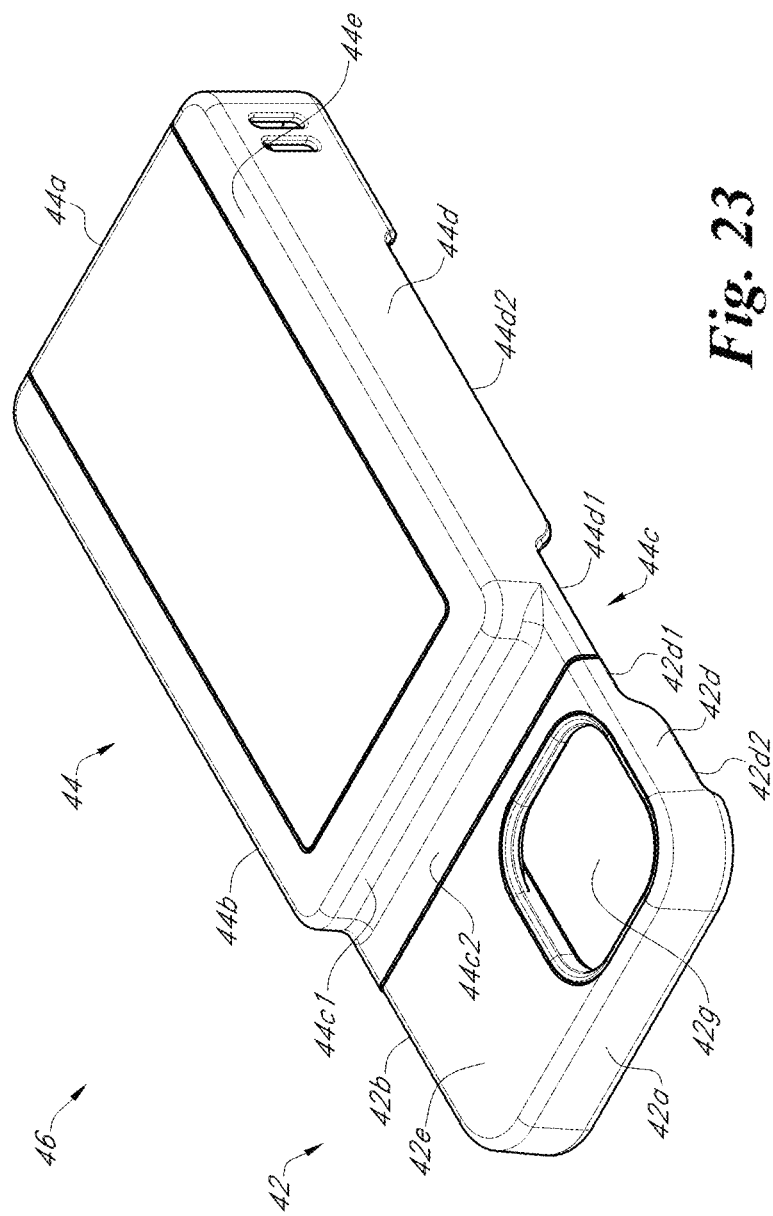
FIG. 23 is a front-bottom-perspective view of the case assembly of FIG. 22.

Turning to FIG. 23, depicted therein is a front-bottom-perspective view of case assembly 40.

Figure 24:
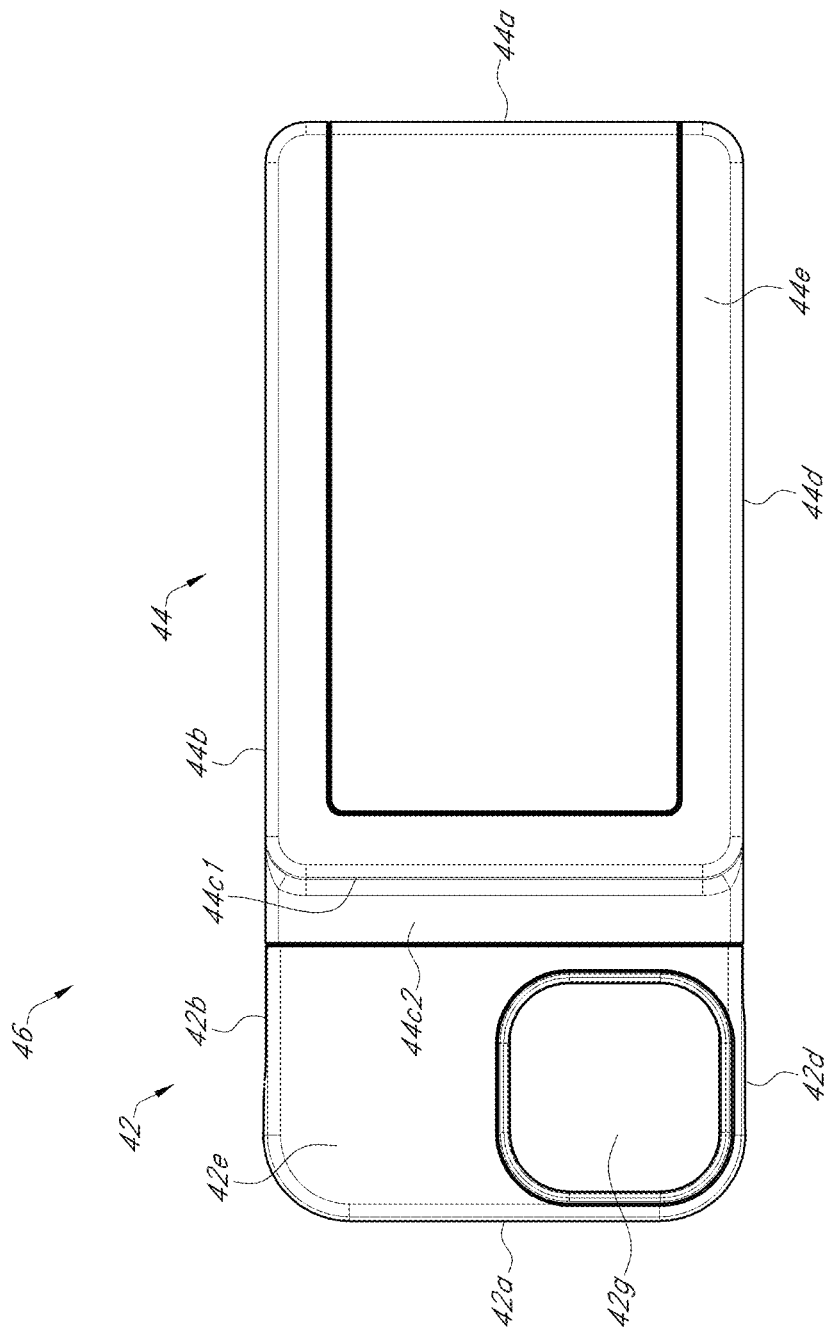
FIG. 24 is a bottom-plan view of the case assembly of FIG. 22.

Turning to FIG. 24, depicted therein is a bottom-plan view of case assembly 40.

Figure 25:
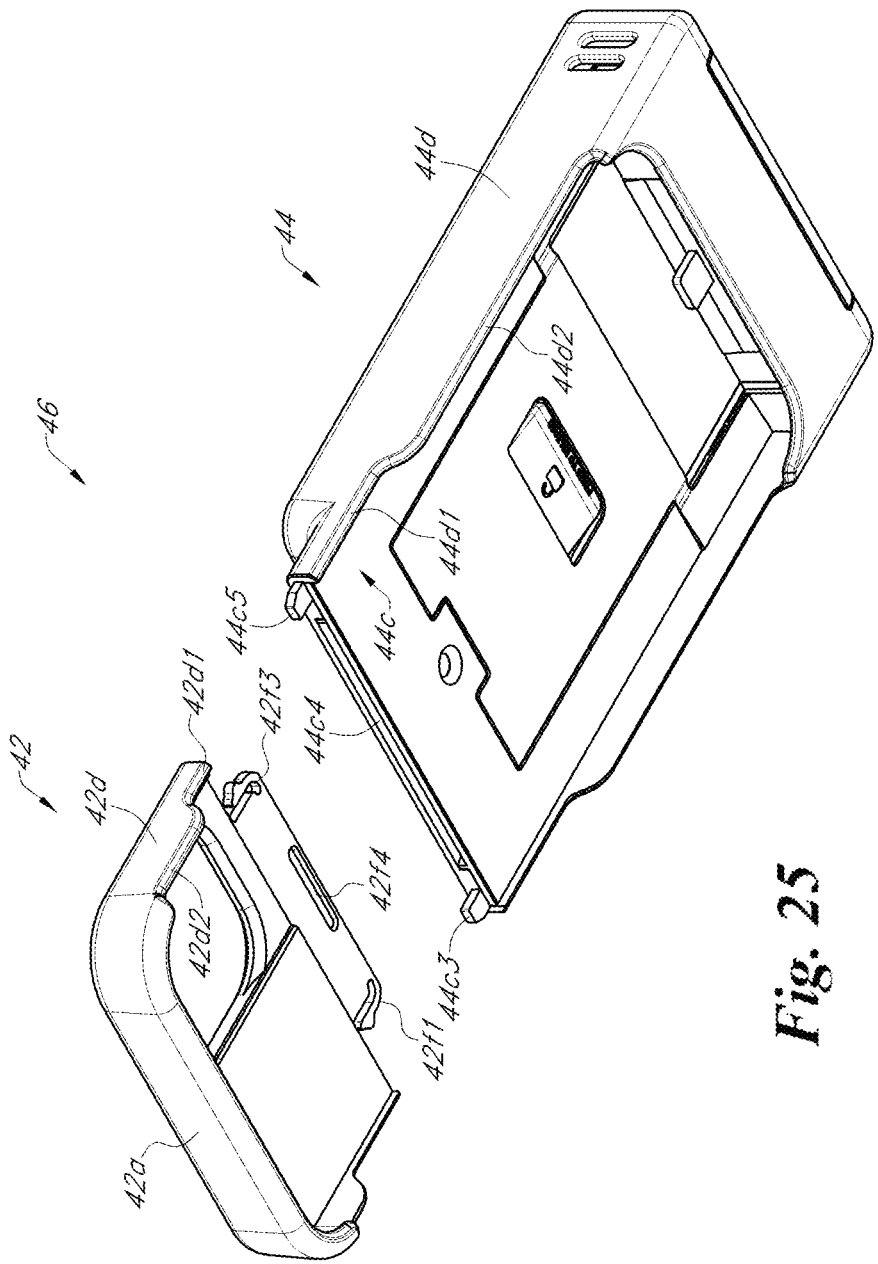
FIG. 25 is a partial-exploded-front-top-perspective view of the case assembly of FIG. 22.

Turning to FIG. 25, depicted therein is a partial-exploded-front-top-perspective view of case assembly 40. Depicted implementation of tab member 42f is shown to include recess 42f4.

Figure 26:
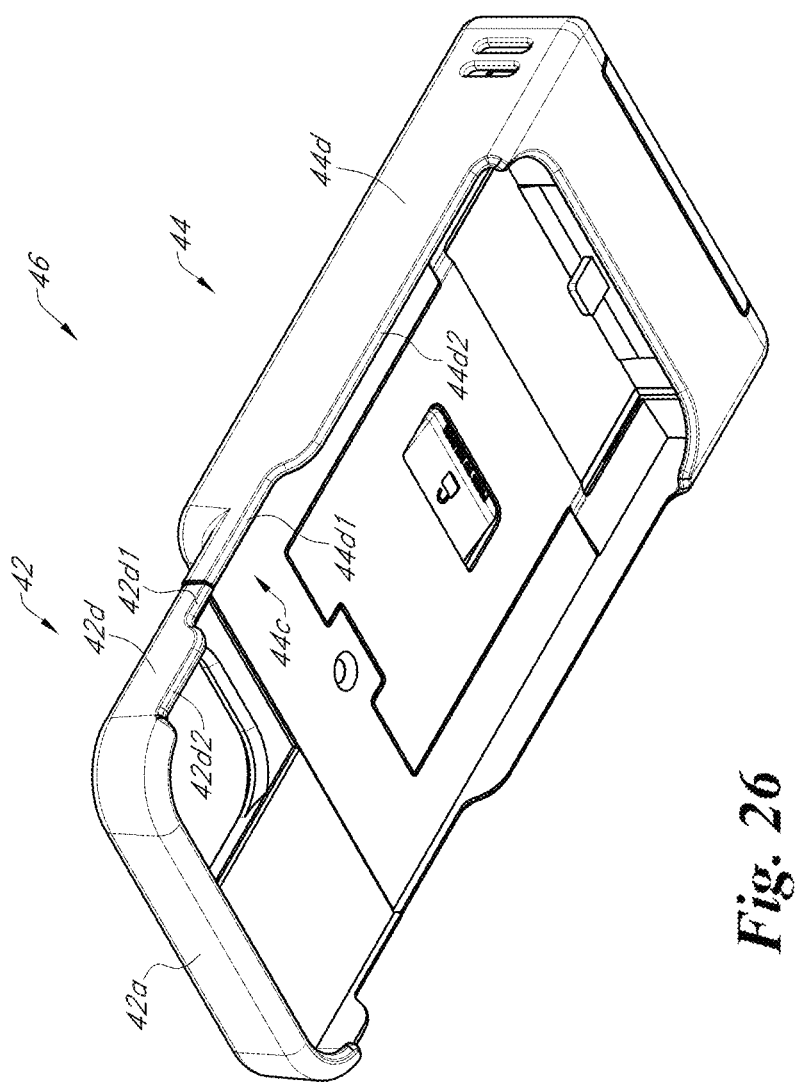
FIG. 26 is a front-top-perspective view of the case assembly of FIG. 22.

Turning to FIG. 26, depicted therein is a front-top-perspective view of case assembly 40.

Figure 27:
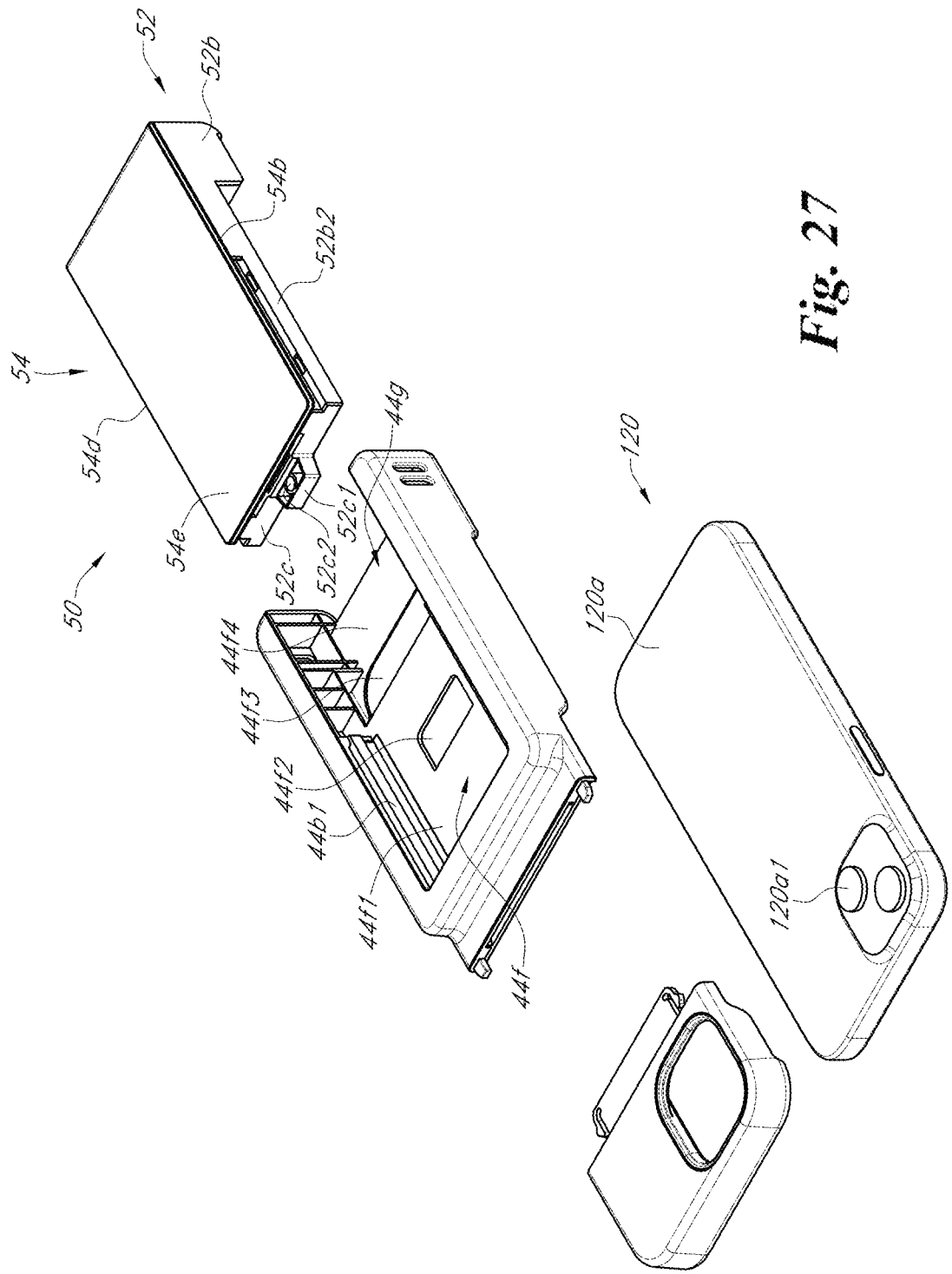
FIG. 27 is an exploded front-bottom perspective view of the case assembly of FIG. 22, the accessory assembly of FIG. 1, and an electronic device.

Turning to FIG. 27, depicted therein is an exploded front-bottom perspective view of case assembly 40, accessory assembly 50, and portable electronic phone device implementation 120. Depicted implementation of main assembly 44 is shown to include elongated protrusion 44b1, and interior area 44f with raised base portion 44f1, aperture 44f2, aperture 44f3, and recessed base portion 44f4. Depicted implementation of portable electronic phone device implementation 120 is shown to include back 120a with camera 120a1.

Figure 28:
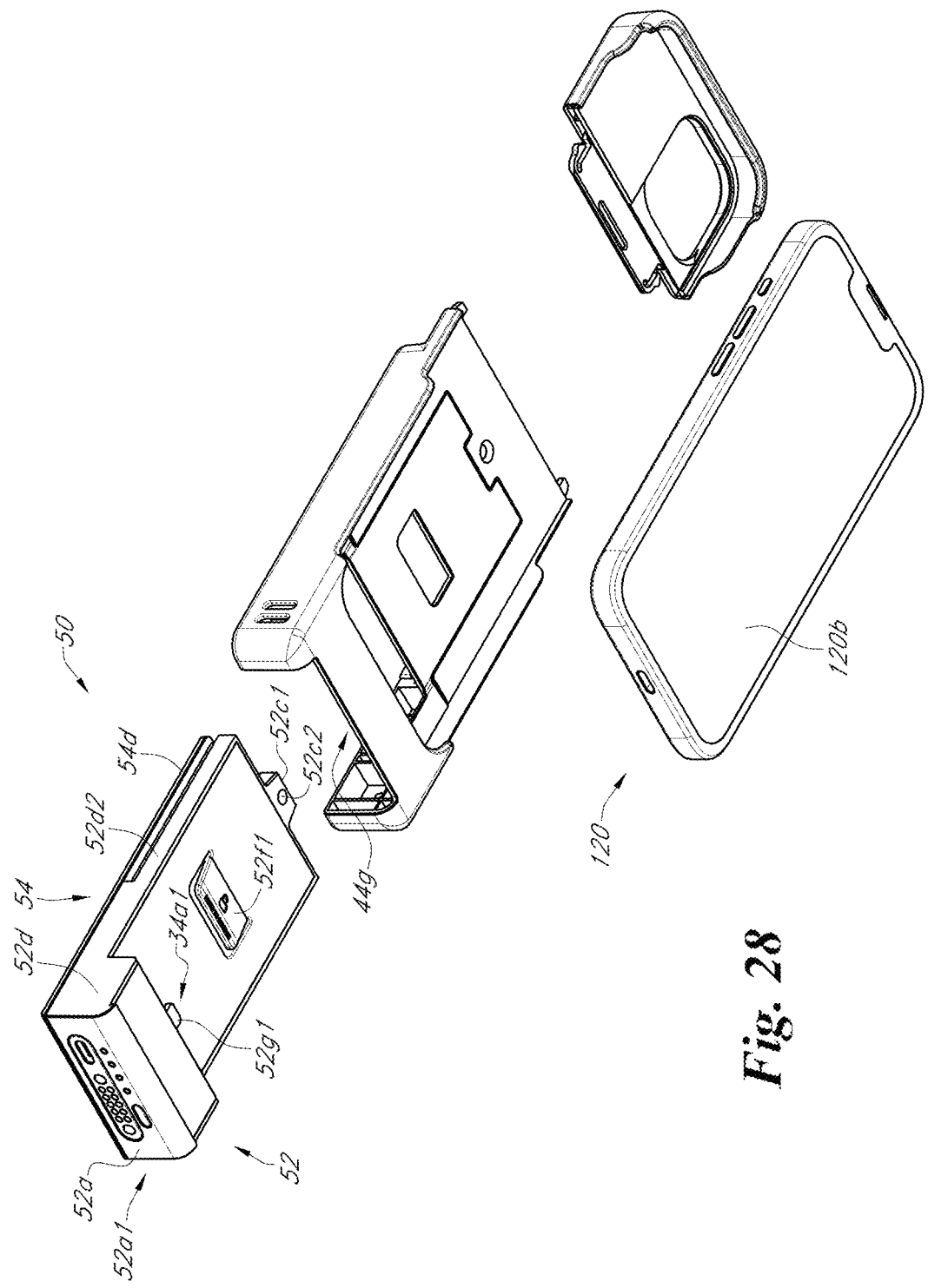
FIG. 28 is an exploded rear-top perspective view of the case assembly of FIG. 22, the accessory assembly of FIG. 1, and an electronic device.

Turning to FIG. 28, depicted therein is an exploded rear-top perspective view of case assembly 40, accessory assembly 50, and portable electronic phone device implementation 120. Depicted implementation of portable electronic phone device implementation 120 is shown to include front 120b.

Figure 29:
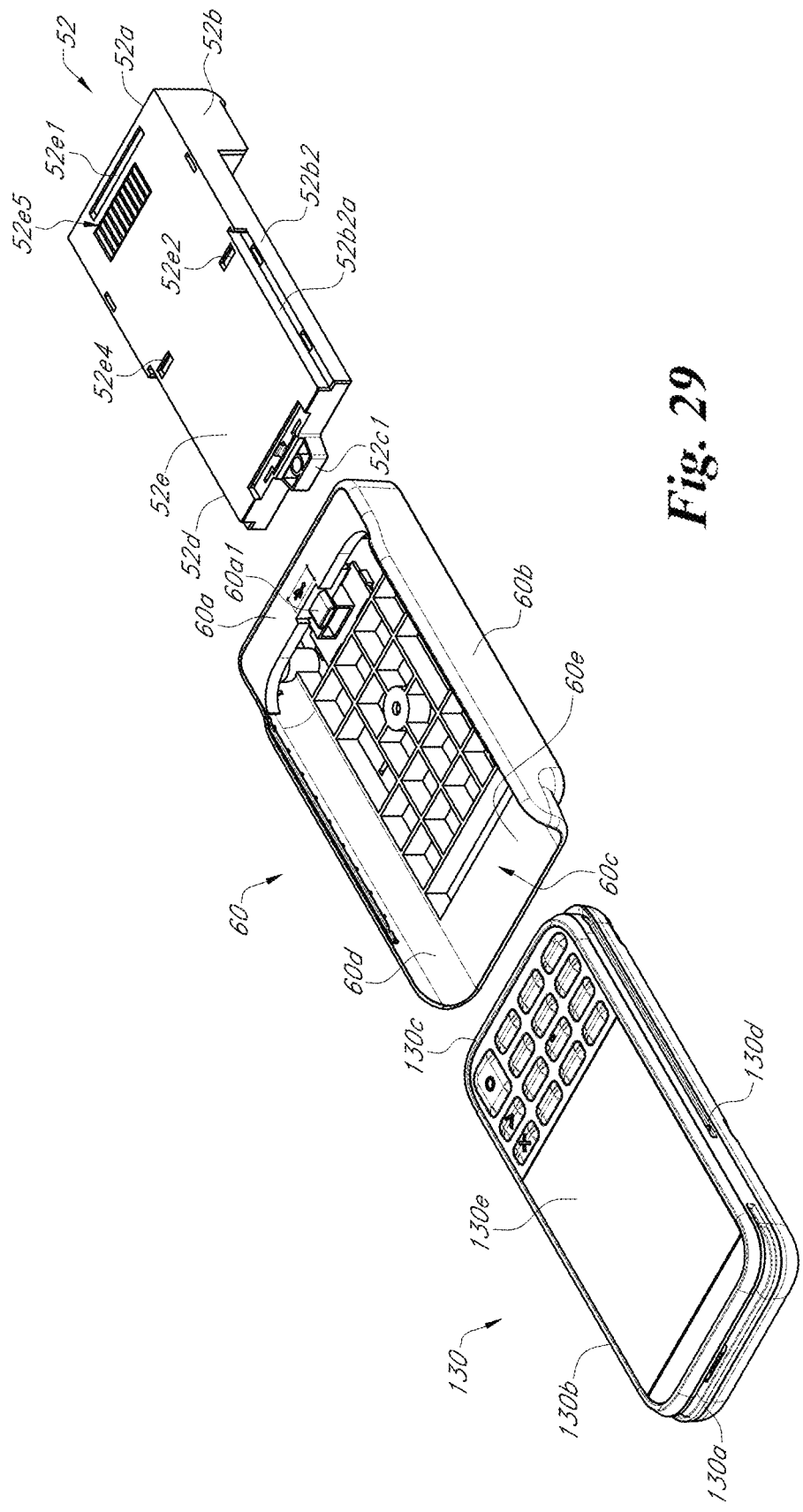
FIG. 29 is an exploded front-bottom perspective view of a portion of the accessory assembly of FIG. 1, an interface assembly, and a keypad assembly.

Turning to FIG. 29, depicted therein is an exploded front-bottom perspective view of a portion of accessory assembly 50, interface assembly 60, and payment card reader assembly 130. Depicted implementation of interface assembly 60 is shown to include end wall 60a with electric plug 60a1, side wall 60b, interior area 60c, side wall 60d, and base 60e. Depicted implementation of payment card reader assembly 130 is shown to include side 130a, side 130b, side 130c, side 130d, and side 130e.

Figure 30:
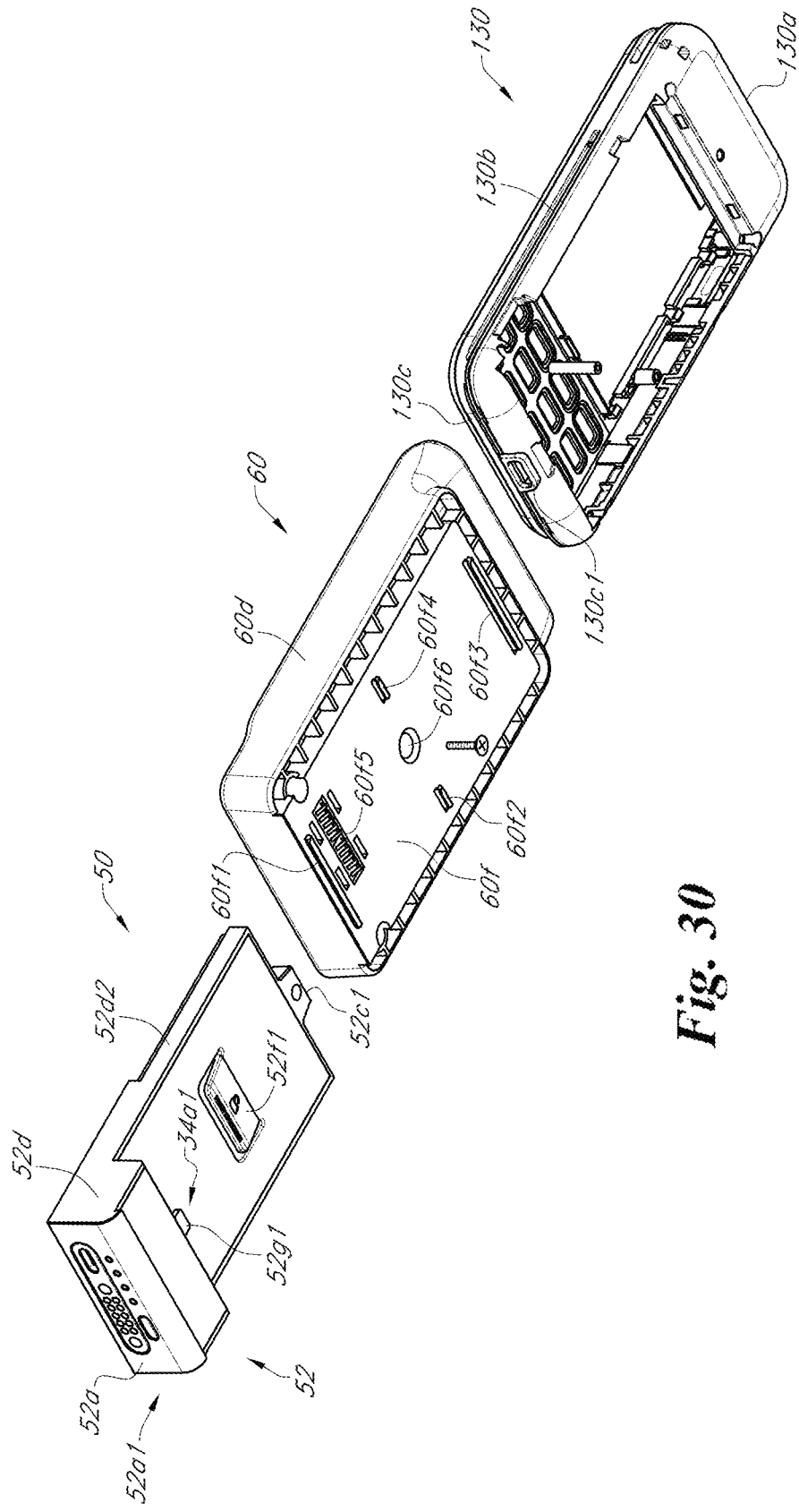
FIG. 30 is an exploded rear-top perspective view of a portion of the accessory assembly of FIG. 1, the interface assembly of FIG. 88, and the keypad assembly of FIG. 29.

Turning to FIG. 30, depicted therein is an exploded rear-top perspective view of a portion of accessory assembly 50, interface assembly 60, and payment card reader assembly 130. Depicted implementation of base 60f is shown to include prong 60f1, prong 60f2, prong 60f3, prong 60f4, electric contacts interface 60f5, and aperture 60f6. In implementations electric contacts interface 60/5 is sized and positioned to engage with electric contacts interface 52e5 when interface assembly 60 is coupled with main assembly 52. Depicted implementation of side 130c is shown to include receptacle 130c1.

Figure 31:
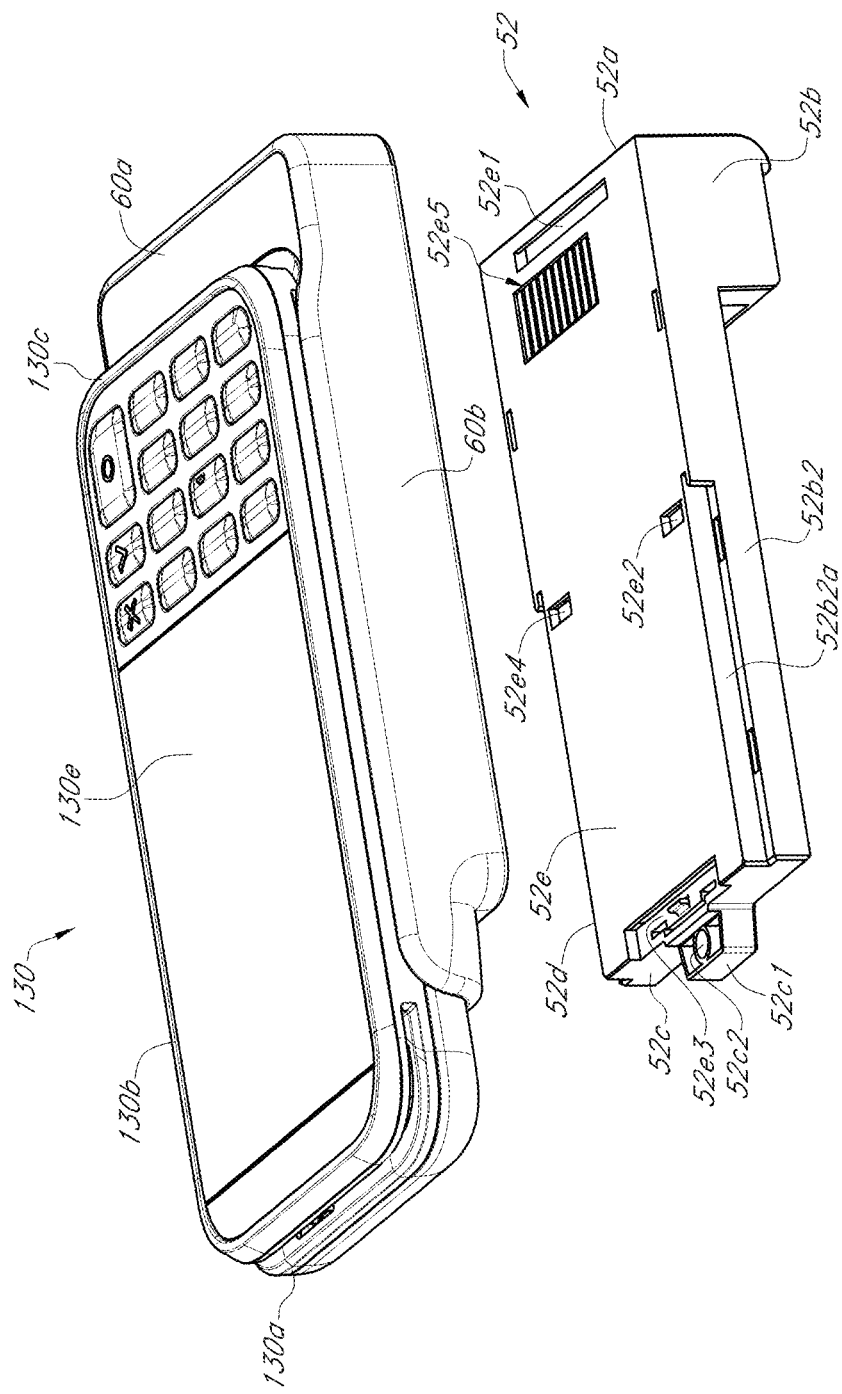
FIG. 31 is a partial exploded front-bottom perspective view of the keypad assembly of FIG. 29 coupled with the interface assembly of FIG. 29, and uncoupled with a portion of the accessory assembly of FIG. 1.

Turning to FIG. 31, depicted therein is a partial exploded front-bottom perspective view of payment card reader assembly 130, coupled with interface assembly 60, and uncoupled with a portion of accessory assembly 50.

Figure 32:
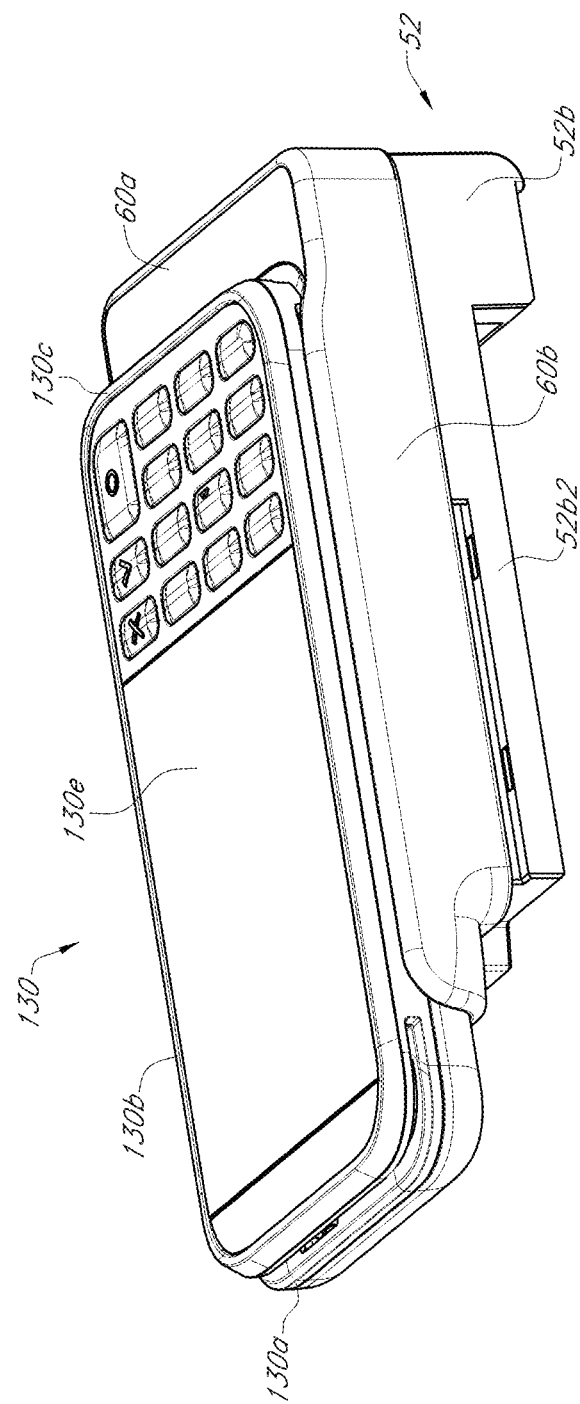
FIG. 32 is a front-bottom perspective view of the keypad assembly of FIG. 29 coupled with the interface assembly of FIG. 29, and coupled with a portion of the accessory assembly of FIG. 1.

Turning to FIG. 32, depicted therein is a front-bottom perspective view of payment card reader assembly 130 coupled with interface assembly 60, and coupled with a portion of accessory assembly 50.

Figure 33:
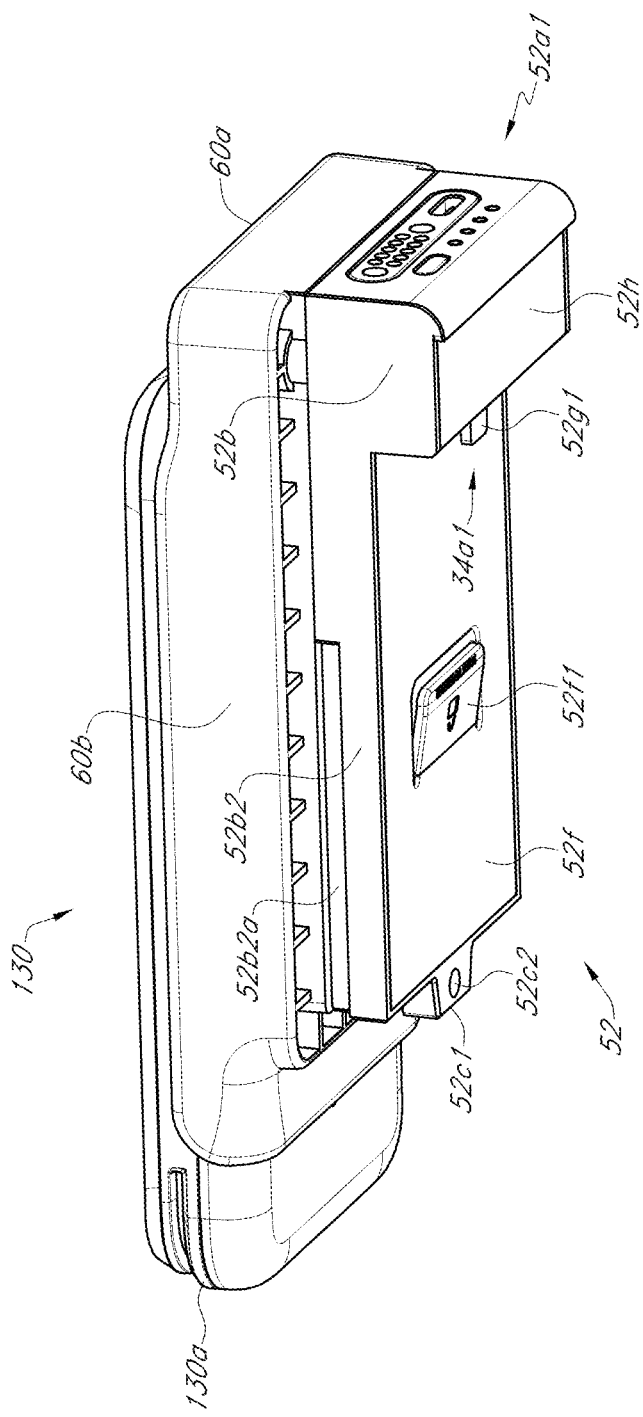
FIG. 33 is a partial exploded rear-top perspective view of the keypad assembly of FIG. 29 coupled with the interface assembly of FIG. 29, and uncoupled with a portion of the accessory assembly of FIG. 1.

Turning to FIG. 33, depicted therein is a partial exploded rear-top perspective view of payment card reader assembly 130, coupled with interface assembly 60, and uncoupled with a portion of accessory assembly 50.

Figure 34:
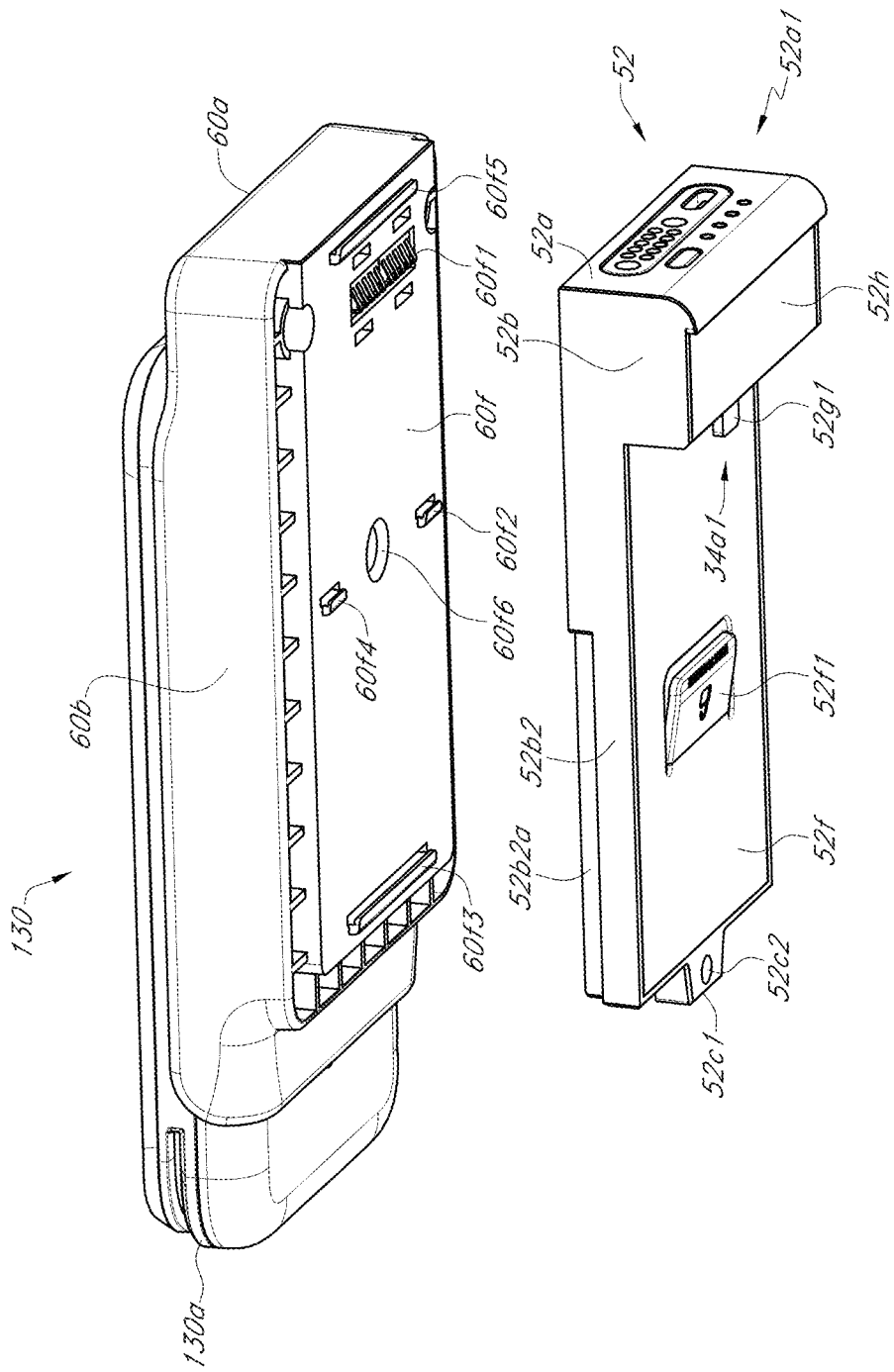
FIG. 34 is a rear-top perspective view of the keypad assembly of FIG. 29 coupled with the interface assembly of FIG. 29, and coupled with a portion of the accessory assembly of FIG. 1.

Turning to FIG. 34, depicted therein is a rear-top perspective view of payment card reader assembly 130 coupled with interface assembly 60, and coupled with a portion of accessory assembly 50.

Figure 35:
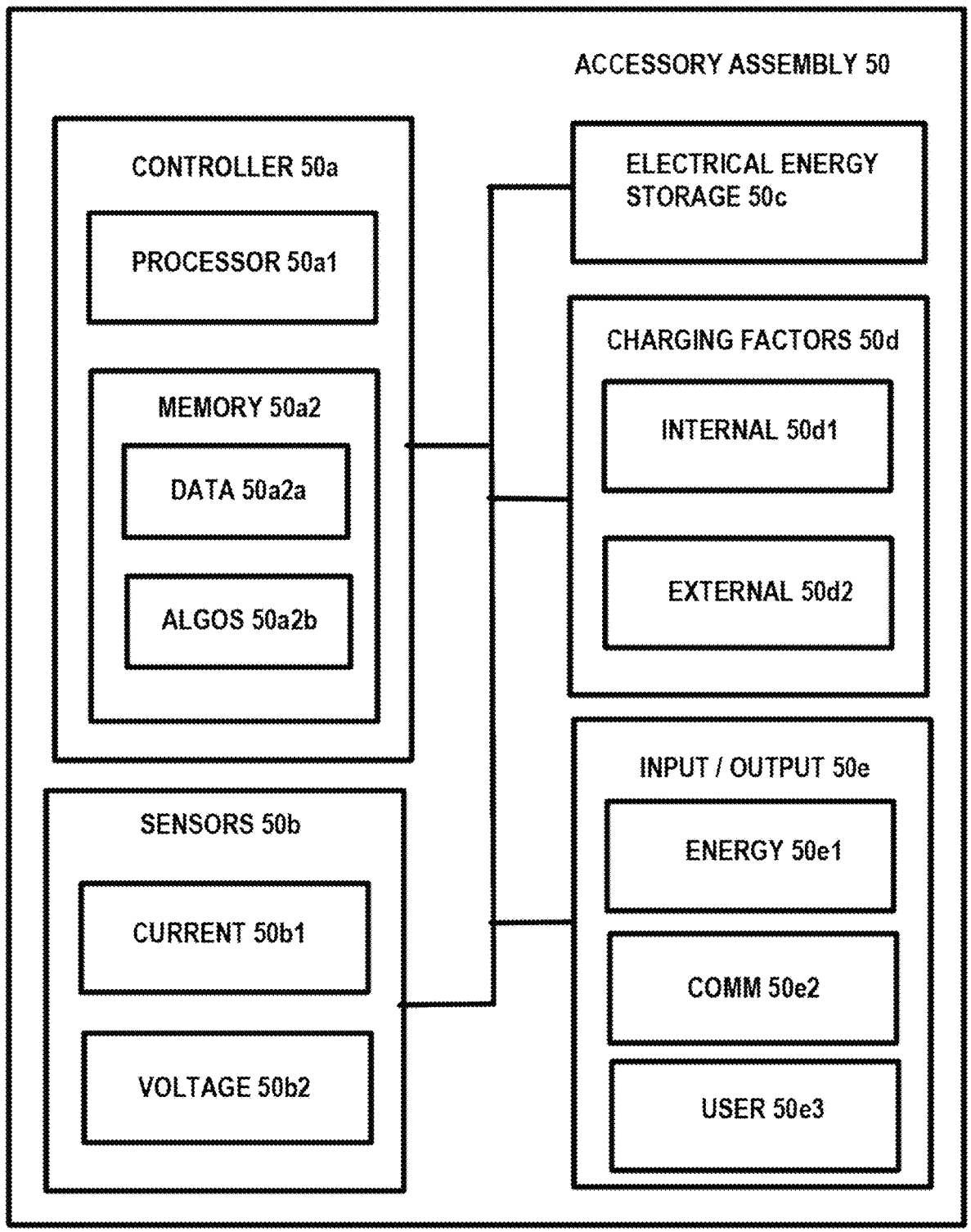
FIG. 35 is a schematic representation of electrically related components of the accessory assembly of FIG. 1.

Turning to FIG. 35, depicted therein is a schematic representation of electrically related components of the accessory assembly 50, which can be configured in various combinations, arrangements, and additions inside of accessory assembly 50. As depicted, implementations of accessory assembly 50 in the shown to include controller $50a$, sensors $50b$, electrical energy storage $50c$, charging factors $50d$, and input/output $50e$ shown to be interconnected. In implementations, interconnection can include various approaches such as involving wires, traces on or more circuit boards such as one or more printed circuit boards, electrical power buses, communication interconnections such as those that convey various communication protocols, etc.

In implementations, controller $50a$ shown to include processor $50a1$, memory $50a2$, with data $50a2a$, and algos $50a2b$. In implementations, sensors $50b$ shown to include current sensor $50b1$ and voltage sensor $50b2$. In implementations, charging factors $50d$ shown to include internal charging factor $50d1$ and external charging factor $50d2$. In implementations, input/output $50e$ shown to include energy input/output $50e1$, communication input/output $50e2$, and user input/output $50e3$.

In implementations, controller $50a$ can performed one or more functions involving operation of accessory assembly 50. For instance, in implementations, controller $50a$ can use information obtained by sensors $50b$ to determine an estimated charging rate, such as in terms of mAh/min or Ah/min, for either internal charging factor $50d1$ or external charging factor $50d2$, which controller $50a$ can then evaluate according to a predetermined threshold, optionally also involving a predetermined time period, to inform of status via user input/output $50e3$ or to otherwise control activation or deactivation regarding at least one of the following charging scenarios: (1) charging by internal charging factor $50d1$ of electrical energy storage $50c$ using energy obtained from one or more external energy sources, such as electrical energy provided through one or more forms of standard USB, Apple lightning, MagPower USB-C, alternative DC energy sources, AC energy sources, or other energy sources, via input portion of energy input/output $50e1$; (2) charging by external charging factor $50d2$ of external electric-based entities, such as including portable electronic tablet device implementation 100, portable electronic phone device implementation 120, and payment card reader assembly 130, via output portion of energy input/output $50e1$ using energy obtained from electrical energy storage $50c$; and (3) charging by external charging factor $50d2$ of external electric-based entities, such as including portable electronic tablet device implementation 100, portable electronic phone device implementation 120, and payment card reader assembly 130, via output portion of energy input/output $50e1$ using energy obtained from one or more external energy sources, such as electrical energy provided through one or more forms of standard USB, Apple lightning, MagPower USB-C, alternative DC energy sources, AC energy sources, or other energy sources, via input portion of energy input/output $50e1$. In implementations, internal charging factor $50d1$ can be activated when controller $50a$ determines in response to detecting an adequate connection to an external power source.

In implementations, controller $50a$ can performed other one or more functions involving operation of accessory assembly 50. For instance, in implementations, controller $50a$ can use at least one of (1) communication input/output $50e2$ and (2) sensors $50b$ with input portion of energy input/output $50e1$ to determine operational and/or connection status of external electric-based entities, such as including portable electronic tablet device implementation 100, portable electronic phone device implementation 120, and payment card reader assembly 130, communicatively connected, about to be communicatively connected, or recently communicatively disconnected with accessory assembly 50 to determine subsequent operational control of accessory assembly 50 and/or the external electric-based entities, such as including portable electronic tablet device implementation 100, portable electronic phone device implementation 120, and payment card reader assembly 130. In implementations, such operational control can include at least one of activation of a communication function, deactivation of a communication function, sending communication to external electric-based entities, such as including portable electronic tablet device implementation 100, portable electronic phone device implementation 120, and payment card reader assembly 130, from accessory assembly 50, and receiving communication at accessory assembly 50 from external electric-based entities, such as including portable electronic tablet device implementation 100, portable electronic phone device implementation 120, and payment card reader assembly 130. In implementations, such operational control can include at least one of activation of a communication function, deactivation of a communication function, sending communication protocols and/or data to external electric-based entities, such as including portable electronic tablet device implementation 100, portable electronic phone device implementation 120, and payment card reader assembly 130, from accessory assembly 50, and receiving communication protocols and/or data at accessory assembly 50 from external electric-based entities, such as including portable electronic tablet device implementation 100, portable electronic phone device implementation 120, and payment card reader assembly 130.

In implementations, processor $50a1$ can include one or more sub-processors, such as a central processing unit (CPU), a digital signal processor (DSP), a graphical processing unit (GPU), an application-specific integrated circuit (ASIC), microprocessor, a field-programmable gate array (FPGA), or any other suitable electronic processing components. In implementations, processor $50a1$ can receive energy from electrical energy storage $50c$ via internal charging factor $50d1$ or from an external energy source via external charging factor $50d2$. In implementations, processor $50a1$ can obtain data and execute instructions from data $50a2a$ and algos $50a2b$ of memory $50a2$, respectively. In implementations, memory 50a2 can include at least one computer memory components such as at least one of ROM, RAM, EEPROM, flash memory, or registers. In implementations memory 50a2 can be integrated to such as with processor 50a1 or be an ASIC or FPGA.

In implementations, if adequately charged, electrical energy storage 50c can supply energy to controller 50a and sensors 50b via internal charging factor 50d1 and to external electric-based entities, such as including portable electronic tablet device implementation 100, portable electronic phone device implementation 120, and payment card reader assembly 130, via external charging factor 50d2 and via output portion of energy input/output 50e1. In implementations electrical energy storage 50c can include various conventional cell chemistries to provide suitable voltages and charge durations and charge levels such as in mAh or Ah. In implementations, electrical energy storage 50c can include capacitive energy storage such as with a conventional capacitor or super-capacitor.

In implementations, communication input/output 50e2 can involve wired or wireless communication with external electric-based entities, such as including portable electronic tablet device implementation 100, portable electronic phone device implementation 120, and payment card reader assembly 130. In implementations, communication input 200a portion of user input/output 50e3 can include tactile, such as keypad or pushbuttons, audio such as microphone, or any other suitable means for communication input 200a.

In implementations, communication output 200b portion of user input/output 50e3 can include audio (such as buzzer or acoustic speakers) or tactile (such as pulsed vibration actuator modifying pulse frequency, intensity, or duration), or visual output. For instance, in implementations, one or more light emitters (such as conventional light emitting diodes (LED), organic LED, liquid-crystal emitters, e-ink display, etc.) optionally arranged in various patterns such as linearly in series, in matrix configuration, randomly, etc., according to predetermined symbology or particular nomenclature involved. In implementations, communication output 200b versions of user input/output 50e3 can include other visual output, acoustic output. In implementations, controller 50a can provide control to activate or deactivate LED communication output 200b versions of user input/output 50e3 for extended periods of time, flash intermittently, project or emit patterns or characters, or can provide control for intensity of emission by light emitter versions.

Figure 36:
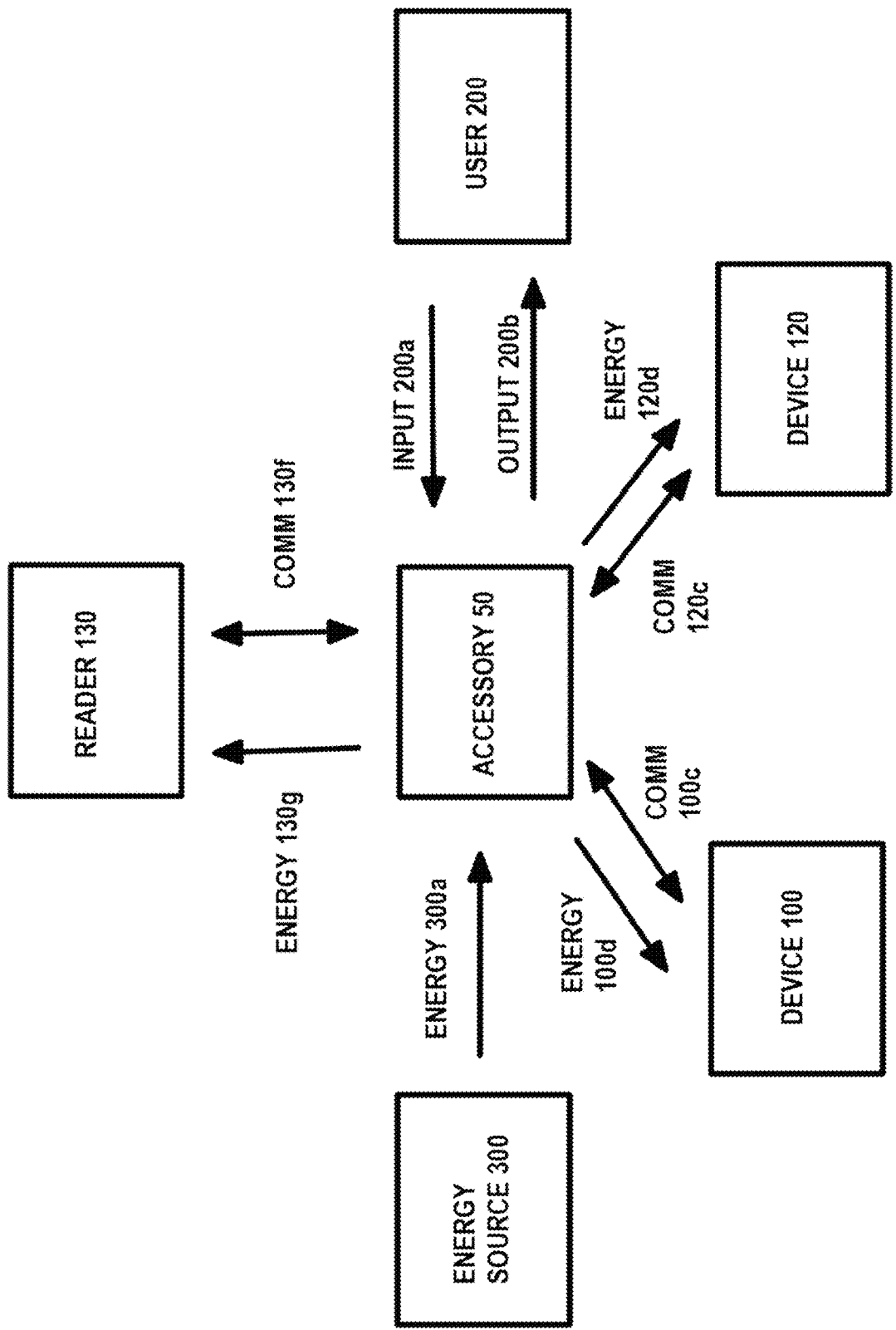
FIG. 36 is a schematic representation of implementations of flows of communication and/or electrical energy regarding the accessory assembly of FIG. 1.

Turning to FIG. 36, depicted therein is a schematic representation of implementations of flows of communication and/or electrical energy when accessory assembly 50 is either physically coupled (e.g., through structural engagement shown in prior figures or overt wiring) or wirelessly coupled (e.g., through IEEE-based or other protocols or energy fields) to portable electronic tablet device implementation 100, portable electronic phone device implementation 120, payment card reader assembly 130, and/or energy source 300. Also schematic representation of FIG. 36 depicts some implementations to include communication flows with user 200 being interactively engaged with accessory assembly 120.

As depicted, in implementations, electrical-based communication 100c can flow between accessory assembly 50 and portable electronic tablet device implementation 100; and electrical energy 100d can flow from accessory assembly 50 to portable electronic tablet device implementation 100. As depicted, in implementations, electrical-based communication 120c can flow between accessory assembly 50 and portable electronic phone device implementation 120; and electrical energy 120d can flow from accessory assembly 50 to portable electronic phone device implementation 120. As depicted, in implementations, electrical-based communication 130f can flow between accessory assembly 50 and payment card reader assembly 130; and electrical energy 130g can flow from accessory assembly 50 to payment card reader assembly 130. As depicted, in implementations, communication input 200a can flow from accessory assembly 50 to user 200; and communication output 200b can flow from user 200 to accessory assembly 50. As depicted, in implementations, electrical energy 300a can flow from electrical energy source 300 to accessory assembly 50.

In implementations, such components of accessory assembly 50 conduct functions such as activation or deactivation upon a two second button hold of communication input 200a portions or versions of user input/output 50e3, displaying energy storage status using various light patterns of communication output 200b portions or versions of user input/output 50e3 upon single button press of communication input 200a portions or versions of user input/output 50e3. Such light patterns can involve multiple lights to include long pulses or one or more lights being activated to indicate of percentage of electrical charge remaining or charging status of electrical energy storage 50c.

Charging mode can be selected based on manual control such as button pushes to charge only the accessory assembly 50, charge accessory assembly 50 and the portable electronic tablet device implementation 100, charge accessory assembly 50 and portable electronic phone device implementation 120, or accessory assembly 50 only when accessory assembly 50 charge is below a threshold such as ten percent. Other charging modes can include a quick charge which temporarily disables data connectivity between accessary assembly 50 and portable electronic tablet device implementation 100 or portable electronic phone device implementation 120 to allow for faster charging. In implementations the accessory assembly 50 can be put into a data mode only, to allow for a wired data connection between payment card reader assembly 130 and portable electronic tablet device implementation 100 or portable electronic phone device implementation 120.

In implementations accessory assembly 50 conducts various verification routines from data 50a2a of memory 50a2 such as to allow for reliable operations. These routines can include but are not limited to the following such as after a press and hold of such as manual button control of communication input 200a portion of user input/output 50e3 to activate accessory assembly 50, verification of charging is done such as related to certain voltage and/or current levels being supplied to or from the accessory assembly 50. Other verification routines can include whether attached card reader accessory 130 is being charged or whether data connectivity has been established between one or more of accessory assembly 50, portable electronic tablet device implementation 100, portable electronic phone device implementation 120, and payment card reader assembly 130.

Certain communication input 200a from communication input 200a portion of user input/output 50e3 such as a double-press by user 200 of one or more buttons included with implementations of communication input 200a portions of user input/output 50e3 can be sensed by processor 50a1 to deactivate charging of the portable electronic tablet device implementation 100 or portable electronic phone device implementation 120 with subsequent verification. This deactivation of portable electronic device charging can occur while charging of payment card reader assembly 130 or accessory assembly 50 can remain active or data connectivity between the accessory assembly 50 and payment card reader assembly 130 can also remain active. Manual activation of portable electronic device charging can occur through for example double-button-press of input portion of user input/output 50e3 of accessory assembly 50 along with charging and data connectivity with payment card reader assembly 130 remaining active. Even with accessory assembly charging and portable electronic device charging being deactivated, data connectivity may still be active between accessory assembly 50 and payment card reader assembly 130.

In implementations charging can be performed for instance with USB-C cable or an Apple lightening cable in which the accessory assembly is activated through coupling with either cable. Charging status can be indicated though use of status lights for communication output 200b portion of user input/output 50e3. In implementations, electrical energy storage 50c of accessory assembly 50, electrical energy storage of portable electronic tablet device implementation 100 or portable electronic phone device implementation 120, and electrical energy storage of card reader accessory 130 can all be charged simultaneously by accessory assembly 50 via internal charging factor 50d1 and external charging factor 50d2. In implementations, when an electrical energy cable is disconnected the accessory assembly 50 can remain to allow for continued portable electronic device charging and the payment card reader assembly charging along with data connectivity remaining viable between accessory assembly 50, portable electronic tablet device implementation 100 or portable electronic phone device implementation 120, and payment card reader assembly 130. In implementations, for instance, these charging functions can remain even though a USB-C charging cable has been initially unplugged from accessory assembly 50 and flipped over in an inverse physical configuration.

In implementations, user communication input 200a to communication input 200a portion of user input/output 50e3, such as a single-press button procedure, can show charge level of electrical energy storage 50c through such as one or more LEDs of communication output 200b portion of user input/output 50e3. In implementations, user communication input 200a to communication input 200a portion of user input/output 50e3, such as a double-press button procedure, can deactivate portable electronic device charging, In implementations, connecting input portion of energy input/output 50e1 of accessory assembly 50 to an electrical energy source for a predetermined amount of time, such as two seconds, and then disconnecting such can activate portable electronic device charging by external device charging factor 50d2.

In implementations, disconnecting portable electronic tablet device implementation 100 or portable electronic phone device implementation 120 from accessory assembly 50 can be detected by processor 50al, which can then be based upon this detection deactivate card reader accessory 130. In implementations, the accessory assembly 50 can automatically be deactivated by processor 50a1 within a predetermined time frame such as two minutes. In implementations with portable electronic tablet device implementation 100 or portable electronic phone device implementation 120 being in an inactive state and accessory assembly 50 also in an inactive state, if portable electronic tablet device implementation 100 or portable electronic phone device implementation 120 is coupled with accessory assembly 50, processor 50a1 of accessory assembly 130 will not activate either the portable electronic tablet device implementation 100 or portable electronic phone device implementation 120, accessory assembly 50, or payment card reader assembly 130.

In implementations, both electrical energy and network connectivity can be furnished via IEEE standards-based power-over-ethernet PoE in which both input portion of energy input/output 50e1 and input/output portions of communication input/output 50e are wired or wirelessly coupled with an electrical energy source and a network source. For instance, MagPower cabling could provide both to accessory assembly 50 from proper sources. For instance, when accessory assembly 50 has been deactivated and a MagPower or other type cable is coupled with the accessory assembly 50 and a USB hub having ethernet and power available is coupled with the MagPower cable, accessory assembly 50 can be activated processor 50a1 for both electrical energy input and network connectivity input. Through this means, charging of accessory assembly 50, portable electronic tablet device implementation 100 or portable electronic phone device implementation 120, and the payment card reader assembly 130 can be had along with availability of network connectivity, such as ethernet connectivity, to them all.

In implementations, in some cases where portable electronic tablet device implementation 100 or portable electronic phone device implementation 120 are active and accessory assembly 50 is inactivate, charging of portable electronic tablet device implementation 100 or portable electronic phone device implementation 120 can be activated by processor 50a1 through coupling of accessory assembly 50 with network and electrical energy source such as if a MagPower cable that is coupled with a USB hub having ethernet and electrical energy available, is coupled with accessory assembly, then accessory assembly 50 can be activated by processor 50al. In implementations, these activations can also allow for charging and provide network connectivity to payment card reader assembly 130 and portable electronic tablet device implementation 100 or portable electronic phone device implementation 120.

In implementations, when portable electronic tablet device implementation 100 or portable electronic phone device implementation 120 and accessory assembly 50 are inactive, when portable electronic tablet device implementation 100 or portable electronic device assembly 120, and accessory assembly 50 are coupled together they along with payment card reader assembly 130 will remain inactive through management by processor 50a1 of accessory assembly 50.

Following includes implementations of methods performed by implementations of accessory assembly 50 as also described above.

Implementations of accessory assembly 50 can determine activation status of accessory assembly 50 and when portable electronic tablet device implementation 100 or portable electronic phone device implementation 120 is electrical-energy-communication based coupled and structurally coupled with the accessory assembly 50, accessory assembly 50 can control at least a portion of electrical-energy-based charging of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the portable electronic tablet device implementation 100 or portable electronic phone device implementation 120 based at least in part on the activation status of the accessory payment card reader assembly 130.

In implementations of accessory assembly 50, accessory assembly 50 can determine activation status of the accessory assembly 50; and accessory assembly 50 can control at least a portion of electrical-energy-based charging of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the payment card reader assembly 130 based at least in part on the activation status of the payment card reader assembly 130.

In implementations of accessory assembly 50, accessory assembly 50 can determine activation status of the accessory assembly 50; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication status of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication-based connectivity of the portable electronic tablet device implementation 100 or portable electronic phone device implementation 120 based at least in part on the activation status of the payment card reader assembly 130.

In implementations of accessory assembly 50, accessory assembly 50 can determine activation status of the accessory assembly 50; and accessory assembly 50 can control at least a portion of electrical-communication-based connectivity of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the payment card reader assembly 130 based at least in part on the activation status of the payment card reader assembly 130.

In implementations of accessory assembly 50, accessory assembly 50 can determine electrical-energy-communication-based coupling status of the accessory assembly 50 with the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the electrical-energy-communication-based coupling status of the accessory assembly 50 with the portable electronic tablet device implementation 100 or portable electronic phone device implementation 120.

In implementations of accessory assembly 50, accessory assembly 50 can determine electrical-energy-communication-based coupling status of the accessory assembly 50 with the payment card reader assembly 130; and accessory assembly 50 can control at least a portion of electrical-communication-based connectivity of the payment card reader assembly 130 based at least in part on the electrical-energy-communication-based coupling status of the accessory assembly 50 with the payment card reader assembly 130.

Turning to FIG. 37, depicted therein is a representative flow diagram associated with aspects of accessory assembly 50 involving method 400 including step 402 determining activation status of the accessory assembly, step 402's substep 402*a* determining at least one voltage level status according to at least one voltage threshold, step 402's substep 402*b* determining at least one current level status according to at least one current threshold, step 404 when the portable electronic device is electrical-energy-communication based coupled and structurally coupled with the accessory assembly, controlling at least a portion of electrical-energy-based charging of the portable electronic device based at least in part on the activation status of the accessory assembly, step 404's substep 404*a* controlling electrical-energy-based charging via current level metering, and step 404's substep 404*b* controlling electrical-energy-based charging via voltage level metering.

Turning to FIG. 38, depicted therein is a representative flow diagram associated with aspects of accessory assembly 50 involving method 410 including step 412 when the portable electronic device is at least electrical-energy-communication-based coupled and structurally coupled with the accessory assembly, determining activation status of the portable electronic device, step 412's substep 412*a* determining at least one voltage level status according to at least one voltage threshold, step 412's substep 412*b* determining at least one current level status according to at least one current threshold, step 414 controlling at least a portion of electrical-energy-based charging of the portable electronic device based at least in part on the activation status of the portable electronic device, step 414's substep 414*a* controlling electrical-energy-based charging via current level metering, and step 414's substep 414*b* controlling electrical-energy-based charging via voltage level metering.

Figure 39:
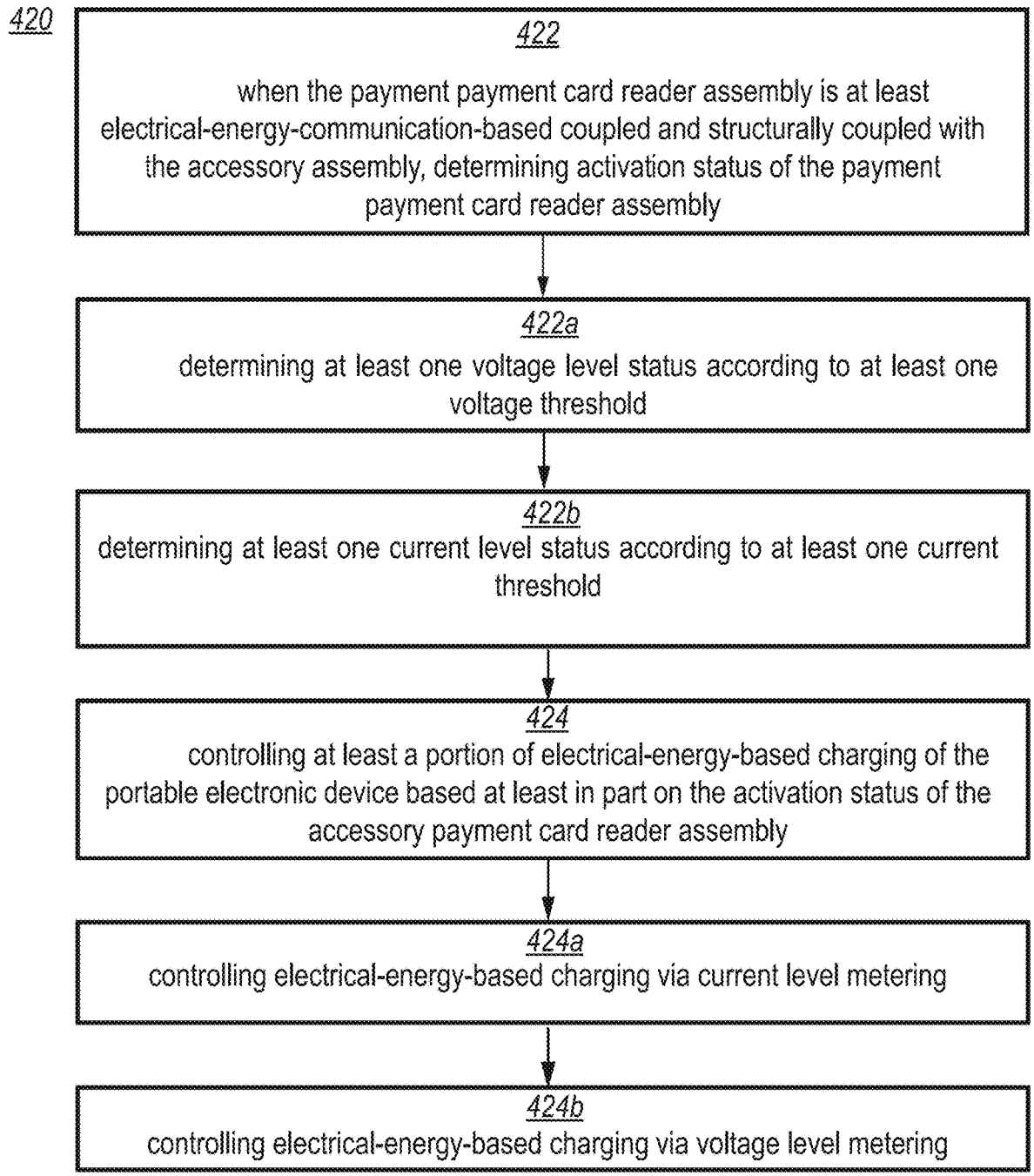
FIG. 39 is a representative flow diagram associated with aspects of the accessory assembly of FIG. 1.

Turning to FIG. 39, depicted therein is a representative flow diagram associated with aspects of accessory assembly 50 involving method 420 including step 422 when the payment card reader assembly is at least electrical-energy-communication-based coupled and structurally coupled with the accessory assembly, determining activation status of the payment card reader assembly step 422's substep 422*a* determining at least one voltage level status according to at least one voltage threshold, step 422's 422*b* determining at least one current level status according to at least one current threshold, step 424 controlling at least a portion of electrical-energy-based charging of the portable electronic device based at least in part on the activation status of the accessory payment card reader assembly, step 424's substep 424*a* controlling electrical-energy-based charging via current level metering and step 424's substep 424*b* controlling electrical-energy-based charging via voltage level metering.

Figure 40:
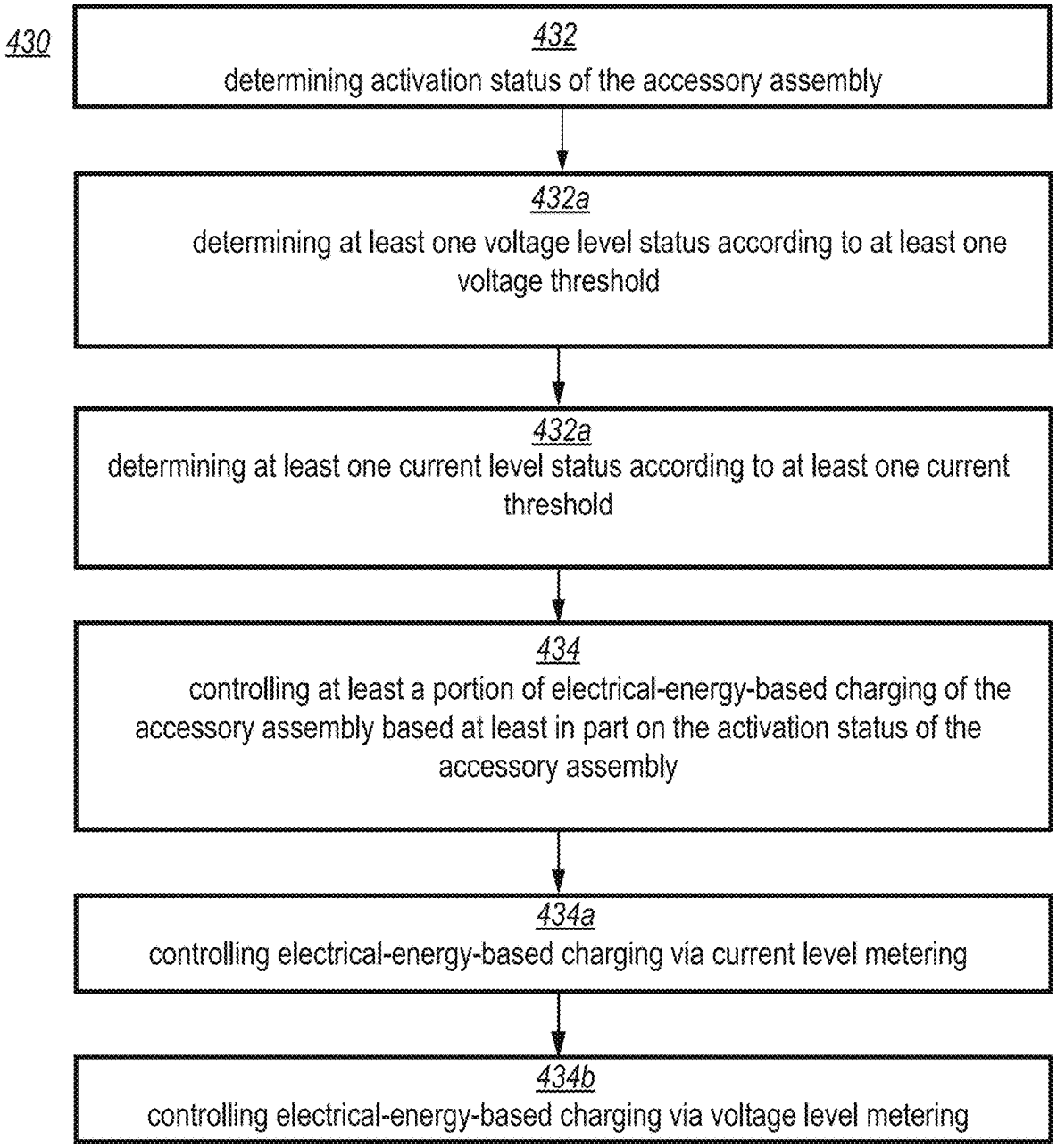
FIG. 40 is a representative flow diagram associated with aspects of the accessory assembly of FIG. 1.

Turning to FIG. 40, depicted therein is a representative flow diagram associated with aspects of accessory assembly 50 involving method 430 including step 432 determining activation status of the accessory assembly step 432's substep 432*a* determining at least one voltage level status according to at least one voltage threshold, step 432's substep 432*b* determining at least one current level status according to at least one current threshold, step 434 controlling at least a portion of electrical-energy-based charging of the accessory assembly based at least in part on the activation status of the accessory assembly, step 434's substep 434*a* controlling electrical-energy-based charging via current level metering, and step 434's substep 434*b* controlling electrical-energy-based charging via voltage level metering.

Turning to FIG. 41, depicted therein is a representative flow diagram associated with aspects of accessory assembly 50 involving method 440 including step 442 when the portable electronic device is at least electrical-energy-communication-based coupled and structurally coupled with the accessory assembly, determining activation status of the portable electronic device, step 442's substep 442*a* determining at least one voltage level status according to at least one voltage threshold, step 4421*s* substep 442*b* determining at least one current level status according to at least one current threshold, step 444 controlling at least a portion of electrical-energy-based charging of the accessory assembly based at least in part on the activation status of the portable electronic device, step 444's substep 444*a* controlling electrical-energy-based charging via current level metering, and step 444's substep 444*b* controlling electrical-energy-based charging via voltage level metering.

Turning to FIG. 42, depicted therein is a representative flow diagram associated with aspects of accessory assembly 50 involving method 450 including step 452 when the payment card reader assembly is at least electrical-energy-communication-based coupled and structurally coupled with the accessory assembly, determining activation status of the payment card reader assembly, step 452's substep 452*a* determining at least one voltage level status according to at least one voltage threshold, step 452's substep 452*b* determining at least one current level status according to at least one current threshold, step 454 controlling at least a portion of electrical-energy-based charging of the accessory assembly based at least in part on the activation status of the payment card reader assembly, step 454's substep 454*a* controlling electrical-energy-based charging via current level metering, and step 454's substep 454*b* controlling electrical-energy-based charging via voltage level metering.

Figure 43:
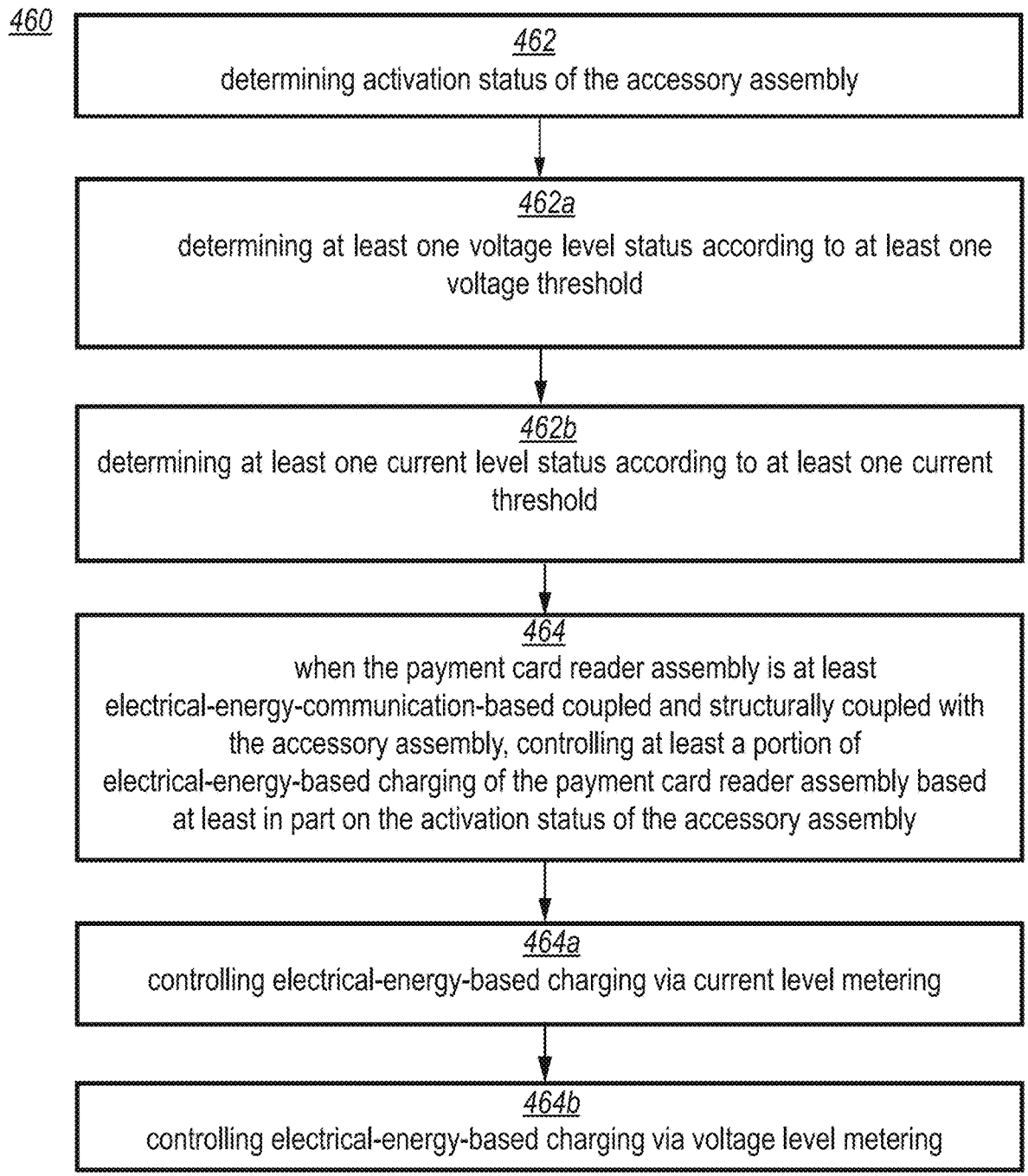
FIG. 43 is a representative flow diagram associated with aspects of the accessory assembly of FIG. 1.

Turning to FIG. 43, depicted therein is a representative flow diagram associated with aspects of accessory assembly 50 involving method 460 including step 462 determining activation status of the accessory assembly, step 462's substep 462*a* determining at least one voltage level status according to at least one voltage threshold, step 462's substep 462*b* determining at least one current level status according to at least one current threshold, step 464 when the payment card reader assembly is at least electrical-energy-communication-based coupled and structurally coupled with the accessory assembly, controlling at least a portion of electrical-energy-based charging of the payment card reader assembly based at least in part on the activation status of the accessory assembly, step 464's substep 464*a* controlling electrical-energy-based charging via current level metering, and step 464's substep 464*b* controlling electrical-energy-based charging via voltage level metering.

Turning to FIG. 44, depicted therein is a representative flow diagram associated with aspects of accessory assembly 50 involving method 470 including step 472 when the portable electronic device is at least electrical-energy-communication-based coupled and structurally coupled with the accessory assembly, determining activation status of the portable electronic device, step 472's substep 472*a* determining at least one voltage level status according to at least one voltage threshold, step 472's substep 472*b* determining at least one current level status according to at least one current threshold, step 474 when the payment card reader assembly is at least electrical-energy-communication-based coupled and structurally coupled with the accessory assembly, controlling at least a portion of electrical-energy-based charging of the payment card reader assembly based at least in part on the activation status of the portable electronic device, step 474's substep 474*a* controlling electrical-energy-based charging via current level metering, and step 474's substep 474*b* controlling electrical-energy-based charging via voltage level metering.

Turning to FIG. 45, depicted therein is a representative flow diagram associated with aspects of accessory assembly 50 involving method 480 including step 482 when the payment card reader assembly is at least electrical-energy-communication-based coupled and structurally coupled with the accessory assembly, determining activation status of the payment card reader assembly, step 482's substep 482*a* determining at least one voltage level status according to at least one voltage threshold, step 482's substep 482*b* determining at least one current level status according to at least one current threshold, step 484 controlling at least a portion of electrical-energy-based charging of the payment card reader assembly based at least in part on the activation status of the payment card reader assembly, step 484's substep 484*a* controlling electrical-energy-based charging via current level metering, and step 484's substep 484*b* controlling electrical-energy-based charging via voltage level metering.

Turning to FIG. 46, depicted therein is a representative flow diagram associated with aspects of accessory assembly 50 involving method 500 including step 502 determining activation status of the accessory assembly, step 502's substep 502*a* determining at least one voltage level status according to at least one voltage threshold, step 502's substep 502*b* determining at least one current level status according to at least one current threshold, step 504 when the portable electronic device is electrical-energy-communication-based coupled and structurally coupled with the accessory assembly, controlling at least a portion of electrical-communication status of the portable electronic device based at least in part on the activation status of the accessory assembly, step 504's substep 504*a* controlling electrical-communication status via incoming communication access control, and step 504's substep 504*b* controlling electrical-energy-based charging via outgoing communication access control.

Turning to FIG. 47, depicted therein is a representative flow diagram associated with aspects of accessory assembly 50 involving method 510 including step 512 when the portable electronic device is electrical-energy-communication-based coupled and structurally coupled with the accessory assembly, determining activation status of the portable electronic device, step 512's substep 512*a* determining at least one voltage level status according to at least one voltage threshold, step 512's substep 512*b* determining at least one current level status according to at least one current threshold, step 514 controlling at least a portion of electrical-communication-based connectivity of the portable electronic device based at least in part on the activation status of the portable electronic device, step 514's substep 514*a* controlling electrical-communication status via incoming communication access control, and step 514's substep 514*b* controlling electrical-energy-based charging via outgoing communication access control.

Turning to FIG. 48, depicted therein is a representative flow diagram associated with aspects of accessory assembly 50 involving method 520 including step 522 when the payment card reader assembly is electrical-energy-communication-based coupled and structurally coupled with the accessory assembly, determining activation status of the payment card reader assembly, step 522's substep 522a determining at least one voltage level status according to at least one voltage threshold, step 522's substep 522b determining at least one current level status according to at least one current threshold, step 524 when the portable electronic device is electrical-energy-communication-based coupled and structurally coupled with the accessory assembly, controlling at least a portion of electrical-communication-based connectivity of the portable electronic device based at least in part on the activation status of the payment card reader assembly, step 524's substep 524a controlling electrical-communication status via incoming communication access control, and step 524's substep 524b controlling electrical-energy-based charging via outgoing communication access control.

Figure 49:
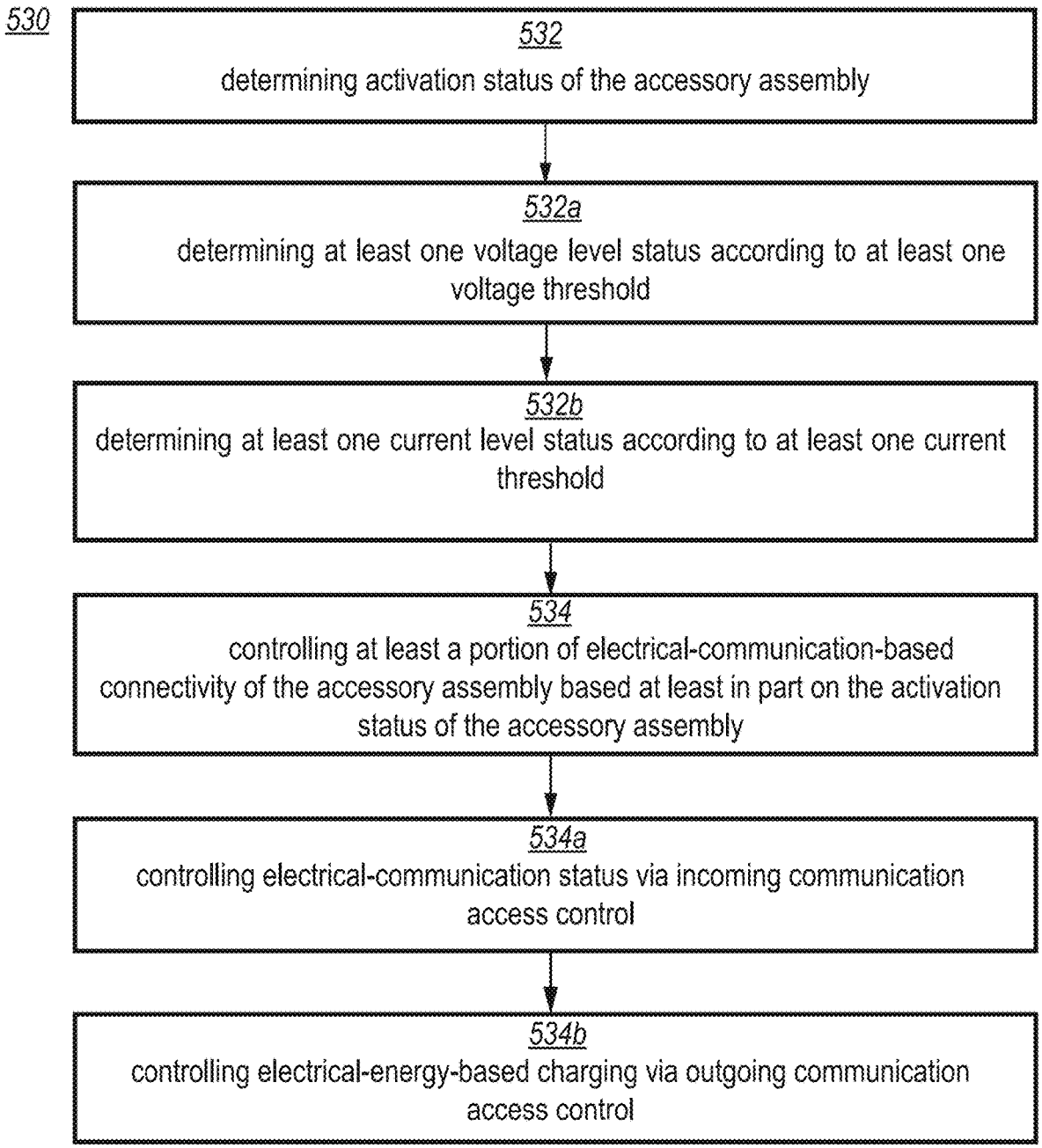
FIG. 49 is a representative flow diagram associated with aspects of the accessory assembly of FIG. 1.

Turning to FIG. 49, depicted therein is a representative flow diagram associated with aspects of accessory assembly 50 involving method 530 including step 532 determining activation status of the accessory assembly, step 532's substep 532a determining at least one voltage level status according to at least one voltage threshold, step 532's substep 532b determining at least one current level status according to at least one current threshold, step 534 controlling at least a portion of electrical-communication-based connectivity of the accessory assembly based at least in part on the activation status of the accessory assembly, step 534's substep 534a controlling electrical-communication status via incoming communication access control, and step 534's substep 534b controlling electrical-energy-based charging via outgoing communication access control.

Turning to FIG. 50, depicted therein is a representative flow diagram associated with aspects of accessory assembly 50 involving method 540 including step 542 when the portable electronic device is electrical-energy-communication-based coupled and structurally coupled with the accessory assembly, determining activation status of the portable electronic device, step 542's substep 542a determining at least one voltage level status according to at least one voltage threshold, step 542's substep 542b determining at least one current level status according to at least one current threshold, step 544 controlling at least a portion of electrical-communication-based connectivity of the accessory assembly based at least in part on the activation status of the portable electronic device, step 544's substep 544a controlling electrical-communication status via incoming communication access control, and step 544's substep 544b controlling electrical-energy-based charging via outgoing communication access control.

Figure 51:
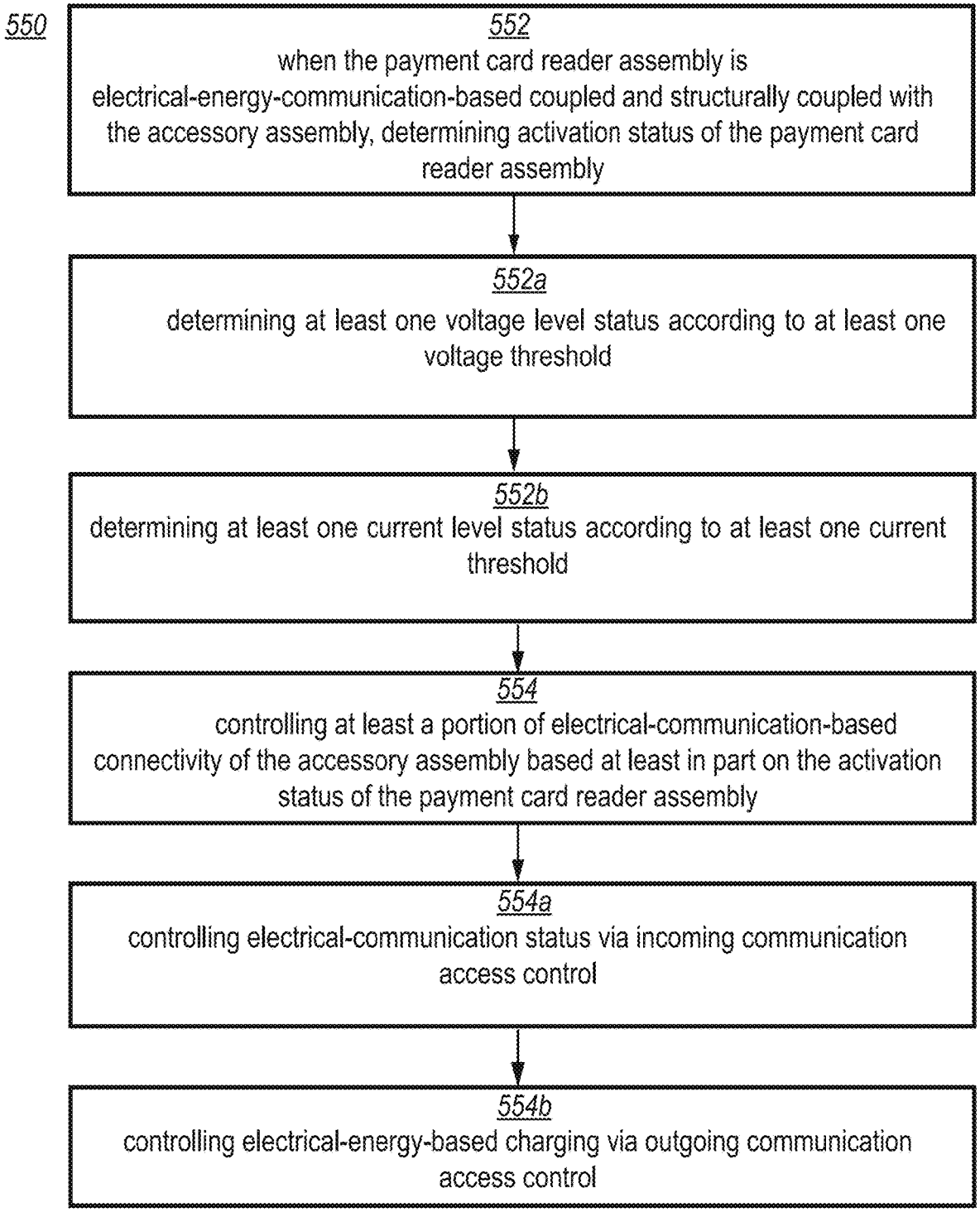
FIG. 51 is a representative flow diagram associated with aspects of the accessory assembly of FIG. 1.

Turning to FIG. 51, depicted therein is a representative flow diagram associated with aspects of accessory assembly 50 involving method 550 including step 552 when the payment card reader assembly is electrical-energy-communication-based coupled and structurally coupled with the accessory assembly, determining activation status of the payment card reader assembly, step 552's substep 552a determining at least one voltage level status according to at least one voltage threshold, step 552's substep 522b determining at least one current level status according to at least one current threshold, step 554 controlling at least a portion of electrical-communication-based connectivity of the accessory assembly based at least in part on the activation status of the payment card reader assembly, step 554's substep 554a controlling electrical-communication status via incoming communication access control, and step 554's substep 554b controlling electrical-energy-based charging via outgoing communication access control.

Figure 52:
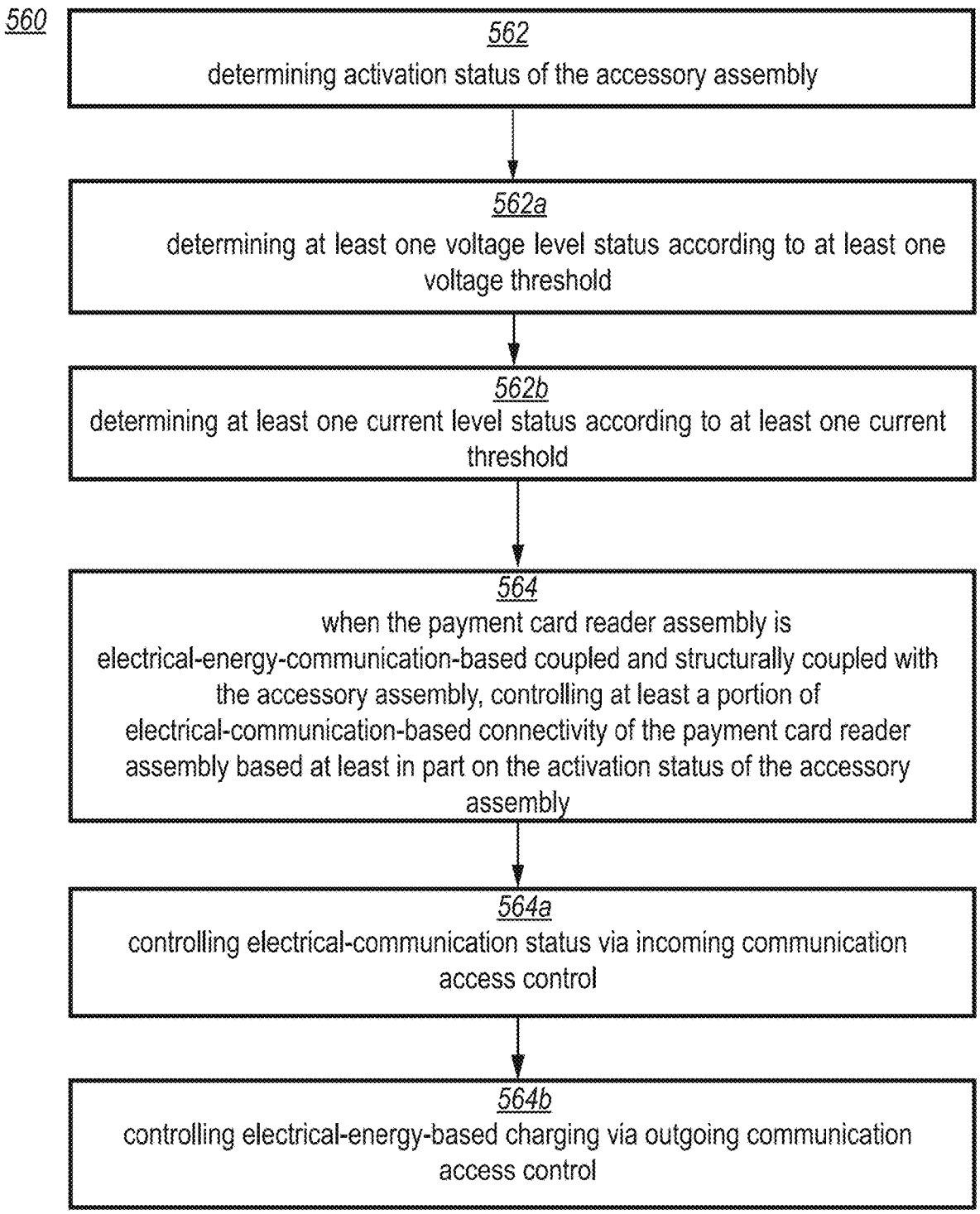
FIG. 52 is a representative flow diagram associated with aspects of the accessory assembly of FIG. 1.

Turning to FIG. 52, depicted therein is a representative flow diagram associated with aspects of accessory assembly 50 involving method 560 including step 562 determining activation status of the accessory assembly, step 562's substep 562a determining at least one voltage level status according to at least one voltage threshold, step 562's substep 562b determining at least one current level status according to at least one current threshold, step 564 when the payment card reader assembly is electrical-energy-communication-based coupled and structurally coupled with the accessory assembly, controlling at least a portion of electrical-communication-based connectivity of the payment card reader assembly based at least in part on the activation status of the accessory assembly, step 564's substep 564a controlling electrical-communication status via incoming communication access control, and step 564's substep 564b controlling electrical-energy-based charging via outgoing communication access control.

Turning to FIG. 53, depicted therein is a representative flow diagram associated with aspects of accessory assembly 50 involving method 570 including step 572 when the portable electronic device is electrical-energy-communication-based coupled and structurally coupled with the accessory assembly, determining activation status of the portable electronic device, step 572's substep 572a determining at least one voltage level status according to at least one voltage threshold, step 572's substep 572b determining at least one current level status according to at least one current threshold, step 574 when the payment card reader assembly is electrical-energy-communication-based coupled and structurally coupled with the accessory assembly, controlling at least a portion of electrical-communication-based connectivity of the payment card reader assembly based at least in part on the activation status of the portable electronic device, step 574's substep 574a controlling electrical-communication status via incoming communication access control, and step 574's substep 574b controlling electrical-energy-based charging via outgoing communication access control.

Turning to FIG. 54, depicted therein is a representative flow diagram associated with aspects of accessory assembly 50 involving method 580 including step 582 when the payment card reader assembly is electrical-energy-communication-based coupled and structurally coupled with the accessory assembly, determining activation status of the payment card reader assembly, step 582's substep 582a determining at least one voltage level status according to at least one voltage threshold, step 582's substep 582b determining at least one current level status according to at least one current threshold, step 584 controlling at least a portion of electrical-communication-based connectivity of the payment card reader assembly based at least in part on the activation status of the payment card reader assembly, step 584's substep 584a controlling electrical-communication status via incoming communication access control, and step 584's substep 584b controlling electrical-energy-based charging via outgoing communication access control.

Figure 55:
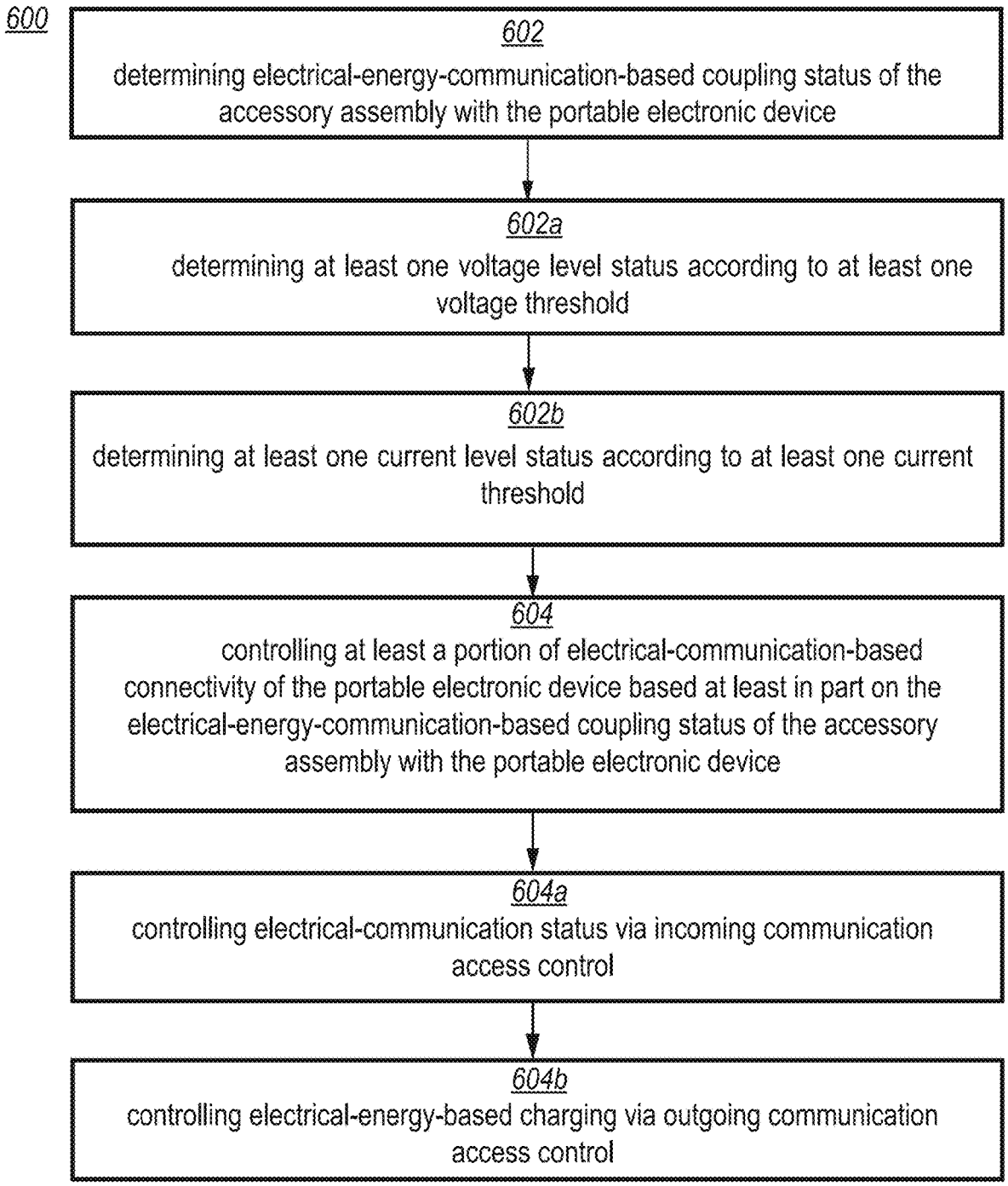
FIG. 55 is a representative flow diagram associated with aspects of the accessory assembly of FIG. 1.

Turning to FIG. 55, depicted therein is a representative flow diagram associated with aspects of accessory assembly 50 involving method 600 including step 602 determining electrical-energy-communication-based coupling status of the accessory assembly with the portable electronic device, step 602's substep 602a determining at least one voltage level status according to at least one voltage threshold, step 602's substep 602b determining at least one current level status according to at least one current threshold, step 604 controlling at least a portion of electrical-communication-based connectivity of the portable electronic device based at least in part on the electrical-energy-communication-based coupling status of the accessory assembly with the portable electronic device, step 604's substep 604a controlling electrical-communication status via incoming communication access control, and step 604's substep 604b controlling electrical-energy-based charging via outgoing communication access control.

Figure 56:
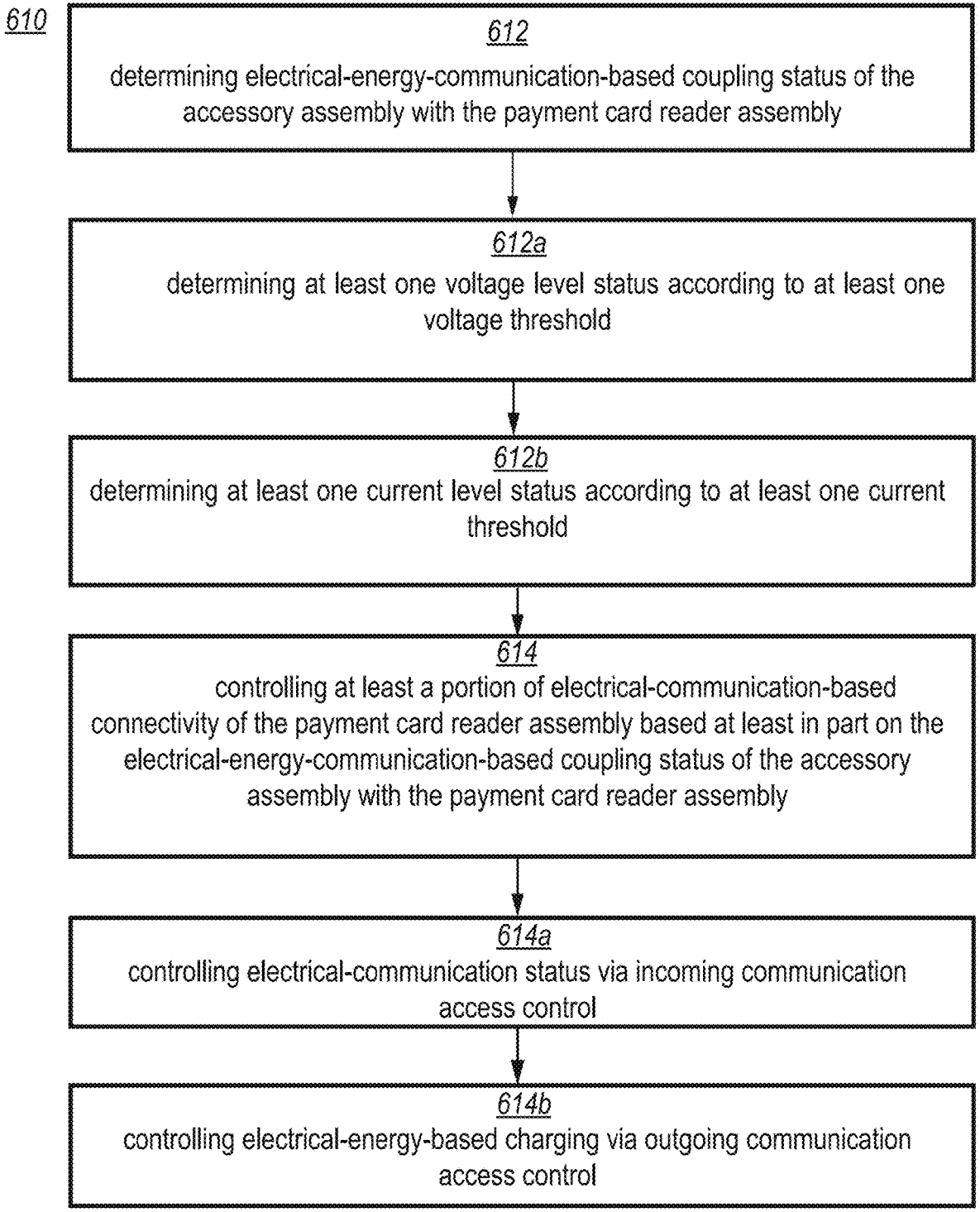
FIG. 56 is a representative flow diagram associated with aspects of the accessory assembly of FIG. 1.

Turning to FIG. 56, depicted therein is a representative flow diagram associated with aspects of accessory assembly 50 involving method 610 including step 612 determining electrical-energy-communication-based coupling status of the accessory assembly with the payment card reader assembly, step 612's substep 612a determining at least one voltage level status according to at least one voltage threshold, step 612's substep 612b determining at least one current level status according to at least one current threshold, step 614 controlling at least a portion of electrical-communication-based connectivity of the payment card reader assembly based at least in part on the electrical-energy-communication-based coupling status of the accessory assembly with the payment card reader assembly, step 614's substep 614a controlling electrical-communication status via incoming communication access control, and step 614's substep 614b controlling electrical-energy-based charging via outgoing communication access control.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An electronic-controller-implemented method for use with an accessory assembly electrical-energy-communication-based couplable and structurally couplable with a portable electronic device and with a payment card reader assembly, the portable electronic device selected from a portable electronic tablet device implementation or a portable electronic phone device implementation, the method comprising:
   determining activation status of the accessory assembly; and
   when the portable electronic device is electrical-energy-communication based coupled and structurally coupled with the accessory assembly, controlling at least a portion of electrical-energy-based charging of the portable electronic device based at least in part on the activation status of the accessory assembly.

2. The method of claim 1 further comprising:
   when the portable electronic device is at least electrical-energy-communication-based coupled and structurally coupled with the accessory assembly, determining activation status of the portable electronic device; and
   controlling at least a portion of electrical-energy-based charging of the portable electronic device based at least in part on the activation status of the portable electronic device.

3. The method of claim 1 further comprising:
when the payment card reader assembly is at least electrical-energy-communication-based coupled and structurally coupled with the accessory assembly, determining activation status of the payment card reader assembly; and
controlling at least a portion of electrical-energy-based charging of the portable electronic device based at least in part on the activation status of the accessory payment card reader assembly.

4. The method of claim 1 further comprising:
determining activation status of the accessory assembly; and
controlling at least a portion of electrical-energy-based charging of the accessory assembly based at least in part on the activation status of the accessory assembly.

5. The method of claim 1 further comprising:
when the portable electronic device is at least electrical-energy-communication-based coupled and structurally coupled with the accessory assembly, determining activation status of the portable electronic device; and
controlling at least a portion of electrical-energy-based charging of the accessory assembly based at least in part on the activation status of the portable electronic device.

6. The method of claim 1 further comprising:
when the payment card reader assembly is at least electrical-energy-communication-based coupled and structurally coupled with the accessory assembly, determining activation status of the payment card reader assembly; and
controlling at least a portion of electrical-energy-based charging of the accessory assembly based at least in part on the activation status of the payment card reader assembly.

7. The method of claim 1 further comprising:
determining activation status of the accessory assembly; and
when the payment card reader assembly is at least electrical-energy-communication-based coupled and structurally coupled with the accessory assembly, controlling at least a portion of electrical-energy-based charging of the payment card reader assembly based at least in part on the activation status of the accessory assembly.

8. The method of claim 1 further comprising:
when the portable electronic device is at least electrical-energy-communication-based coupled and structurally coupled with the accessory assembly, determining activation status of the portable electronic device; and
when the payment card reader assembly is at least electrical-energy-communication-based coupled and structurally coupled with the accessory assembly, controlling at least a portion of electrical-energy-based charging of the payment card reader assembly based at least in part on the activation status of the portable electronic device.

9. The method of claim 1 further comprising:
when the payment card reader assembly is at least electrical-energy-communication-based coupled and structurally coupled with the accessory assembly, determining activation status of the payment card reader assembly; and
controlling at least a portion of electrical-energy-based charging of the payment card reader assembly based at least in part on the activation status of the payment card reader assembly.

10. An electronic-controller-implemented method for use with an accessory assembly electrical-energy-communication-based couplable and structurally couplable with a portable electronic device and a payment card reader assembly, the portable electronic device selected from a portable electronic tablet device implementation and a portable electronic phone device implementation, the method comprising:
determining activation status of the accessory assembly; and
when the portable electronic device is electrical-energy-communication-based coupled and structurally coupled with the accessory assembly, controlling at least a portion of electrical-communication status of the portable electronic device based at least in part on the activation status of the accessory assembly.

11. The method of claim 10 further comprising:
when the portable electronic device is electrical-energy-communication-based coupled and structurally coupled with the accessory assembly, determining activation status of the portable electronic device; and
controlling at least a portion of electrical-communication-based connectivity of the portable electronic device based at least in part on the activation status of the portable electronic device.

12. The method of claim 10 further comprising:
when the payment card reader assembly is electrical-energy-communication-based coupled and structurally coupled with the accessory assembly, determining activation status of the payment card reader assembly; and
when the portable electronic device is electrical-energy-communication-based coupled and structurally coupled with the accessory assembly, controlling at least a portion of electrical-communication-based connectivity of the portable electronic device based at least in part on the activation status of the payment card reader assembly.

13. The method of claim 10 further comprising:
determining activation status of the accessory assembly; and
controlling at least a portion of electrical-communication-based connectivity of the accessory assembly based at least in part on the activation status of the accessory assembly.

14. The method of claim 10 further comprising:
when the portable electronic device is electrical-energy-communication-based coupled and structurally coupled with the accessory assembly, determining activation status of the portable electronic device; and
controlling at least a portion of electrical-communication-based connectivity of the accessory assembly based at least in part on the activation status of the portable electronic device.

15. The method of claim 10 further comprising:
when the payment card reader assembly is electrical-energy-communication-based coupled and structurally coupled with the accessory assembly, determining activation status of the payment card reader assembly; and
controlling at least a portion of electrical-communication-based connectivity of the accessory assembly based at least in part on the activation status of the payment card reader assembly.

16. The method of claim 10 further comprising:
determining activation status of the accessory assembly; and
when the payment card reader assembly is electrical-energy-communication-based coupled and structurally coupled with the accessory assembly, controlling at least a portion of electrical-communication-based connectivity of the payment card reader assembly based at least in part on the activation status of the accessory assembly.

17. The method of claim 10 further comprising:
when the portable electronic device is electrical-energy-communication-based coupled and structurally coupled with the accessory assembly, determining activation status of the portable electronic device; and
when the payment card reader assembly is electrical-energy-communication-based coupled and structurally coupled with the accessory assembly, controlling at least a portion of electrical-communication-based connectivity of the payment card reader assembly based at least in part on the activation status of the portable electronic device.

18. The method of claim 10 further comprising:
when the payment card reader assembly is electrical-energy-communication-based coupled and structurally coupled with the accessory assembly, determining activation status of the payment card reader assembly; and
controlling at least a portion of electrical-communication-based connectivity of the payment card reader assembly based at least in part on the activation status of the payment card reader assembly.

19. An electronic-controller-implemented method for use with an accessory assembly electrical-energy-communication-based couplable with and structurally couplable with a portable electronic device and a payment card reader assembly, the portable electronic device selected from a portable electronic tablet device implementation and a portable electronic phone device implementation, the method comprising:
determining electrical-energy-communication-based coupling status of the accessory assembly with the portable electronic device; and
controlling at least a portion of electrical-communication-based connectivity of the portable electronic device based at least in part on the electrical-energy-communication-based coupling status of the accessory assembly with the portable electronic device.

20. The method of claim 19 further comprising:
determining electrical-energy-communication-based coupling status of the accessory assembly with the payment card reader assembly; and
controlling at least a portion of electrical-communication-based connectivity of the payment card reader assembly based at least in part on the electrical-energy-communication-based coupling status of the accessory assembly with the payment card reader assembly.

* * * * *